(12) United States Patent
Nguyen et al.

(10) Patent No.: US 12,449,907 B2
(45) Date of Patent: Oct. 21, 2025

(54) NAVIGATING USER INTERFACES USING A CURSOR

(71) Applicant: Apple Inc., Cupertino, CA (US)

(72) Inventors: Tu K. Nguyen, Fountain Valley, CA (US); James N. Cartwright, Campbell, CA (US); Elizabeth C. Cranfill, San Francisco, CA (US); Christopher B. Fleizach, Gilroy, CA (US); Joshua R. Ford, San Francisco, CA (US); Jeremiah R. Johnson, Costa Mesa, CA (US); Charles Maalouf, Seattle, WA (US); Heriberto Nieto, Seattle, WA (US); Jennifer D. Patton, Cupertino, CA (US); Hojjat Seyed Mousavi, San Jose, CA (US); Shawn R. Scully, Seattle, WA (US); Ibrahim G. Yusuf, Fremont, CA (US); Joanna Arreaza-Taylor, Seattle, WA (US); Hannah G. Coleman, Albuquerque, NM (US); Yoonju Han, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/747,613

(22) Filed: May 18, 2022

(65) Prior Publication Data
US 2022/0374085 A1 Nov. 24, 2022

Related U.S. Application Data

(60) Provisional application No. 63/221,331, filed on Jul. 13, 2021, provisional application No. 63/190,783, filed on May 19, 2021.

(51) Int. Cl.
G06F 3/01 (2006.01)
G06F 3/04812 (2022.01)
(Continued)

(52) U.S. Cl.
CPC .......... *G06F 3/017* (2013.01); *G06F 3/04812* (2013.01); *G06F 3/04817* (2013.01);
(Continued)

(58) Field of Classification Search
CPC .. G06F 3/017; G06F 3/04812; G06F 3/04817; G06F 3/0482; G06F 3/04842; G06F 3/0485
See application file for complete search history.

(56) References Cited

U.S. PATENT DOCUMENTS 5,483,261 A   1/1996   Yasutake
5,488,204 A   1/1996   Mead et al.
(Continued)

FOREIGN PATENT DOCUMENTS

CN   104423581 A   3/2015
CN   208188782 U   12/2018
(Continued)

OTHER PUBLICATIONS

Non-Final Office Action received for U.S. Appl. No. 18/109,808, mailed on Sep. 12, 2023, 49 pages.
(Continued)

*Primary Examiner* — Patrick F Riegler
(74) *Attorney, Agent, or Firm* — DLA Piper LLP (US)

(57) ABSTRACT

The present disclosure generally relates to navigating user interfaces using a cursor.

57 Claims, 50 Drawing Sheets

(51) Int. Cl.
*G06F 3/04817* (2022.01)
*G06F 3/0482* (2013.01)
*G06F 3/04842* (2022.01)
*G06F 3/0485* (2022.01)

(52) U.S. Cl.
CPC ........ *G06F 3/0482* (2013.01); *G06F 3/04842* (2013.01); *G06F 3/0485* (2013.01)

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,880,411 A | 3/1999 | Gillespie et al. | |
| 6,031,531 A * | 2/2000 | Kimble | G09B 21/00 345/157 |
| 6,128,010 A * | 10/2000 | Baxter | G06F 3/04897 715/846 |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,323,884 B1 * | 11/2001 | Bird | G06F 3/04812 715/810 |
| 6,424,376 B1 * | 7/2002 | Hirasawa | H04N 23/633 348/333.03 |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,616,110 B2 | 11/2009 | Crump et al. | |
| 7,663,607 B2 | 2/2010 | Hotelling et al. | |
| 8,170,656 B2 | 5/2012 | Tan et al. | |
| 8,341,537 B2 * | 12/2012 | Ray | G06F 3/04812 715/764 |
| 8,378,811 B2 | 2/2013 | Crump et al. | |
| 8,447,704 B2 | 5/2013 | Tan et al. | |
| 8,479,122 B2 | 7/2013 | Hotelling et al. | |
| 8,508,472 B1 | 8/2013 | Wieder | |
| 8,618,930 B2 | 12/2013 | Papadopoulos et al. | |
| 8,634,808 B1 | 1/2014 | Zhong et al. | |
| 8,769,554 B2 * | 7/2014 | Onda | G06F 21/6281 719/329 |
| 8,872,760 B2 | 10/2014 | Tsurumi | |
| 8,963,806 B1 | 2/2015 | Starner et al. | |
| 9,195,219 B2 | 11/2015 | Hong et al. | |
| 9,223,296 B2 | 12/2015 | Yang et al. | |
| 9,389,694 B2 | 7/2016 | Ataee et al. | |
| 9,414,115 B1 | 8/2016 | Mao et al. | |
| 9,495,575 B2 | 11/2016 | Kim et al. | |
| 9,532,723 B2 | 1/2017 | Kim et al. | |
| 9,668,676 B2 | 6/2017 | Culbert | |
| 9,704,386 B2 | 7/2017 | Yoon et al. | |
| 9,753,543 B2 | 9/2017 | Jeon et al. | |
| 9,939,899 B2 | 4/2018 | Allec et al. | |
| 9,977,566 B2 * | 5/2018 | Jitkoff | G06T 11/001 |
| 10,001,817 B2 | 6/2018 | Zambetti et al. | |
| 10,261,595 B1 | 4/2019 | Kin | |
| 10,318,034 B1 * | 6/2019 | Hauenstein | G06F 3/0412 |
| 10,627,914 B2 | 4/2020 | Ang et al. | |
| 10,656,720 B1 | 5/2020 | Holz | |
| 10,671,174 B2 | 6/2020 | Ang et al. | |
| 10,684,693 B2 | 6/2020 | Kletsov et al. | |
| 10,691,332 B2 | 6/2020 | Offenberg et al. | |
| 10,802,598 B2 | 10/2020 | Ang et al. | |
| 10,895,979 B1 | 1/2021 | Boyers | |
| 10,926,135 B1 | 2/2021 | Mckirdy | |
| 10,936,067 B1 | 3/2021 | Chand et al. | |
| 10,966,149 B2 | 3/2021 | Yoon et al. | |
| 11,048,334 B2 | 6/2021 | Rothberg et al. | |
| 11,099,647 B2 | 8/2021 | Ang et al. | |
| 11,150,730 B1 | 10/2021 | Anderson et al. | |
| 11,331,045 B1 | 5/2022 | Moschella et al. | |
| 11,347,320 B1 | 5/2022 | Shin et al. | |
| 11,543,887 B2 | 1/2023 | Ang et al. | |
| 11,604,510 B2 * | 3/2023 | Henderek | G06F 3/0482 |
| 11,868,531 B1 | 1/2024 | Tasci | |
| 2002/0024500 A1 | 2/2002 | Howard | |
| 2006/0010402 A1 | 1/2006 | Undasan | |
| 2006/0107226 A1 * | 5/2006 | Matthews | G06F 3/0481 715/766 |
| 2006/0197753 A1 | 9/2006 | Hotelling | |
| 2007/0236451 A1 * | 10/2007 | Ofek | G06F 3/0304 345/157 |
| 2008/0052643 A1 | 2/2008 | Ike et al. | |
| 2008/0300055 A1 | 12/2008 | Lutnick et al. | |
| 2008/0320394 A1 * | 12/2008 | Womack | G09B 7/02 715/730 |
| 2009/0176532 A1 | 7/2009 | Chae et al. | |
| 2009/0251410 A1 * | 10/2009 | Mori | G06F 3/0488 345/157 |
| 2009/0306487 A1 | 12/2009 | Crowe et al. | |
| 2010/0026626 A1 | 2/2010 | Macfarlane | |
| 2010/0088182 A1 * | 4/2010 | Ryder | G06Q 30/02 705/14.66 |
| 2010/0182126 A1 | 7/2010 | Martis et al. | |
| 2010/0199232 A1 | 8/2010 | Mistry et al. | |
| 2010/0289740 A1 | 11/2010 | Kim et al. | |
| 2010/0289772 A1 | 11/2010 | Miller | |
| 2011/0054360 A1 | 3/2011 | Son et al. | |
| 2011/0090407 A1 | 4/2011 | Friedman | |
| 2011/0148568 A1 | 6/2011 | Lim et al. | |
| 2011/0153435 A1 * | 6/2011 | Pisaris-Henderson | G06Q 30/0277 705/14.73 |
| 2011/0173204 A1 | 7/2011 | Murillo et al. | |
| 2011/0210931 A1 | 9/2011 | Shai | |
| 2011/0235926 A1 | 9/2011 | Yokono | |
| 2012/0127070 A1 | 5/2012 | Ryoo et al. | |
| 2012/0188158 A1 | 7/2012 | Tan et al. | |
| 2012/0290965 A1 * | 11/2012 | Ignor | G06F 3/04886 715/780 |
| 2012/0306748 A1 | 12/2012 | Faliscan et al. | |
| 2013/0135203 A1 * | 5/2013 | Croughwell, III | G06F 1/1694 345/158 |
| 2013/0154913 A1 * | 6/2013 | Genc | G06F 3/017 345/156 |
| 2013/0234926 A1 | 9/2013 | Rauber | |
| 2013/0239046 A1 | 9/2013 | Platzer et al. | |
| 2013/0300651 A1 | 11/2013 | Lim | |
| 2014/0028546 A1 | 1/2014 | Jeon et al. | |
| 2014/0031698 A1 | 1/2014 | Moon et al. | |
| 2014/0068526 A1 | 3/2014 | Figelman et al. | |
| 2014/0078318 A1 | 3/2014 | Alameh | |
| 2014/0095225 A1 | 4/2014 | Williams et al. | |
| 2014/0104180 A1 | 4/2014 | Schaffer | |
| 2014/0135612 A1 | 5/2014 | Yuen et al. | |
| 2014/0139454 A1 | 5/2014 | Mistry et al. | |
| 2014/0139637 A1 | 5/2014 | Mistry et al. | |
| 2014/0143784 A1 | 5/2014 | Mistry et al. | |
| 2014/0155705 A1 | 6/2014 | Papadopoulos et al. | |
| 2014/0160078 A1 | 6/2014 | Seo et al. | |
| 2014/0282270 A1 | 9/2014 | Slonneger | |
| 2014/0293755 A1 * | 10/2014 | Geiser | G04G 9/0082 368/10 |
| 2014/0320434 A1 | 10/2014 | Pantel | |
| 2014/0328147 A1 | 11/2014 | Yang et al. | |
| 2014/0359522 A1 * | 12/2014 | Kim | G06F 3/04812 715/835 |
| 2014/0365979 A1 | 12/2014 | Yoon et al. | |
| 2014/0375985 A1 | 12/2014 | Deliwala | |
| 2015/0019135 A1 | 1/2015 | Kacyvenski et al. | |
| 2015/0026647 A1 | 1/2015 | Park et al. | |
| 2015/0046876 A1 * | 2/2015 | Goldenberg | G06F 3/04812 715/834 |
| 2015/0061842 A1 | 3/2015 | Yoon et al. | |
| 2015/0084660 A1 | 3/2015 | Knierim et al. | |
| 2015/0084860 A1 | 3/2015 | Aleem et al. | |
| 2015/0156803 A1 * | 6/2015 | Ballard | H04W 76/10 455/422.1 |
| 2015/0169171 A1 * | 6/2015 | Fotland | G06F 3/0304 715/835 |
| 2015/0185877 A1 * | 7/2015 | Watanabe | G06F 3/0488 345/158 |

(56) References Cited

U.S. PATENT DOCUMENTS

| | | |
|---|---|---|
| 2015/0199780 A1* | 7/2015 | Beyk .................... G06Q 10/00 705/310 |
| 2015/0205358 A1 | 7/2015 | Lyren |
| 2015/0220149 A1 | 8/2015 | Plagemann et al. |
| 2015/0242083 A1* | 8/2015 | Rainisto ................. G06F 3/0488 715/784 |
| 2015/0248235 A1 | 9/2015 | Offenberg et al. |
| 2015/0261310 A1 | 9/2015 | Walmsley et al. |
| 2015/0268821 A1 | 9/2015 | Ramsby et al. |
| 2015/0286295 A1* | 10/2015 | Pepe ..................... G06F 3/0362 345/163 |
| 2015/0324057 A1* | 11/2015 | Chaji .................... G06F 3/0488 345/173 |
| 2015/0332031 A1 | 11/2015 | Mistry et al. |
| 2015/0346834 A1 | 12/2015 | Martinez Fernandez et al. |
| 2015/0370333 A1 | 12/2015 | Ataee et al. |
| 2016/0004408 A1 | 1/2016 | Yun |
| 2016/0011724 A1* | 1/2016 | Wheeler ................. G06F 3/013 715/810 |
| 2016/0018900 A1 | 1/2016 | Tu et al. |
| 2016/0029899 A1 | 2/2016 | Kim et al. |
| 2016/0034742 A1 | 2/2016 | Kim et al. |
| 2016/0041580 A1 | 2/2016 | Inoue et al. |
| 2016/0041680 A1 | 2/2016 | Chi et al. |
| 2016/0048215 A1 | 2/2016 | Shin et al. |
| 2016/0062582 A1 | 3/2016 | Wilson et al. |
| 2016/0085266 A1 | 3/2016 | Lee et al. |
| 2016/0091980 A1 | 3/2016 | Baranski et al. |
| 2016/0094698 A1 | 3/2016 | Lee et al. |
| 2016/0098137 A1 | 4/2016 | Kim et al. |
| 2016/0124514 A1 | 5/2016 | Cha et al. |
| 2016/0196692 A1* | 7/2016 | Kjallstrom ............ G06T 19/006 345/633 |
| 2016/0248899 A1 | 8/2016 | Lee et al. |
| 2016/0291768 A1 | 10/2016 | Cho et al. |
| 2016/0296142 A1 | 10/2016 | Culbert |
| 2016/0313798 A1 | 10/2016 | Connor |
| 2016/0328108 A1 | 11/2016 | Li |
| 2017/0031453 A1 | 2/2017 | Presura |
| 2017/0046872 A1* | 2/2017 | Geselowitz ........... G06T 15/205 |
| 2017/0065184 A1 | 3/2017 | Barak |
| 2017/0090567 A1 | 3/2017 | Allec et al. |
| 2017/0123487 A1 | 5/2017 | Hazra et al. |
| 2017/0160819 A1 | 6/2017 | Yi et al. |
| 2017/0205878 A1* | 7/2017 | Hoste ..................... G06F 3/014 |
| 2017/0212590 A1 | 7/2017 | Vanblon et al. |
| 2017/0220224 A1 | 8/2017 | Kodali et al. |
| 2017/0308227 A1* | 10/2017 | Park ..................... G06F 3/04845 |
| 2017/0308292 A1 | 10/2017 | Choi |
| 2018/0004287 A1* | 1/2018 | Yoo ....................... G06F 3/0482 |
| 2018/0036469 A1* | 2/2018 | Crnkovich ............ H04B 1/3833 |
| 2018/0046788 A1 | 2/2018 | Ohtani et al. |
| 2018/0059894 A1 | 3/2018 | Kim |
| 2018/0062691 A1 | 3/2018 | Barnett, Jr. |
| 2018/0081453 A1 | 3/2018 | Ely |
| 2018/0101235 A1 | 4/2018 | Bodensteiner et al. |
| 2018/0121036 A1* | 5/2018 | Moore ................... H04L 67/02 |
| 2018/0153430 A1 | 6/2018 | Ang et al. |
| 2018/0181261 A1 | 6/2018 | Saurabh |
| 2018/0253151 A1 | 9/2018 | Kletsov et al. |
| 2018/0294844 A1 | 10/2018 | Choi et al. |
| 2018/0307303 A1 | 10/2018 | Powderly et al. |
| 2019/0011703 A1 | 1/2019 | Robaina et al. |
| 2019/0018506 A1 | 1/2019 | Bernstein et al. |
| 2019/0033964 A1* | 1/2019 | Kulkarni .............. G06F 3/04842 |
| 2019/0113889 A1* | 4/2019 | Kumar ................. G06F 3/04845 |
| 2019/0121522 A1 | 4/2019 | Davis et al. |
| 2019/0146219 A1 | 5/2019 | Rodriguez, II |
| 2019/0196600 A1 | 6/2019 | Rothberg et al. |
| 2019/0220040 A1* | 7/2019 | Wu ....................... G05D 1/0044 |
| 2019/0268771 A1 | 8/2019 | Seo et al. |
| 2019/0281547 A1 | 9/2019 | Yoon et al. |
| 2019/0317608 A1 | 10/2019 | Ono et al. |
| 2019/0357787 A1 | 11/2019 | Barachant et al. |
| 2019/0370094 A1 | 12/2019 | Louch et al. |
| 2020/0042087 A1 | 2/2020 | Ang et al. |
| 2020/0042088 A1 | 2/2020 | Ang et al. |
| 2020/0042089 A1 | 2/2020 | Ang et al. |
| 2020/0042094 A1 | 2/2020 | Ang et al. |
| 2020/0042095 A1 | 2/2020 | Ang et al. |
| 2020/0042145 A1 | 2/2020 | Williams et al. |
| 2020/0073481 A1 | 3/2020 | Mizunuma et al. |
| 2020/0073483 A1 | 3/2020 | Berenzweig et al. |
| 2020/0097081 A1 | 3/2020 | Stone et al. |
| 2020/0097082 A1 | 3/2020 | Berenzweig et al. |
| 2020/0111260 A1 | 4/2020 | Osborn et al. |
| 2020/0125165 A1* | 4/2020 | Pace ..................... G06V 40/176 |
| 2020/0150772 A1 | 5/2020 | Quinn et al. |
| 2020/0159340 A1 | 5/2020 | Bernstein et al. |
| 2020/0249752 A1 | 8/2020 | Parshionikar |
| 2020/0264764 A1 | 8/2020 | Seymour et al. |
| 2020/0301509 A1 | 9/2020 | Liu et al. |
| 2020/0310540 A1 | 10/2020 | Hussami et al. |
| 2020/0310541 A1 | 10/2020 | Reisman et al. |
| 2020/0379716 A1 | 12/2020 | Carrigan et al. |
| 2020/0401292 A1 | 12/2020 | Lorenz et al. |
| 2021/0064132 A1 | 3/2021 | Rubin et al. |
| 2021/0076091 A1* | 3/2021 | Shohara ........... H04N 21/42222 |
| 2021/0103338 A1 | 4/2021 | Ang et al. |
| 2021/0124417 A1 | 4/2021 | Ma |
| 2021/0232225 A1* | 7/2021 | Cipoletta ................ G06F 1/163 |
| 2021/0255750 A1 | 8/2021 | Al et al. |
| 2021/0263702 A1 | 8/2021 | Carrigan |
| 2021/0349552 A1 | 11/2021 | Bernstein et al. |
| 2021/0405760 A1* | 12/2021 | Schoen .................. G06F 1/163 |
| 2022/0019284 A1 | 1/2022 | Kaifosh et al. |
| 2022/0044309 A1 | 2/2022 | Jose |
| 2022/0050425 A1 | 2/2022 | Connor |
| 2022/0121344 A1 | 4/2022 | Pastrana Vicente et al. |
| 2022/0129068 A1* | 4/2022 | Anderson .......... G02B 27/0101 |
| 2022/0156353 A1 | 5/2022 | Duffy et al. |
| 2022/0179497 A1 | 6/2022 | Jung et al. |
| 2022/0253146 A1 | 8/2022 | Erivantcev et al. |
| 2022/0291753 A1 | 9/2022 | Erivantcev et al. |
| 2022/0326779 A1 | 10/2022 | Chung et al. |
| 2023/0024627 A1 | 1/2023 | Bernstein et al. |
| 2023/0072423 A1 | 3/2023 | Osborn et al. |
| 2023/0074476 A1 | 3/2023 | Bae et al. |
| 2023/0090410 A1 | 3/2023 | Sharma et al. |
| 2023/0113991 A1 | 4/2023 | Ang et al. |
| 2023/0131489 A1 | 4/2023 | Marzorati et al. |
| 2023/0177870 A1 | 6/2023 | Chao et al. |
| 2023/0195237 A1 | 6/2023 | Nguyen et al. |
| 2023/0252737 A1 | 8/2023 | Dreyer et al. |
| 2023/0259207 A1 | 8/2023 | Lam et al. |
| 2023/0270363 A1 | 8/2023 | Qazi et al. |
| 2023/0376193 A1 | 11/2023 | Han et al. |
| 2024/0061513 A1 | 2/2024 | Reisman et al. |
| 2024/0085992 A1 | 3/2024 | Bernstein et al. |
| 2024/0094819 A1 | 3/2024 | Nie et al. |
| 2024/0370093 A1 | 11/2024 | Nie et al. |
| 2024/0385691 A1 | 11/2024 | Nie et al. |
| 2025/0085791 A1 | 3/2025 | Bernstein et al. |

FOREIGN PATENT DOCUMENTS

| | | |
|---|---|---|
| EP | 2290583 A1 | 3/2011 |
| EP | 2565765 A1 | 3/2013 |
| EP | 2698686 A2 | 2/2014 |
| EP | 2813921 A1 | 12/2014 |
| EP | 2980715 A1 | 2/2016 |
| EP | 2999208 A1 | 3/2016 |
| EP | 3001282 A1 | 3/2016 |
| EP | 3125097 A2 | 2/2017 |
| JP | 2000-163031 A | 6/2000 |
| JP | 2000-227832 A | 8/2000 |
| JP | 2001-216069 A | 8/2001 |
| JP | 2002-33795 A | 1/2002 |
| JP | 2002-342033 A | 11/2002 |
| JP | 2006-209563 A | 8/2006 |
| JP | 2017-510912 A | 4/2017 |
| JP | 2018-536933 A | 12/2018 |
| KR | 10-2016-0000330 A | 1/2016 |

(56) References Cited

FOREIGN PATENT DOCUMENTS

| WO | 2012/138663 | A2 | 10/2012 | |
|---|---|---|---|---|
| WO | 2014/117125 | A1 | 7/2014 | |
| WO | 2015/060856 | A1 | 4/2015 | |
| WO | 2015/119637 | A1 | 8/2015 | |
| WO | 2015/121100 | A1 | 8/2015 | |
| WO | 2016/053459 | A1 | 4/2016 | |
| WO | 2018/131251 | A1 | 7/2018 | |
| WO | 2019/173136 | A1 | 9/2019 | |
| WO | WO-2021006903 | A1 * | 1/2021 | ............ A61B 3/112 |
| WO | 2023/230354 | A1 | 11/2023 | |

OTHER PUBLICATIONS

International Search Report and Written Opinion received for PCT Patent Application No. PCT/US2023/012260, mailed on Aug. 2, 2023, 22 pages.
Invitation to Pay Additional Fees and Partial International Search Report received for PCT Patent Application No. PCT/US2023/012260, mailed on Jun. 7, 2023, 11 pages.
Corrected Notice of Allowance received for U.S. Appl. No. 17/950,943, mailed on Jul. 10, 2023, 2 pages.
Notice of Allowance received for U.S. Appl. No. 17/950,943, mailed on Jul. 5, 2023, 18 pages.
Applicant-Initiated Interview Summary received for U.S. Appl. No. 18/109,808, mailed on Sep. 25, 2023, 5 pages.
International Search Report and Written Opinion received for PCT Patent Application No. PCT/US2022/030021, mailed on Nov. 9, 2022, 19 pages.
Invitation to Pay Additional Fees and Partial International Search Report received for PCT Patent Application No. PCT/US2022/030021, mailed on Sep. 15, 2022, 13 pages.
Notice of Allowance received for U.S. Appl. No. 17/383,880, mailed on Aug. 29, 2022, 17 pages.
Notice of Allowance received for U.S. Appl. No. 17/383,880, mailed on Jun. 20, 2022, 17 pages.
Office Action received for European Patent Application No. 22729964.1, mailed on May 22, 2023, 9 pages.
Zhang et al., "FinDroidHR: Smartwatch Gesture Input with Optical Heartrate Monitor", Available Online at: https://dl.acm.org/doi/10.1145/3191788, Mar. 2018, 42 pages.
Apple Previews Powerful Software Updates Designed for People with Disabilities, Available online at: https://www.apple.com/newsroom/2021/05/apple-previews-powerful-software-updates-designed-for-people-with-disabilities/, May 19, 2021, 10 pages.
Applicant Initiated Interview Summary received for U.S. Appl. No. 14/973,573, mailed on Jul. 10, 2017, 3 pages.
Applicant-Initiated Interview Summary received for U.S. Appl. No. 16/773,536, mailed on Mar. 26, 2021, 4 pages.
Final Office Action received for U.S. Appl. No. 14/616,573 mailed Mar. 10, 2017, 5 pages.
International Preliminary Report on Patentability received for PCT Patent Application No. PCT/US2018/038823, mailed on Jan. 23, 2020, 20 pages.
International Search Report and written opinion received for PCT Application No. PCT/US2016/048582 mailed on Sep. 13, 2016, 11 pages.
International Search Report and Written Opinion received for PCT Patent Application No. PCT/US2018/038823, mailed on Oct. 23, 2018, 30 pages.
International Search Report received for PCT Application No. PCT/US2015/042976 mailed on Aug. 18, 2015, 22 pages.
Invitation to Pay Additional Fees received for PCT Patent Application No. PCT/US2018/038823, mailed on Sep. 5, 2018, 22 pages.
Non-Final Office Action received for U.S. Appl. No. 14/616,573, mailed Jun. 16, 2016, 12 pages.
Non-Final Office Action received for U.S. Appl. No. 14/616,573, mailed on Jun. 14, 2017, 13 pages.
Non-Final Office Action received for U.S. Appl. No. 14/973,573, mailed on Apr. 20, 2017, 34 pages.
Non-Final Office Action received for U.S. Appl. No. 15/038,419, mailed Dec. 21, 2016, 13 pages.
Non-Final Office Action received for U.S. Appl. No. 15/937,716, mailed on Apr. 22, 2019, 28 pages.
Non-Final Office Action received for U.S. Appl. No. 16/773,536, mailed on Dec. 18, 2020, 19 pages.
Notice of Allowance received for U.S. Appl. No. 14/973,573, mailed on Nov. 30, 2017, 8 pages.
Notice of Allowance received for U.S. Appl. No. 15/038,419, mailed on Apr. 3, 2017, 10 pages.
Notice of Allowance received for U.S. Appl. No. 15/937,716, mailed on Oct. 23, 2019, 19 pages.
Notice of Allowance received for U.S. Appl. No. 16/773,536, mailed on Apr. 8, 2021, 16 pages.
Eisenstein et al., "Analysis of Clustering Techniques to Detect Hand Signs", Intelligent Multimedia, Video and Speech Processing, of 2001 International Symposium, Piscataway, NJ, USA, IEEE, 2001, 4 pages.
Lee et al., "A Multi-Touch Three-Dimensional Touch-Sensitive Tablet", CHI '85 Proceedings of the SIGCHI Conference on Human Factors in Computing Systems, Apr. 1985, pp. 21-25.
Reuss et al., "Period Domain Analysis In Fetal Pulse Oximetry", Proceedings of t11e Second Joint EMBS/BMES Conference, Houston, TX, Oct. 23-26, 2002, 2 pages.
Rubine Dean, "Combining Gestures and Direct Manipulation", CHI '92, May 3-7, 1992, pp. 659-660.
Rubine Deanh, "The Automatic Recognition of Gestures", CMU-CS-91-202, Thesis Submitted in Partial Fulfillment of the Requirements for the Degree of Doctor of Philosophy in Computer Science at Carnegie Mellon University, Dec. 1991, 285 pages.
Westerman Wayne, "Hand Tracking, Finger Identification and Chordic Manipulation on A Multi-Touch Surface", Doctoral Dissertation, 1999, 363 Pages.
Zhao et al., "Wireless Photoplethysmograph Knuckle Sensor System for Measuring Finger Motions", 2014 International Symposium on Optomechatronic Technologies, IEEE, 2014, pp. 205-209.
Zheng et al., "An Efficient User Verificat ion System via Mouse Movements", Computer am1 Communications Security, ACM, New York, NY, USA, Dec. 17, 2011, pp. 139-150.
"Accessibility by design: An Apple Watch for everyone", Available Online at: https://developer.apple.com/videos/play/wwdc2021/10308/, Jun. 10, 2021, 2 pages.
Nishiya et al., "Gesture Estimation Using Deep Learning from PPG Signal", Information Processing Society of Japan Kansai Branch Convention Proceedings [online], Japan, Information Processing Society of Japan, Available on http: id.nii.ac.jp/1001/0020708, 2020, 4 pages (Official Copy only). {See communication under 37 CFR § 1.98(a) (3)}.
Office Action received for Japanese Patent Application No. 2023-513867, mailed on Jul. 31, 2023, 11 pages (5 pages of English Translation and 6 pages of Official Copy).
Applicant-Initiated Interview Summary received for U.S. Appl. No. 18/109,808, mailed on Nov. 22, 2023, 5 pages.
International Search Report and Written Opinion received for PCT Patent Application No. PCT/US2023/022410, mailed on Aug. 31, 2023, 21 pages.
Summons to Attend Oral Proceedings received for European Patent Application No. 22729964.1, mailed on Nov. 6, 2023, 7 pages.
Final Office Action received for U.S. Appl. No. 18/109,808, mailed on Oct. 31, 2023, 54 pages.
Notice of Allowance received for U.S. Appl. No. 17/950,943, mailed on Oct. 20, 2023, 18 pages.
Non-Final Office Action received for U.S. Appl. No. 18/102,036, mailed on Sep. 29, 2024, 16 pages.
Notice of Allowance received for U.S. Appl. No. 18/511,778, mailed on Sep. 30, 2024, 17 pages.
International Preliminary Report on Patentability received for PCT Patent Application No. PCT/US2022/030021, mailed on Nov. 30, 2023, 14 pages.
Office Action received for Japanese Patent Application No. 2023-513867, mailed on Dec. 4, 2023, 6 pages (3 pages of English Translation and 3 pages of Official Copy).

(56) References Cited

OTHER PUBLICATIONS

Advisory Action received for U.S. Appl. No. 18/197,681, mailed on Aug. 21, 2024, 5 pages.
Applicant-Initiated Interview Summary received for U.S. Appl. No. 18/109,808, mailed on Aug. 19, 2024, 6 pages.
International Preliminary Report on Patentability received for PCT Patent Application No. 3. PCT/US2023/012260, mailed on Aug. 22, 2024, 15 pages.
Final Office Action received for U.S. Appl. No. 18/197,681, mailed on Jun. 27, 2024, 30 pages.
Non-Final Office Action received for U.S. Appl. No. 18/109,808, mailed on Jul. 5, 2024, 53 pages.
Applicant-Initiated Interview Summary received for U.S. Appl. No. 18/109,808, mailed on Apr. 30, 2024, 5 pages.
Intention to Grant received for European Patent Application No. 22729964.1, mailed on Apr. 24, 2024, 9 pages.
Applicant-Initiated Interview Summary received for U.S. Appl. No. 18/109,808, mailed on Jan. 23, 2024, 5 pages.
Applicant-Initiated Interview Summary received for U.S. Appl. No. 18/197,681, mailed on Mar. 18, 2024, 4 pages.
Final Office Action received for U.S. Appl. No. 18/109,808, mailed on Mar. 5, 2024, 52 pages.
Non-Final Office Action received for U.S. Appl. No. 18/109,808, mailed on Jan. 4, 2024, 45 pages.
Non-Final Office Action received for U.S. Appl. No. 18/197,681, mailed on Jan. 30, 2024, 32 pages.
Advisory Action received for U.S. Appl. No. 18/109,808, mailed on May 20, 2024, 6 pages.
Decision to Grant received for European Patent Application No. 22729964.1, mailed on Aug. 29, 2024, 3 pages.
Notice of Allowance received for U.S. Appl. No. 18/109,808, mailed on Oct. 10, 2024, 10 pages.
Brief Communication Regarding Oral Proceedings received for European Patent Application No. 22729964.1, mailed on Mar. 21, 2024, 1 page.
International Search Report and Written Opinion received for PCT Patent Application No. PCT/US2023/032794, mailed on Jan. 8, 2024, 19 pages.
Invitation to Pay Additional Fees and Partial International Search Report received for PCT Patent Application No. PCT/US2023/032794, mailed on Nov. 9, 2023, 12 pages.
Applicant-Initiated Interview Summary received for U.S. Appl. No. 18/102,036, mailed on Nov. 8, 2024, 4 pages.
Applicant-Initiated Interview Summary received for U.S. Appl. No. 18/499,970, mailed on Sep. 18, 2024, 3 pages.
Extended European Search Report received for European Patent Application No. 24194994.0, mailed on Nov. 28, 2024, 9 pages.
Final Office Action received for U.S. Appl. No. 18/499,970, mailed on Dec. 23, 2024, 8 pages.
International Preliminary Report on Patentability received for PCT Patent Application No. PCT/US2023/022410, mailed on Nov. 28, 2024, 18 pages.
International Search Report and Written Opinion received for PCT Patent Application No. PCT/US2024/020743, mailed on Jul. 16, 2024, 19 pages.
International Search Report and Written Opinion received for PCT Patent Application No. PCT/US2024/023602, mailed on Nov. 26, 2024, 17 pages.
Invitation to Pay Additional Fees and Partial International Search Report received for PCT Patent Application No. PCT/US2024/023602, mailed on Aug. 26, 2024, 11 pages.
Non-Final Office Action received for U.S. Appl. No. 18/102,036, mailed on Dec. 20, 2024, 16 pages.
Non-Final Office Action received for U.S. Appl. No. 18/499,970, mailed on Aug. 13, 2024, 8 pages.
Applicant-Initiated Interview Summary received for U.S. Appl. No. 18/197,681, mailed on Apr. 21, 2025, 4 pages.
Final Office Action received for U.S. Appl. No. 18/102,036, mailed on Apr. 21, 2025, 19 pages.
Office Action received for Japanese Patent Application No. 2024-023002, mailed on Apr. 11, 2025, 12 pages (6 pages of English Translation and 6 pages of Official Copy).
Applicant-Initiated Interview Summary received for U.S. Appl. No. 18/102,036, mailed on Mar. 10, 2025, 3 pages.
Applicant-Initiated Interview Summary received for U.S. Appl. No. 18/499,970, mailed on Feb. 25, 2025, 4 pages.
Non-Final Office Action received for U.S. Appl. No. 18/499,970, mailed on Mar. 14, 2025, 7 pages.
Applicant-Initiated Interview Summary received for U.S. Appl. No. 18/499,970, mailed on May 30, 2025, 4 pages.
Notice of Allowance received for U.S. Appl. No. 18/197,681, mailed on May 20, 2025, 18 pages.
International Preliminary Report on Patentability received for PCT Patent Application No. PCT/US2023/032794, mailed on Apr. 3, 2025, 13 pages.
Non-Final Office Action received for U.S. Appl. No. 18/197,681, mailed on Apr. 3, 2025, 30 pages.
Written Opinion received for PCT Patent Application No. PCT/US2024/020743, mailed on Apr. 1, 2025, 14 pages.
Applicant-Initiated Interview Summary received for U.S. Appl. No. 18/102,036, mailed on Jun. 27, 2025, 3 pages.
Final Office Action received for U.S. Appl. No. 18/499,970, mailed on Aug. 5, 2025, 10 pages.
International Preliminary Report on Patentability received for PCT Patent Application No. PCT/US2024/020743, mailed on Jul. 29, 2025, 15 pages.
Notice of Allowance received for Japanese Patent Application No. 2024-023002, mailed on Sep. 1, 2025, 5 pages (1 page of English Translation and 4 pages of Official Copy).

\* cited by examiner

NAVIGATING USER INTERFACES USING A CURSOR

CROSS-REFERENCE APPLICATIONS

This application claims the benefit of U.S. Patent Application Ser. No. 63/221,331, entitled "NAVIGATING USER INTERFACES USING HAND GESTURES," filed on Jul. 13, 2021 and U.S. Patent Application Ser. No. 63/190,783, entitled "NAVIGATING USER INTERFACES USING HAND GESTURES," filed on May 19, 2021, the content of which is hereby incorporated by reference in its entirety.

FIELD

The present disclosure relates generally to computer user interfaces, and more specifically to techniques for navigating user interfaces using hand gestures.

BACKGROUND

Users of smartphones and other personal electronic devices are more frequently using their devices. Some existing techniques allow users to navigate user interfaces on their devices.

BRIEF SUMMARY

Some techniques for navigating user interfaces using hand gestures with electronic devices, however, are generally cumbersome and inefficient. For example, some existing techniques use a complex and time-consuming user interface, which may include multiple key presses or keystrokes. Existing techniques require a lot of time, wasting user time and device energy. This latter consideration is particularly important in battery-operated devices.

Accordingly, the present technique provides users of electronic devices with faster, more efficient methods and interfaces for navigating user interfaces using hand gestures. Such methods and interfaces optionally complement or replace other methods for navigating user interfaces using hand gestures. Such methods and interfaces reduce the cognitive burden on a user and produce a more efficient human-machine interface. For battery-operated computing devices, such methods and interfaces conserve power and increase the time between battery charges.

In accordance with some embodiments, a method is described. The method is performed at a computer system that is in communication with a display generation component and an optical sensor. The method comprises: displaying, via the display generation component, a user interface that includes a first user interface object, a second user interface object, a third user interface object, and an indication that the first user interface object is selected; while displaying the user interface that includes the first user interface object, the second user interface object, the third user interface object, and the indication that the first user interface object is selected, detecting, via at least the optical sensor, a hand gesture; and in response to detecting, via at least the optical sensor, the hand gesture: in accordance with a determination that the hand gesture is a first type of gesture, displaying, via the display generation component, an indication that the second user interface object is selected; and in accordance with a determination that the hand gesture is a second type of gesture that is different from the first type of gesture, displaying, via the display generation component, an indication that the third user interface object is selected.

In accordance with some embodiments, a non-transitory computer-readable storage medium is described. The non-transitory computer-readable storage medium storing one or more programs configured to be executed by one or more processors of a computer system that is in communication with a display generation component and an optical sensor, the one or more programs including instructions for: displaying, via the display generation component, a user interface that includes a first user interface object, a second user interface object, a third user interface object, and an indication that the first user interface object is selected; while displaying the user interface that includes the first user interface object, the second user interface object, the third user interface object, and the indication that the first user interface object is selected, detecting, via at least the optical sensor, a hand gesture; and in response to detecting, via at least the optical sensor, the hand gesture: in accordance with a determination that the hand gesture is a first type of gesture, displaying, via the display generation component, an indication that the second user interface object is selected; and in accordance with a determination that the hand gesture is a second type of gesture that is different from the first type of gesture, displaying, via the display generation component, an indication that the third user interface object is selected.

In accordance with some embodiments, a transitory computer-readable storage medium is described. The transitory computer-readable storage medium stores one or more programs configured to be executed by one or more processors of a computer system that is in communication with a display generation component and an optical sensor, the one or more programs including instructions for: displaying, via the display generation component, a user interface that includes a first user interface object, a second user interface object, a third user interface object, and an indication that the first user interface object is selected; while displaying the user interface that includes the first user interface object, the second user interface object, the third user interface object, and the indication that the first user interface object is selected, detecting, via at least the optical sensor, a hand gesture; and in response to detecting, via at least the optical sensor, the hand gesture: in accordance with a determination that the hand gesture is a first type of gesture, displaying, via the display generation component, an indication that the second user interface object is selected; and in accordance with a determination that the hand gesture is a second type of gesture that is different from the first type of gesture, displaying, via the display generation component, an indication that the third user interface object is selected.

In accordance with some embodiments, a computer system is described. The computer system comprises: a display generation component; an optical sensor; one or more processors; and memory storing one or more programs configured to be executed by the one or more processors, the one or more programs including instructions for: displaying, via the display generation component, a user interface that includes a first user interface object, a second user interface object, a third user interface object, and an indication that the first user interface object is selected; while displaying the user interface that includes the first user interface object, the second user interface object, the third user interface object, and the indication that the first user interface object is selected, detecting, via at least the optical sensor, a hand gesture; and in response to detecting, via at least the optical sensor, the hand gesture: in accordance with a determination that the hand gesture is a first type of gesture, displaying, via the display generation component, an indication that the second user interface object is selected; and in accordance with a determination that the hand gesture is a second type of gesture that is different from the first type of gesture, displaying, via the display generation component, an indication that the third user interface object is selected.

In accordance with some embodiments, a computer system is described. The computer system comprises: a display generation component, an optical sensor; one or more processors; and memory storing one or more programs configured to be executed by the one or more processors, the one or more programs including instructions for: means for displaying, via the display generation component, a user interface that includes a first user interface object, a second user interface object, a third user interface object, and an indication that the first user interface object is selected; means for, while displaying the user interface that includes the first user interface object, the second user interface object, the third user interface object, and the indication that the first user interface object is selected, detecting, via at least the optical sensor, a hand gesture; and means for, in response to detecting, via at least the optical sensor, the hand gesture: in accordance with a determination that the hand gesture is a first type of gesture, displaying, via the display generation component, an indication that the second user interface object is selected; and in accordance with a determination that the hand gesture is a second type of gesture that is different from the first type of gesture, displaying, via the display generation component, an indication that the third user interface object is selected.

In accordance with some embodiments, a computer program product is described. The computer program product comprises one or more programs configured to be executed by one or more processors of a computer system that is in communication with a display generation component and an optical sensor, the one or more programs including instructions for: displaying, via the display generation component, a user interface that includes a first user interface object, a second user interface object, a third user interface object, and an indication that the first user interface object is selected; while displaying the user interface that includes the first user interface object, the second user interface object, the third user interface object, and the indication that the first user interface object is selected, detecting, via at least the optical sensor, a hand gesture; and in response to detecting, via at least the optical sensor, the hand gesture: in accordance with a determination that the hand gesture is a first type of gesture, displaying, via the display generation component, an indication that the second user interface object is selected; and in accordance with a determination that the hand gesture is a second type of gesture that is different from the first type of gesture, displaying, via the display generation component, an indication that the third user interface object is selected.

In accordance with some embodiments, a method is described. The method is performed at a computer system that is in communication with a display generation component. The method comprises: displaying, via the display generation component, a user interface that includes a selectable user interface object and a cursor that is displayed at a first location on the user interface; while displaying the selectable user interface object and the cursor at the first location on the user interface, detecting a request to move the cursor from the first location to a second location on the user interface; and in response to detecting the request to move the cursor from the first location to the second location: displaying the cursor at the second location; in accordance with a determination that the second location corresponds to a location of the selectable user interface object, displaying an animation that provides a visual indication of how long the cursor needs to be located at the second location to perform an operation, wherein the visual indication is updated over a period of time; and in accordance with a determination that the second location does not correspond to the location of the selectable user interface object, forgoing displaying the animation.

In accordance with some embodiments, a non-transitory computer-readable storage medium is described. The non-transitory computer-readable storage medium storing one or more programs configured to be executed by one or more processors of a computer system that is in communication with a display generation component, the one or more programs including instructions for: displaying, via the display generation component, a user interface that includes a selectable user interface object and a cursor that is displayed at a first location on the user interface; while displaying the selectable user interface object and the cursor at the first location on the user interface, detecting a request to move the cursor from the first location to a second location on the user interface; and in response to detecting the request to move the cursor from the first location to the second location: displaying the cursor at the second location; in accordance with a determination that the second location corresponds to a location of the selectable user interface object, displaying an animation that provides a visual indication of how long the cursor needs to be located at the second location to perform an operation, wherein the visual indication is updated over a period of time; and in accordance with a determination that the second location does not correspond to the location of the selectable user interface object, forgoing displaying the animation.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: displaying, via the display generation component, a user interface that includes a selectable user interface object and a cursor that is displayed at a first location on the user interface; while displaying the selectable user interface object and the cursor at the first location on the user interface, detecting a request to move the cursor from the first location to a second location on the user interface; and in response to detecting the request to move the cursor from the first location to the second location: displaying the cursor at the second location; in accordance with a determination that the second location corresponds to a location of the selectable user interface object, displaying an animation that provides a visual indication of how long the cursor needs to be located at the second location to perform an operation, wherein the visual indication is updated over a period of time; and in accordance with a determination that the second location does not correspond to the location of the selectable user interface object, forgoing displaying the animation.

In accordance with some embodiments, a computer system is described. The computer system comprises: a display generation component; one or more processors; and memory storing one or more programs configured to be executed by the one or more processors, the one or more programs including instructions for: displaying, via the display generation component, a user interface that includes a selectable user interface object and a cursor that is displayed at a first location on the user interface; while displaying the selectable user interface object and the cursor at the first location on the user interface, detecting a request to move the cursor from the first location to a second location on the user interface; and in response to detecting the request to move the cursor from the first location to the second location: displaying the cursor at the second location; in accordance with a determination that the second location corresponds to a location of the selectable user interface object, displaying an animation that provides a visual indication of how long the cursor needs to be located at the second location to perform an operation, wherein the visual indication is updated over a period of time; and in accordance with a determination that the second location does not correspond to the location of the selectable user interface object, forgoing displaying the animation.

In accordance with some embodiments, a computer system is described. The computer system comprises: a display generation component, one or more processors; and memory storing one or more programs configured to be executed by the one or more processors, the one or more programs including instructions for: means for displaying, via the display generation component, a user interface that includes a selectable user interface object and a cursor that is displayed at a first location on the user interface; means for, while displaying the selectable user interface object and the cursor at the first location on the user interface, detecting a request to move the cursor from the first location to a second location on the user interface; and means for, in response to detecting the request to move the cursor from the first location to the second location: displaying the cursor at the second location; in accordance with a determination that the second location corresponds to a location of the selectable user interface object, displaying an animation that provides a visual indication of how long the cursor needs to be located at the second location to perform an operation, wherein the visual indication is updated over a period of time; and in accordance with a determination that the second location does not correspond to the location of the selectable user interface object, forgoing displaying the animation.

In accordance with some embodiments, a computer program product is described. The computer program product comprises one or more programs configured to be executed by one or more processors of a computer system that is in communication with a display generation component, the one or more programs including instructions for: displaying, via the display generation component, a user interface that includes a selectable user interface object and a cursor that is displayed at a first location on the user interface; while displaying the selectable user interface object and the cursor at the first location on the user interface, detecting a request to move the cursor from the first location to a second location on the user interface; and in response to detecting the request to move the cursor from the first location to the second location: displaying the cursor at the second location; in accordance with a determination that the second location corresponds to a location of the selectable user interface object, displaying an animation that provides a visual indication of how long the cursor needs to be located at the second location to perform an operation, wherein the visual indication is updated over a period of time; and in accordance with a determination that the second location does not correspond to the location of the selectable user interface object, forgoing displaying the animation.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for navigating user interfaces using hand gestures, thereby increasing the effectiveness, efficiency, and user satisfaction with such devices. Such methods and interfaces may complement or replace other methods for navigating user interfaces using hand gestures.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for navigating user interfaces using hand gestures. For example, users may want to navigate user interfaces without touching the display of their devices. Such techniques can reduce the cognitive and/or physical burden on a user who navigate user interfaces, thereby enhancing productivity. Further, such techniques can reduce processor and battery power otherwise wasted on redundant user inputs.

Figure 6:
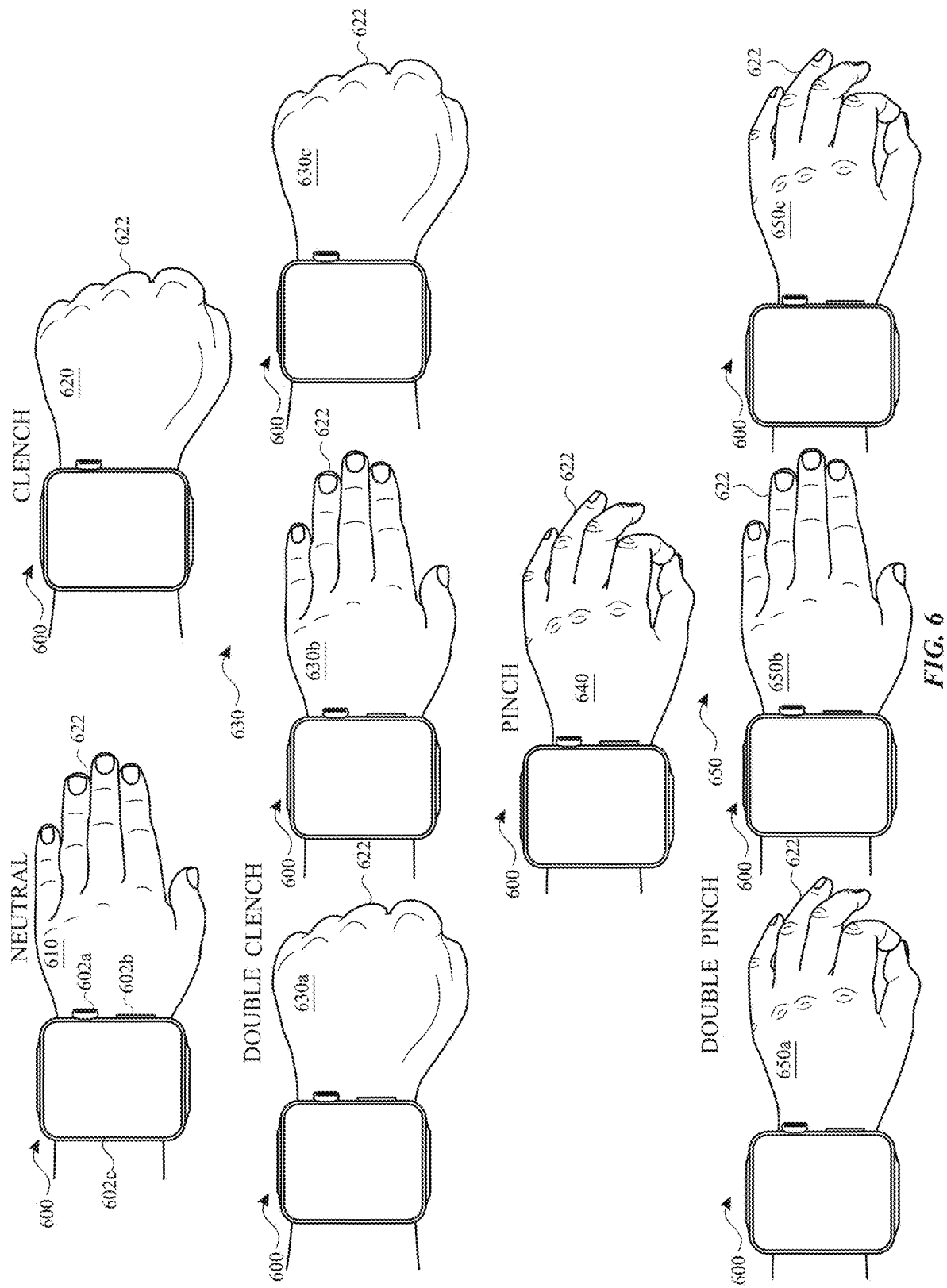
FIG. 6 illustrates an exemplary set of hand gestures, in accordance with some embodiments.
Figure 7A:
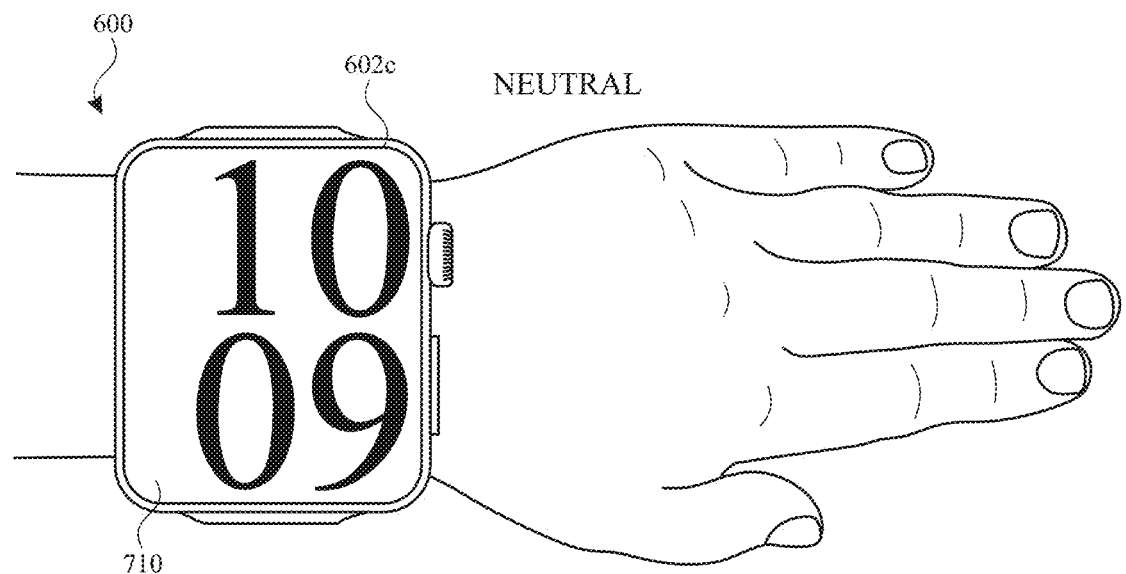
FIGS. 7A-7AA illustrate exemplary user interfaces for navigating user interfaces using hand gestures, in accordance with some embodiments.
Figure 14:
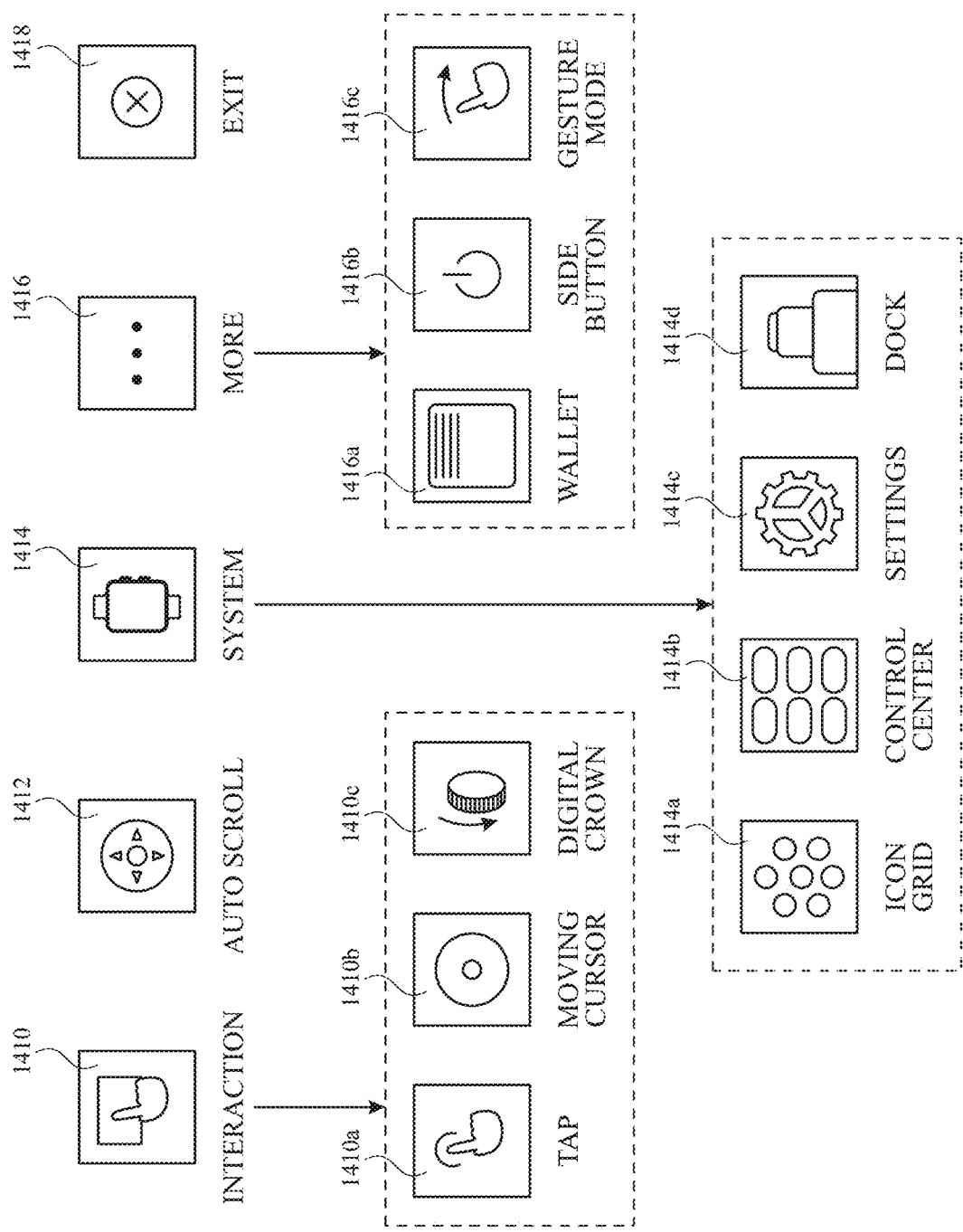
FIG. 14 illustrates exemplary user interfaces for navigating user interfaces using hand gestures, in accordance with some embodiments.
Figure 15:
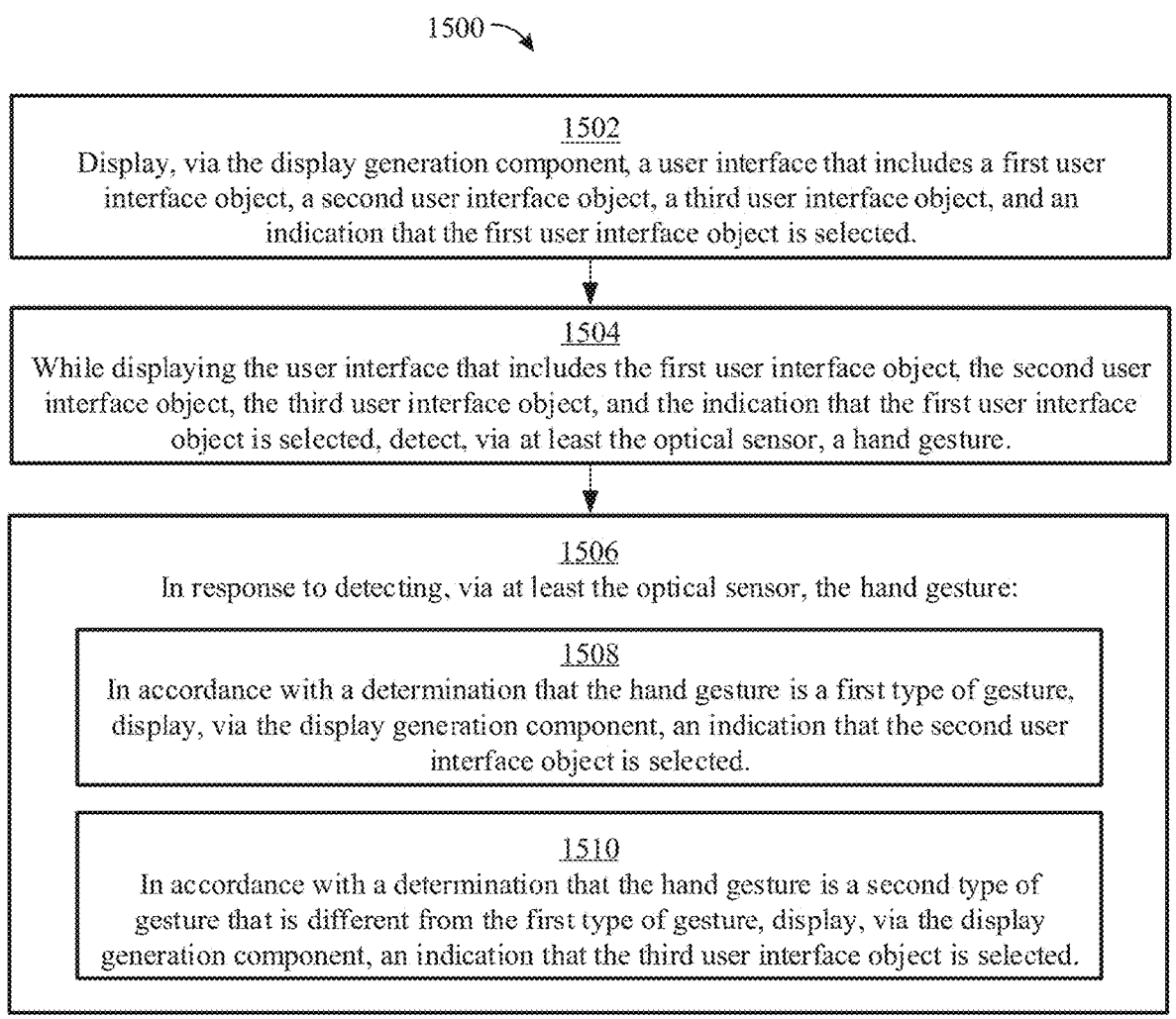
FIG. 15 is a flow diagram illustrating a method for navigating user interfaces using hand gestures, in accordance with some embodiments.
Figure 16:
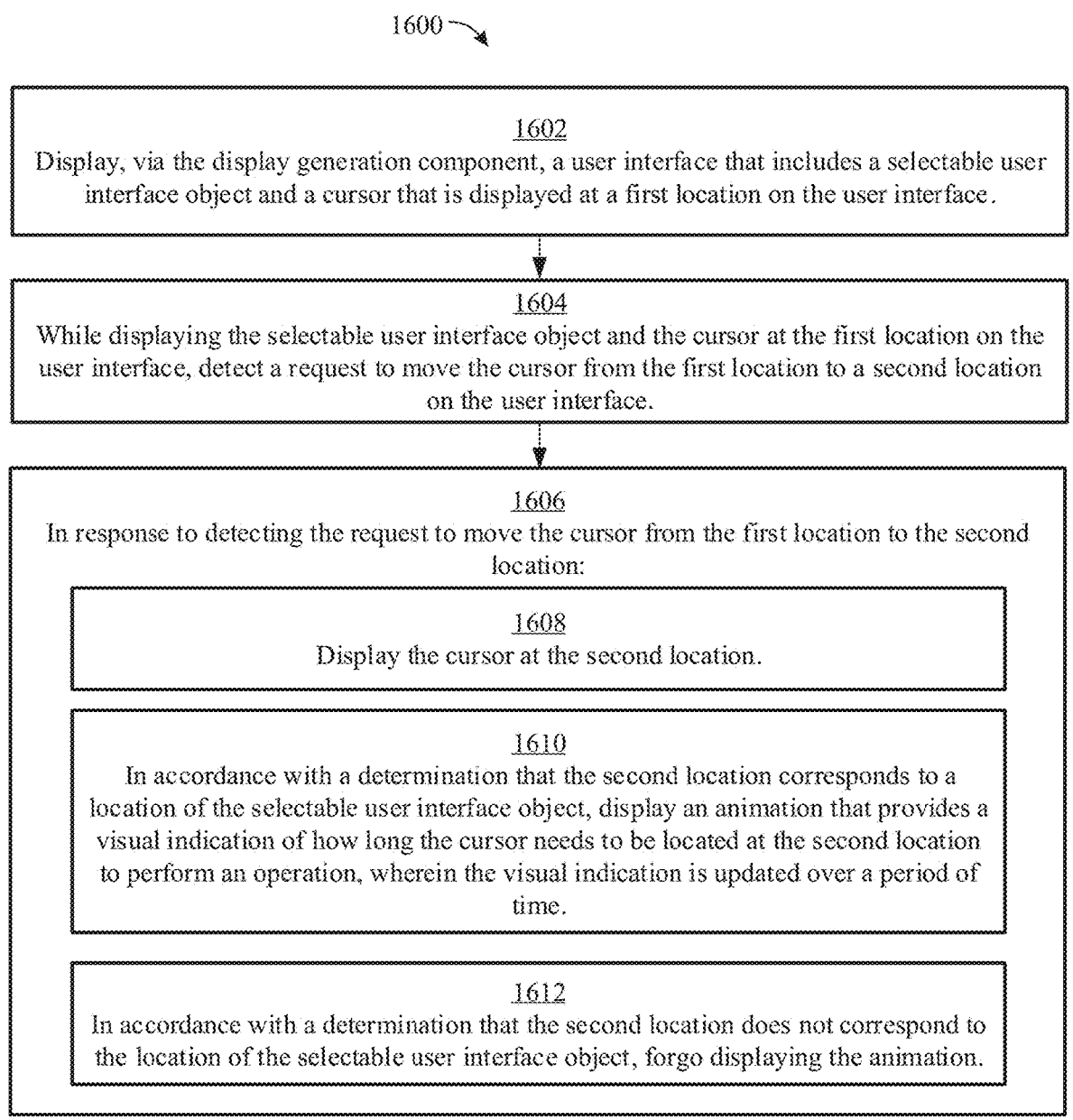
FIG. 16 is a flow diagram illustrating a method for navigating user interfaces using hand gestures, in accordance with some embodiments.

Below, FIGS. 1A-1B, 2, 3, 4A-4B, and 5A-5B provide a description of exemplary devices for performing the techniques for navigating user interfaces using hand gestures. FIG. 6 illustrates an exemplary set of hand gestures, in accordance with some embodiments. FIGS. 7A-7AA illustrate exemplary user interfaces for navigating user interfaces using hand gestures, in accordance with some embodiments. FIGS. 8A-8J illustrate exemplary user interfaces for navigating user interfaces using hand gestures, in accordance with some embodiments. FIGS. 9A-9H illustrate exemplary user interfaces for navigating user interfaces using hand gestures, in accordance with some embodiments. FIGS. 10A-10F illustrate exemplary user interfaces for navigating user interfaces using hand gestures, in accordance with some embodiments. FIGS. 11A-11H illustrate exemplary user interfaces for navigating user interfaces using hand gestures, in accordance with some embodiments. FIGS. 12A-12J illustrate exemplary user interfaces for navigating user interfaces using hand gestures, in accordance with some embodiments. FIGS. 13A-13G illustrate exemplary user interfaces for navigating user interfaces using hand gestures, in accordance with some embodiments. FIG. 14 illustrates exemplary user interfaces for navigating user interfaces using hand gestures, in accordance with some embodiments. FIG. 15 is a flow diagram illustrating a method for navigating user interfaces using hand gestures, in accordance with some embodiments. FIG. 16 is a flow diagram illustrating a method for navigating user interfaces using hand gestures, in accordance with some embodiments. The user interfaces in FIG. 6, FIGS. 7A-7AA, FIGS. 8A-8J, FIGS. 9A-9H, FIGS. 10A-10F, FIGS. 11A-11H, FIGS. 12A-12J, FIGS. 13A-13G, and FIG. 14 are used to illustrate the processes described below, including the processes in FIG. 15 and FIG. 16.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
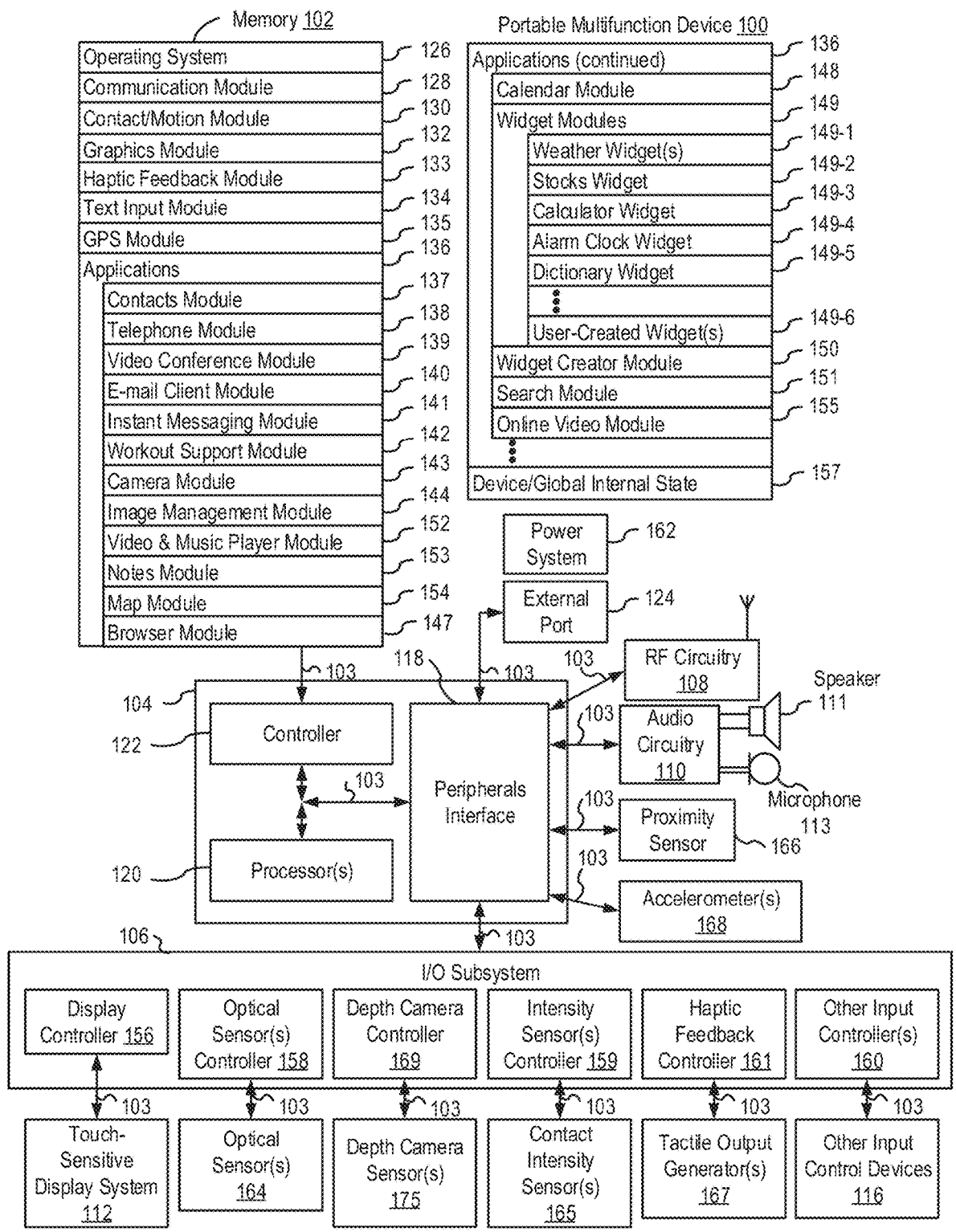
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
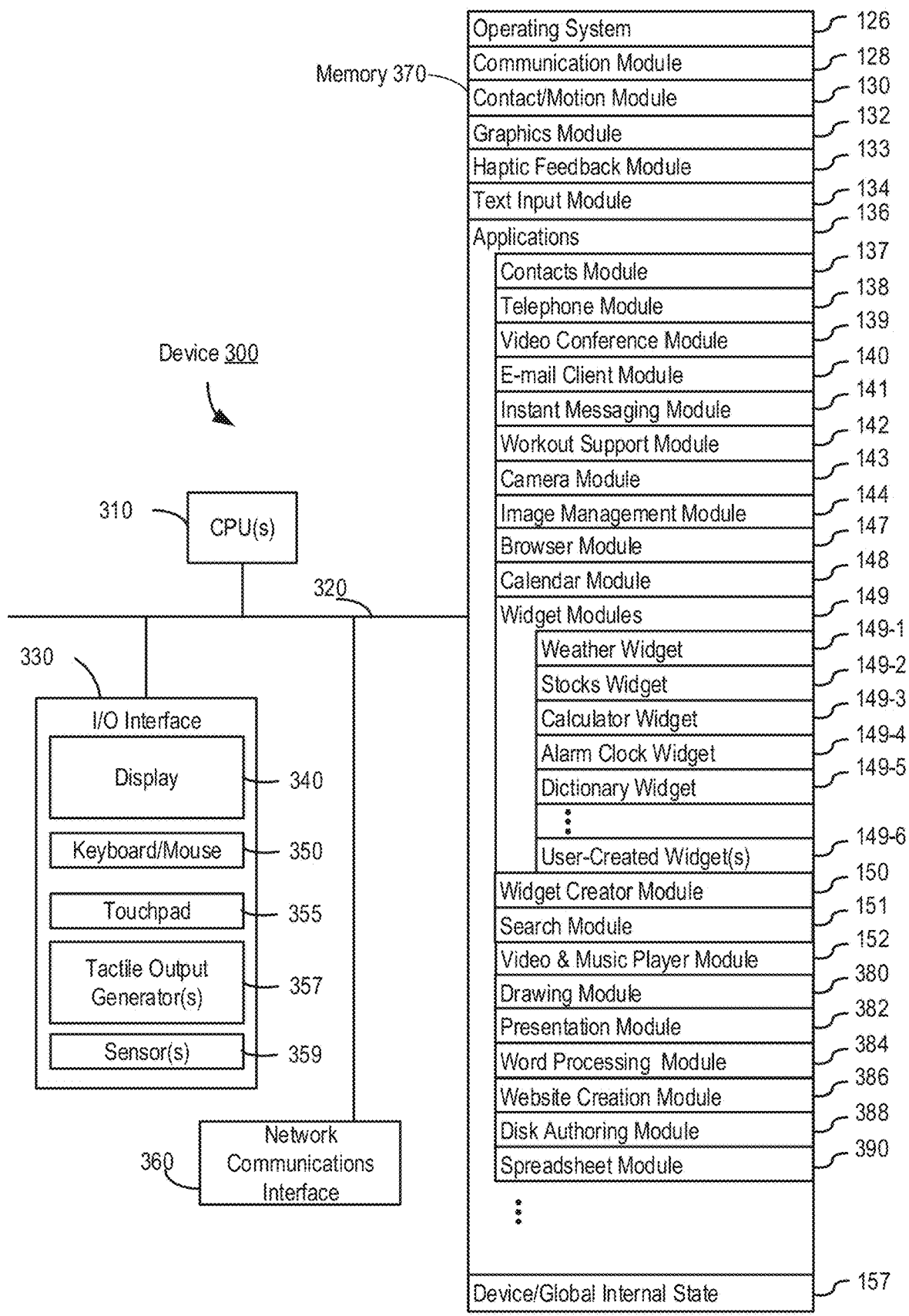
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

Widget creator module 150 for making user-created widgets 149-6;

Search module 151;

Video and music player module 152, which merges video player module and music player module;

Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo!Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
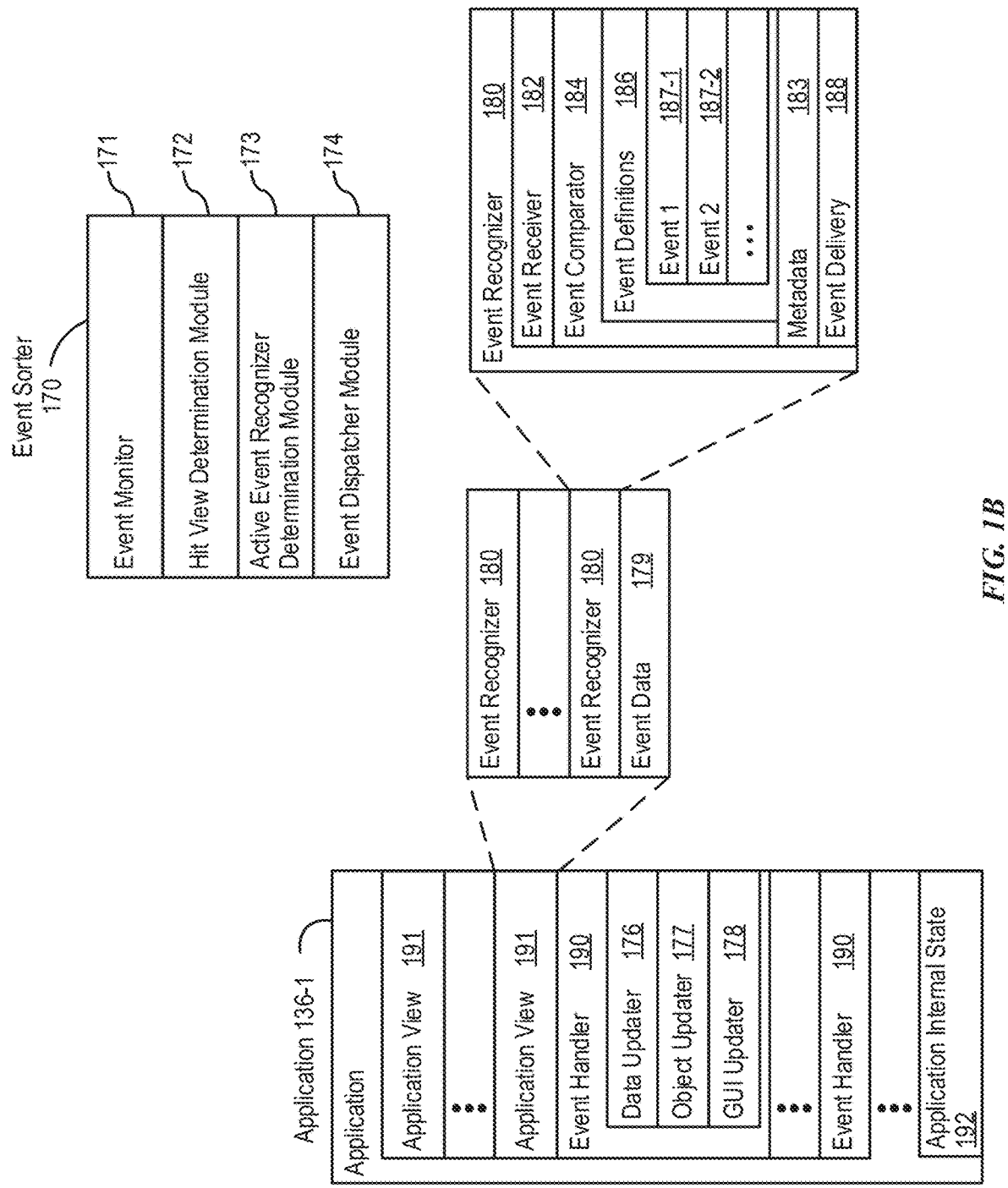
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object.

In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
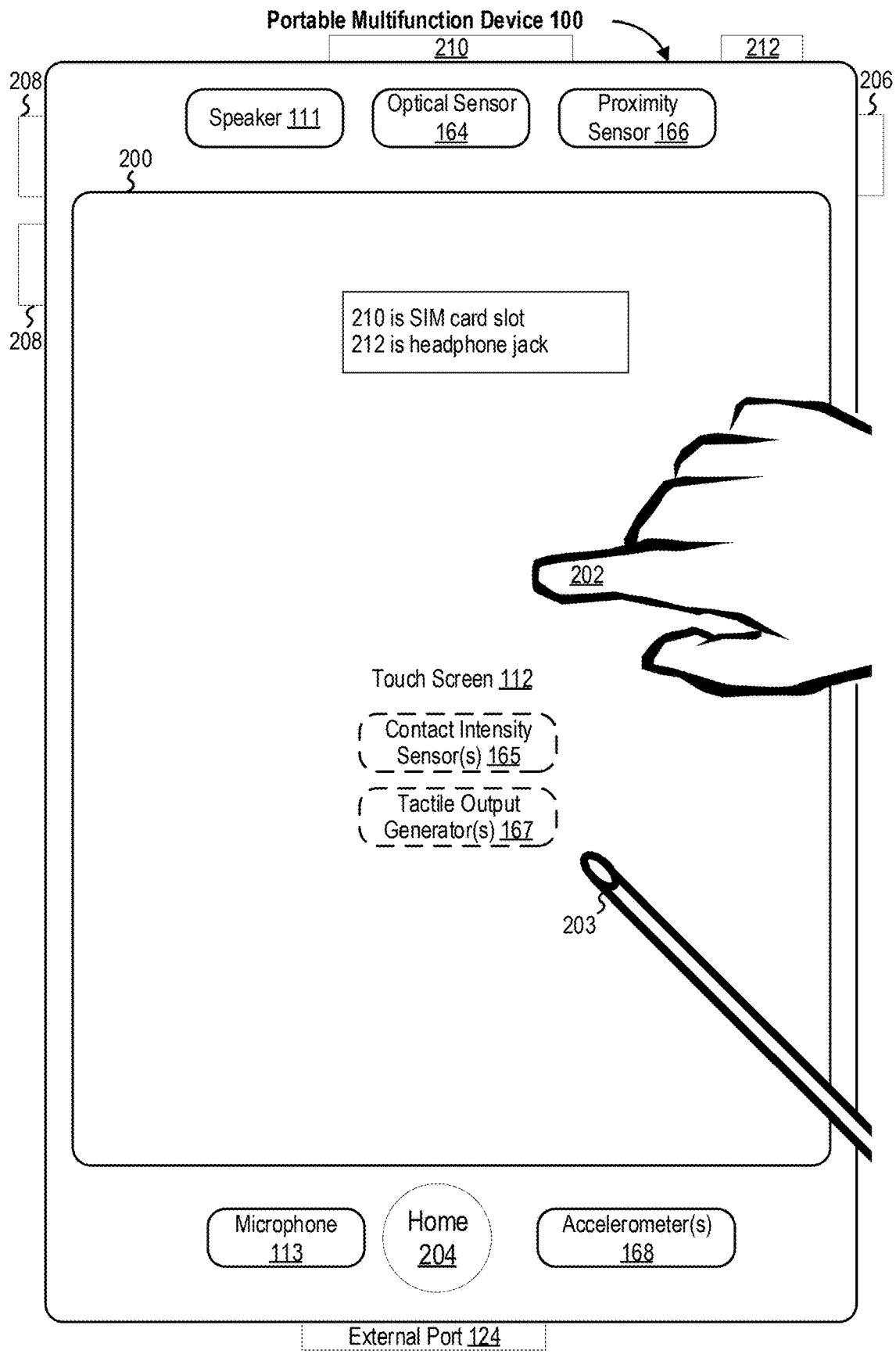
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
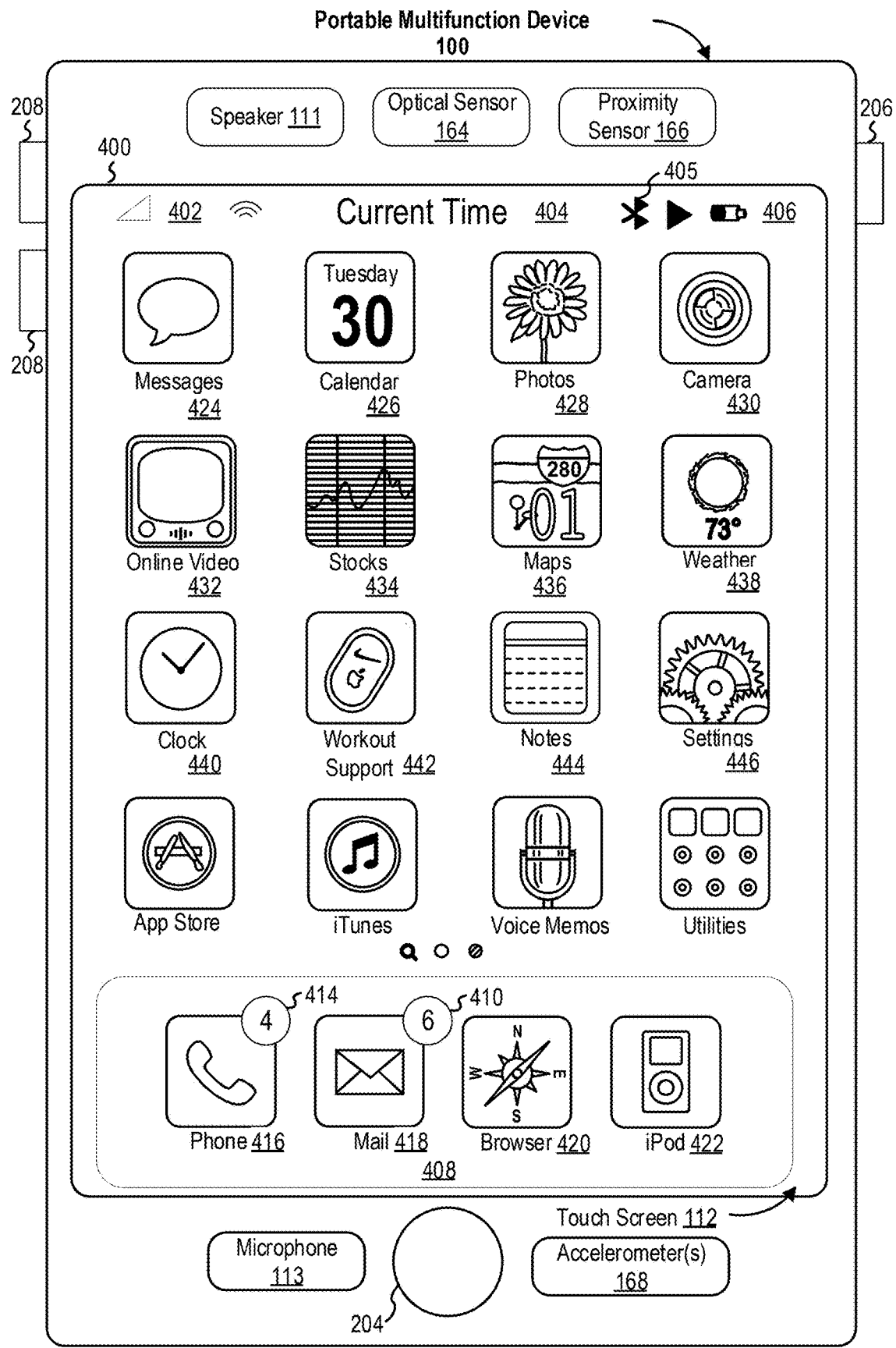
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
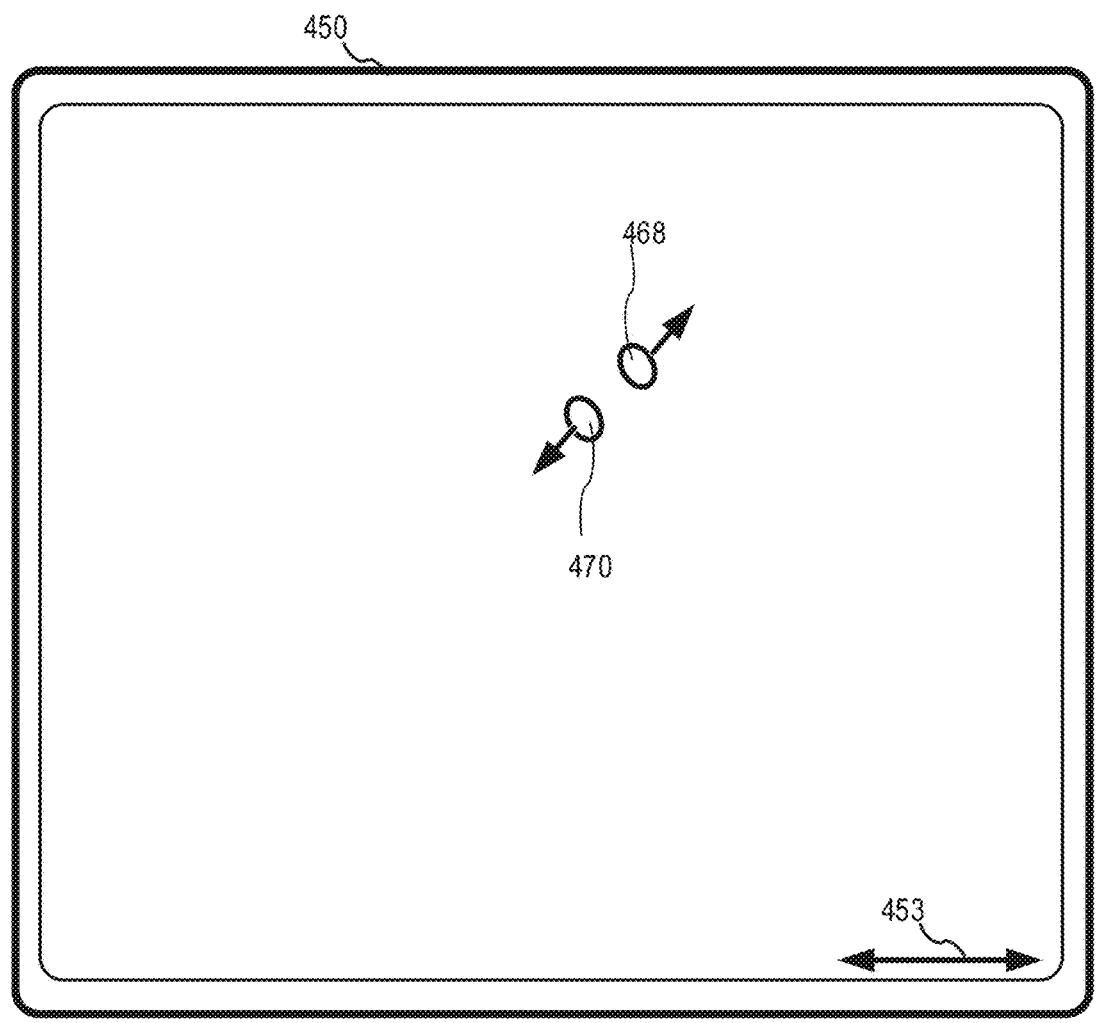
FIG. 4B illustrates an exemplary user interface for a multifunction device with a touch-sensitive surface that is separate from the display in accordance with some embodiments.
Figure 4B:
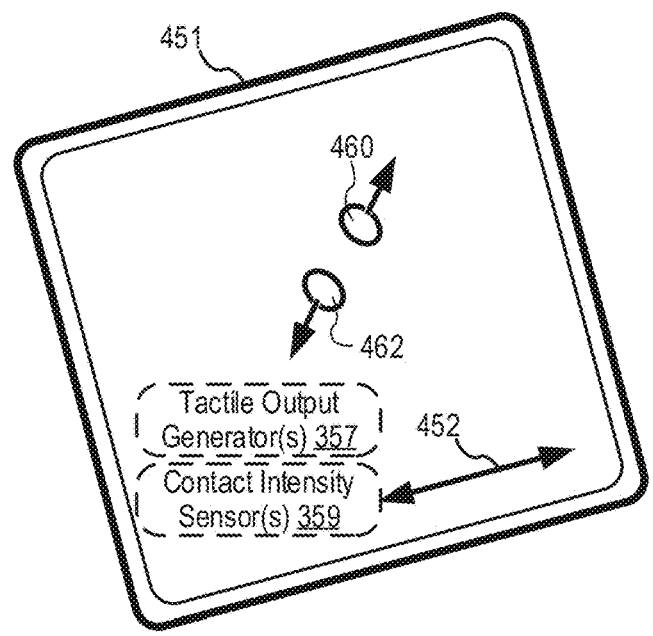

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
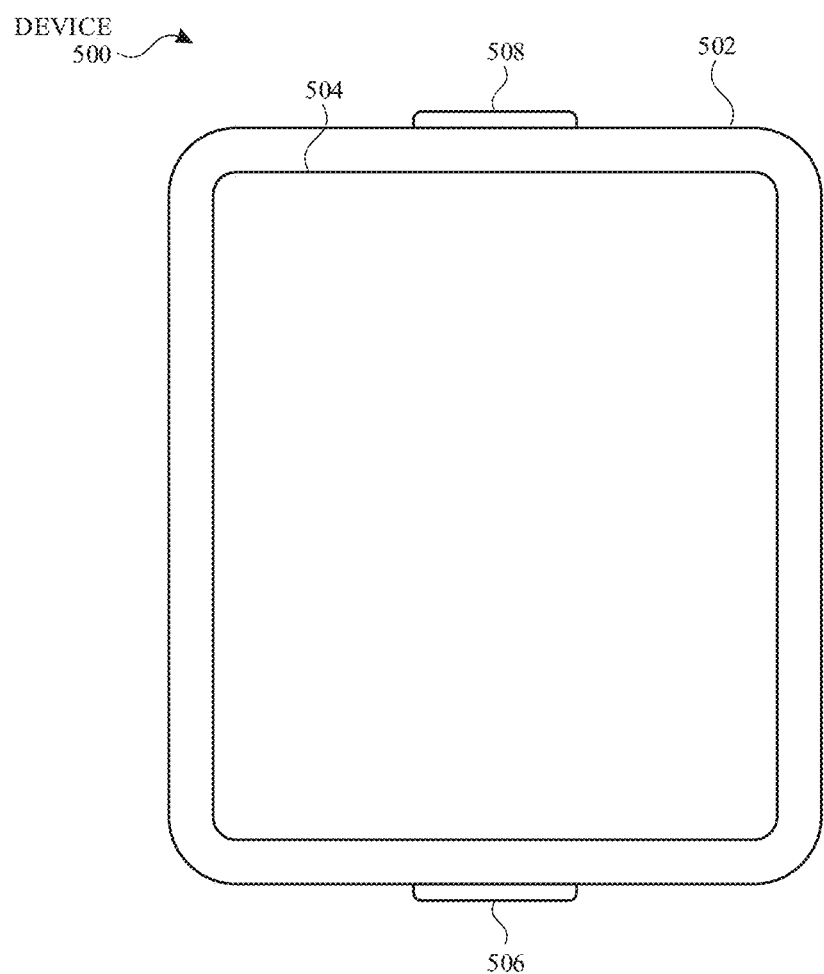
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
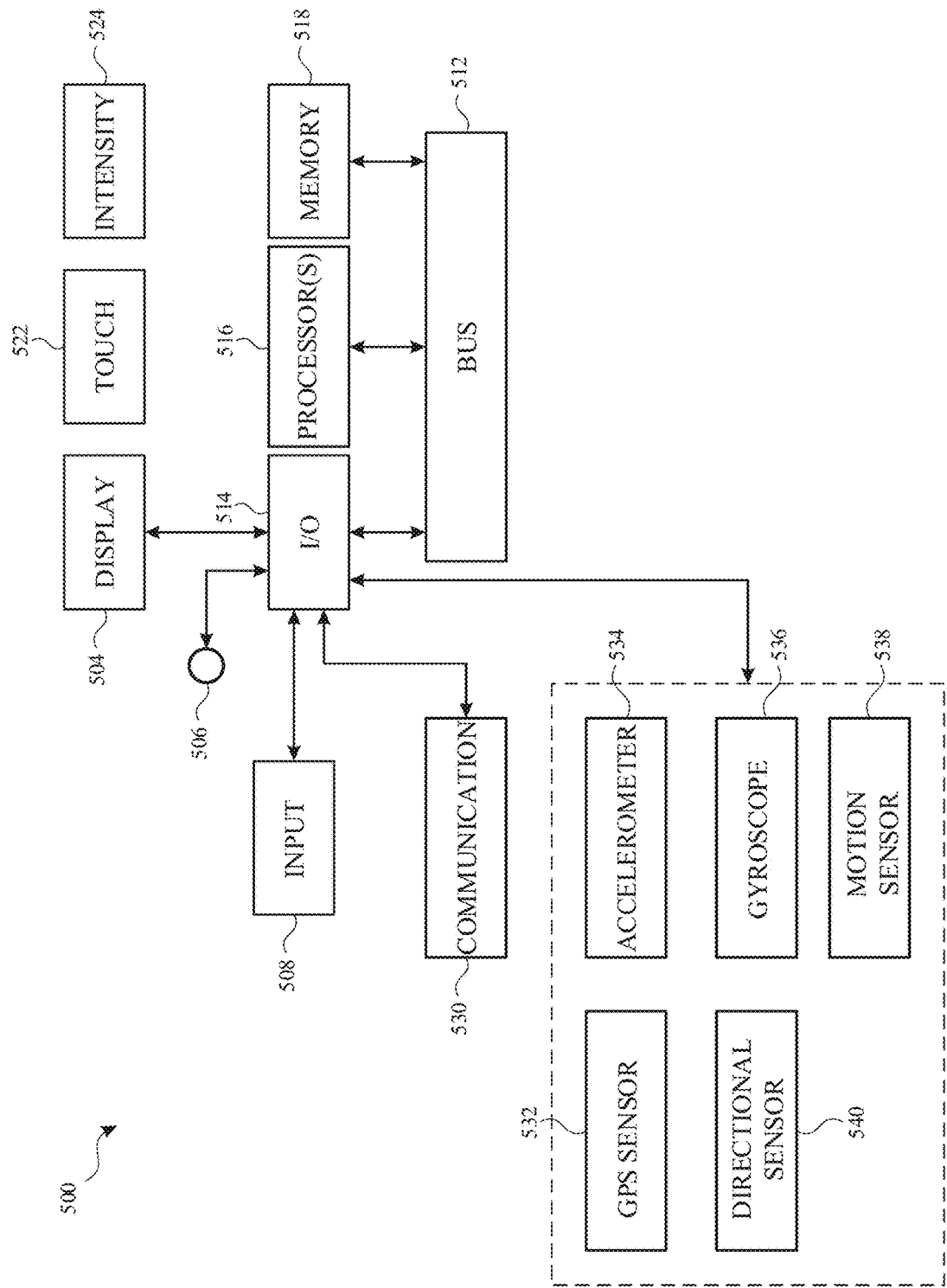
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 1500 and 1600 (FIGS. 15-16). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

FIG. 6 illustrates an exemplary set of hand gestures, in accordance with some embodiments. The user interfaces in these figures are used to illustrate the processes described below, including the processes in FIGS. 15-16.

FIG. 6 illustrates an exemplary set of hand gestures that can be detected by computer system 600. Computer system 600 includes input mechanism 602a (e.g., a crown of a watch), input mechanism 602b (e.g., a side button), and display screen 602c. In some embodiments, computer system 600 includes one or more components of devices 100, 300, and/or 500. In some embodiments, computer system 600 is a wearable device, such as a watch. In some embodiments, input mechanisms 602a and 602b can include one or more components and/or characteristics of input mechanisms 506 and 608 described above in relation to FIG. 5A. In some embodiments, display screen 602c is a touch-sensitive display and includes one or more components and/or characteristics as described above in relation to touch screen 504.

As illustrated in FIG. 6, computer system 600 is being worn around the wrist of a user and is away from hand 622. Computer system 600 includes one or more accelerometers, gyroscopes, and/or biometric sensors to detect the various hand gestures and/or movement (e.g., such as tilting) of computer system 600. At FIG. 6, one or more of the biometric sensors include an optical sensor and/or heart rate sensor that computer system 600 utilizes to detect various hand gestures. In some embodiments, computer system 600 can detect hand gestures using one or more sensors that are different from an optical/heart rate sensor.

FIG. 6 illustrates exemplary hand gestures that can be detected by computer system 600 (e.g., via an optical/heart rate sensor). As illustrated in FIG. 6, the hand gestures include neutral gesture/position 610, clench gesture 620, double clench gesture 630, pinch gesture 640, and double pinch gesture 650. While these hand gestures (e.g., 610, 620, 630, 640, and 650) are discussed throughout this application, hand gestures (e.g., multi-finger tap hand gestures and/or triple (quadruple, quintuple) clench/pinch gestures) and one or more combinations of these hand gestures are contemplated as being detectable by computer system 600 (e.g., via an optical/heart rate sensor) and/or used to perform one or more operations as described below. Thus, the hand gestures provided herein are for exemplary purposes only, and the embodiments described herein are not limited to these particular hand gestures. In addition, the hand gestures described herein are not directed to (e.g., is not captured by) one or more cameras of computer system 600. In addition, the hand gestures described herein do not contact display screen 602c and/or are not performed in front of display screen 602c (e.g., in order for the hand gestures to be detected by computer system 600).

As illustrated in FIG. 6, neutral hand gesture/position 610 is a hand gesture/position, where none of the fingertips of hand 622 are touching any portion of hand 622. Clench gesture 620 is a hand gesture, where one or more the fingers of hand 622 are touching another portion of the hand of the user, such that the palm of a user's hand when the user is forming a fist. Double clench gesture 630 is a combination (and/or sequence) of neutral gesture/position 610 and clench gesture 620, where the fingers of hand 622 are closed to form a first clench gesture (e.g., first portion 630a), opened to form a neutral gesture/position (e.g., second portion 630*b*), and closed again to form a second clench gesture (e.g., third portion 630*c*). Thus, a double clench gesture is a gesture that includes multiple (e.g., two) instances (e.g., first portion 630*a* and third portion 630*c*) of a clench gesture that are detected within a predetermined period of time (e.g., 0-2 seconds). Pinch gesture 640 is a hand gesture, where one or more of the fingers of hand 622 are touching (e.g., two fingers) each other. A pinch gesture is different from a clench gesture because a fist is not formed when making a pinch gesture while the first is formed when making a clench gesture. Double pinch gesture 650 is a combination (and/or sequence) of neutral gesture/position 610 and pinch gesture 640, where the fingers of hand 622 touch to form a first pinch gesture (e.g., first portion 650*a*), opened to form a neutral gesture/position (e.g., second portion 650*b*), and closed again to form a second pinch gesture (e.g., third portion 650*c*). Thus, a double pinch gesture is a gesture that includes multiple (e.g., two) instances (e.g., first portion 650*a* and third portion 650*c*) of a pinch gesture that are detected with a period that are detected within a predetermined period of time (e.g., 0-2 seconds). As illustrated in FIG. 6, double clench gesture 630 and clench gesture 620 do not include multiple instances of pinch gesture 640, and double pinch gesture 650 and pinch gesture 640 do not include multiple instances of clench gesture 620. In some embodiments, when two pinch gestures are detected within a predetermined period of time, computer system 600 registers (or detects) the two gestures as being a double pinch gesture. In some embodiments, when two pinch gestures are not detected within a predetermined period of time, computer system 600 registers (or detects) the two gestures as being two individual pinch gestures (e.g., without registering a double pinch gesture). In some embodiments, when two clench gestures are detected within a predetermined period of time, computer system 600 registers (or detects) the two gestures as being a double clench gesture. In some embodiments, when two clench gestures are not detected within a predetermined period of time, computer system 600 registers (or detects) the two gestures as being two individual clench gestures (e.g., without registering a double clench gesture).

FIGS. 7A-7AA illustrate exemplary user interfaces for navigating user interfaces using hand gestures, in accordance with some embodiments. The user interfaces in these figures are used to illustrate the processes described below, including the processes in FIGS. 15-16.

Figure 7B:
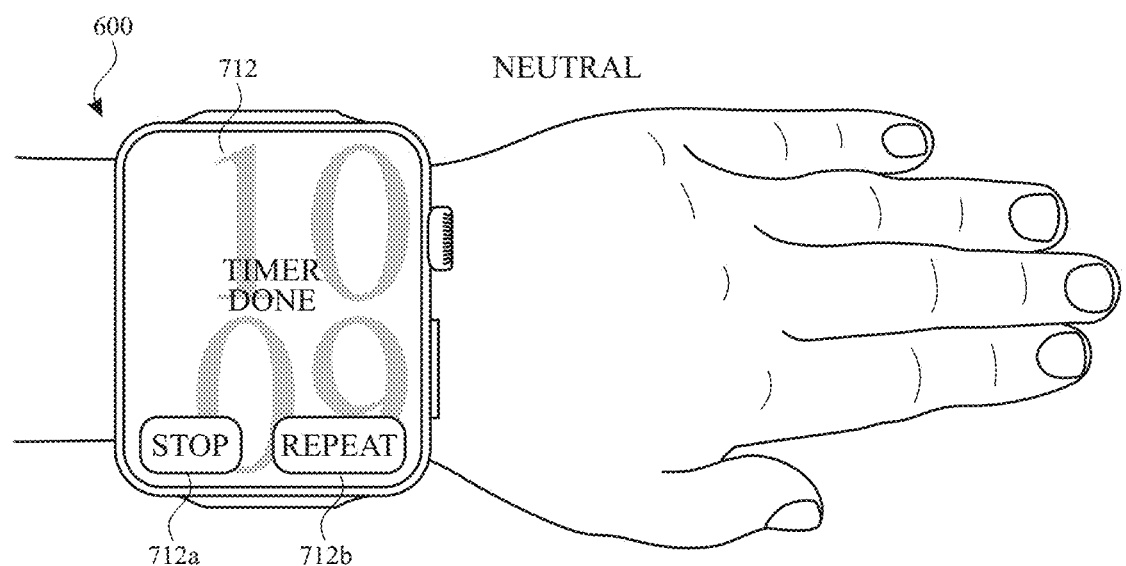
Figure 7C:
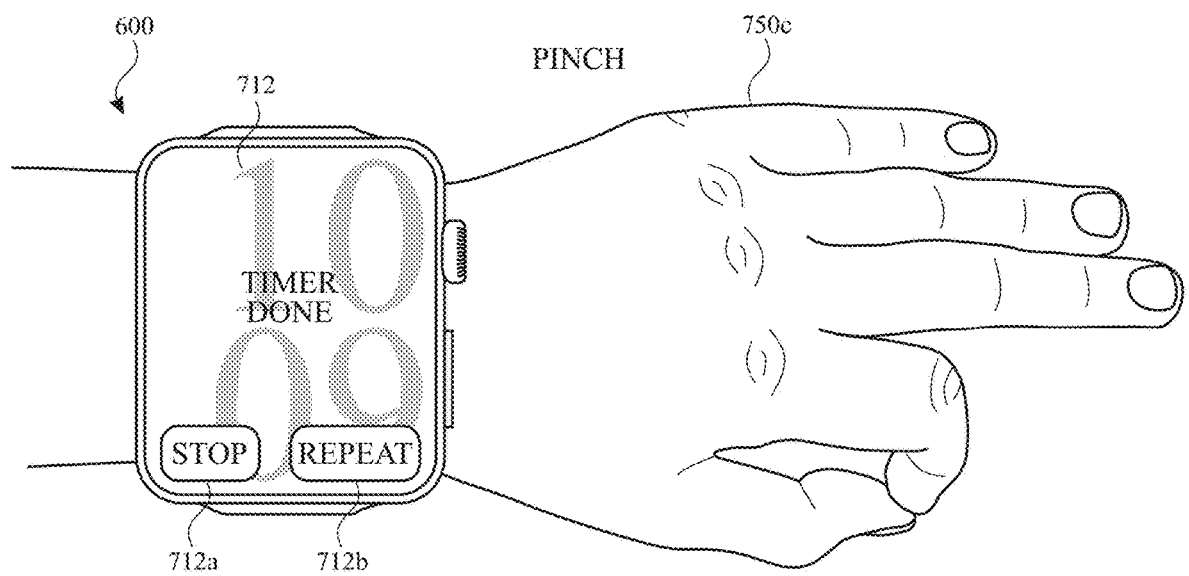
Figure 7D:
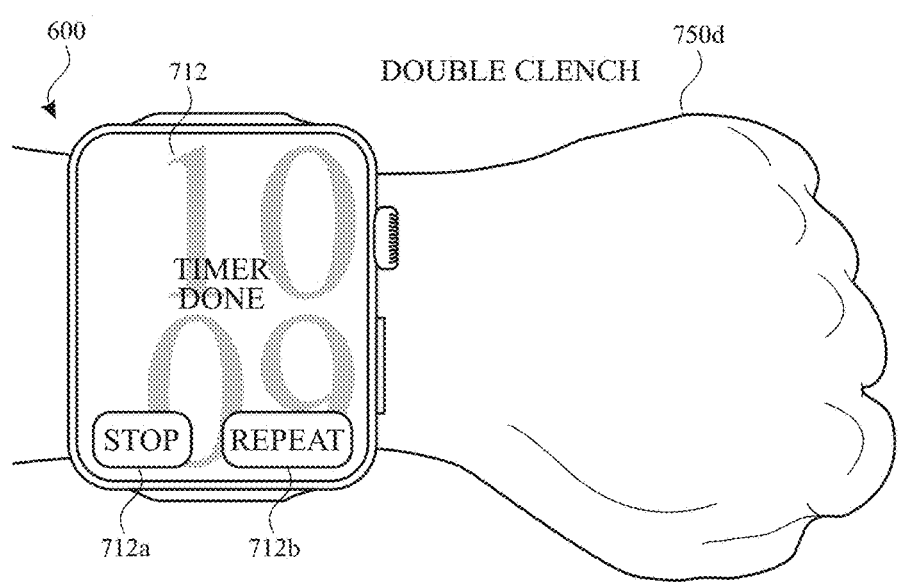
Figure 7E:
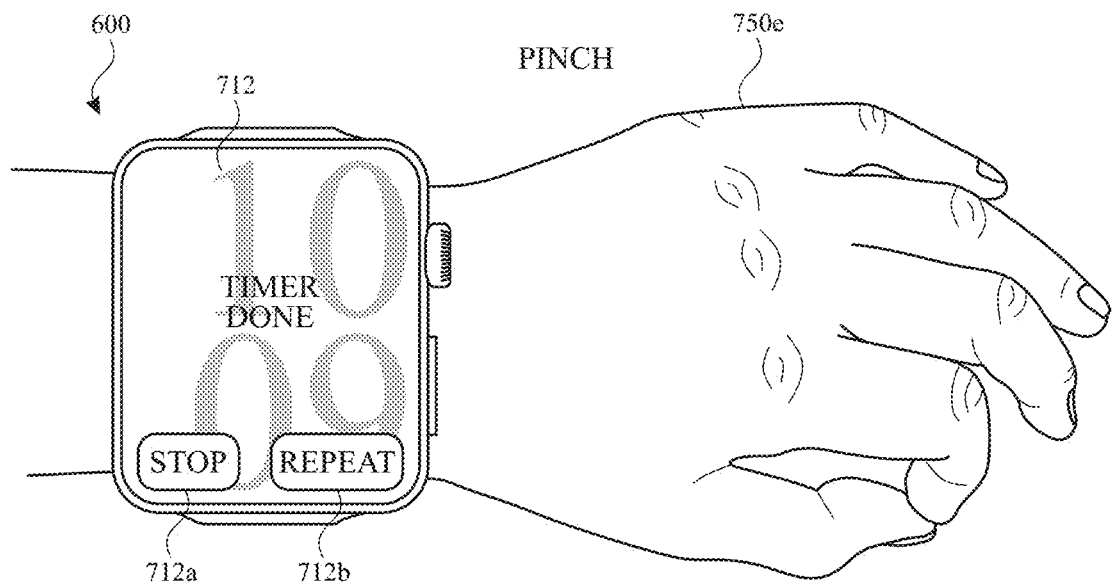

FIGS. 7A-7G illustrate exemplary user interfaces for responding to an incoming alert (e.g., timer alert) using hand gestures. FIG. 7A illustrates computer system 600 displaying clock user interface 710 on display screen 602*c*, which includes a current time (e.g., 10:09). While computer system 600 is displaying clock user interface 710, hand 622 is in the neutral position (e.g., 610 in FIG. 6). At FIG. 7A, computer system 600 receives an incoming alert from a timer application (e.g., that is installed on computer system 600). As illustrated in FIG. 7B, in response to receiving the incoming alert from the timer application, computer system 600 displays timer user interface 712. Timer user interface 712 includes stop control 712*a* (e.g., that, when activated, causes computer system 600 to stop outputting an audible sound related to the incoming alert) and repeat control 712*b* (e.g., that, when activated, causes computer system 600 to repeat the timer that is related to the incoming alert) and an indication that a timer has completed (e.g., "TIMER DONE"). At FIG. 7C, computer system 600 detects pinch gesture 750*c*. However, as illustrated in FIG. 7D, computer system 600 maintains display of timer user interface 712 and does not perform any operations in response to pinch gesture 750*c* because computer system 600 is not operating in a hand gesture navigation mode (e.g., and/or an accessibility mode). In some embodiments, computer system 600 does not detect pinch gesture 750*c* because computer system 600 is not operating in a hand gesture navigation mode.

Figure 7F:
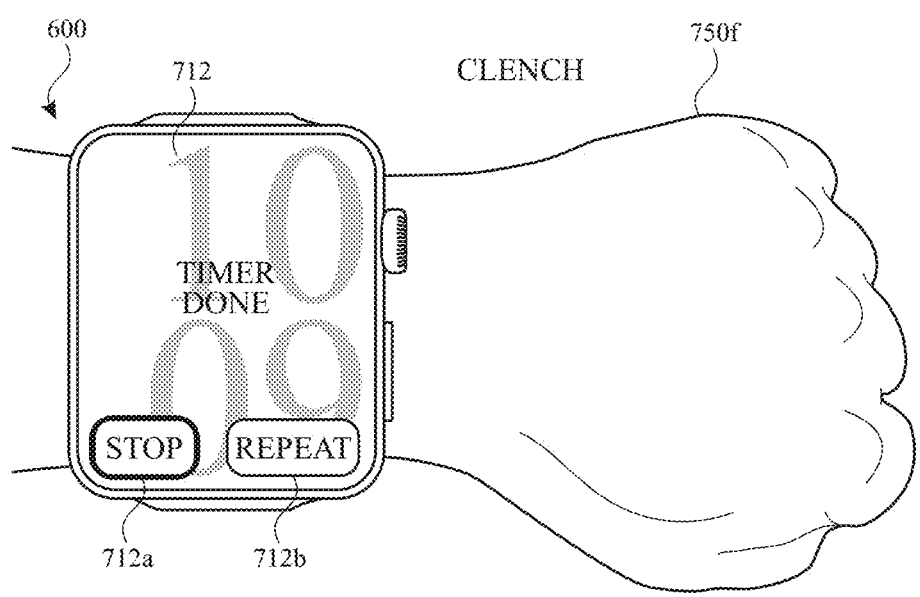
Figure 7G:
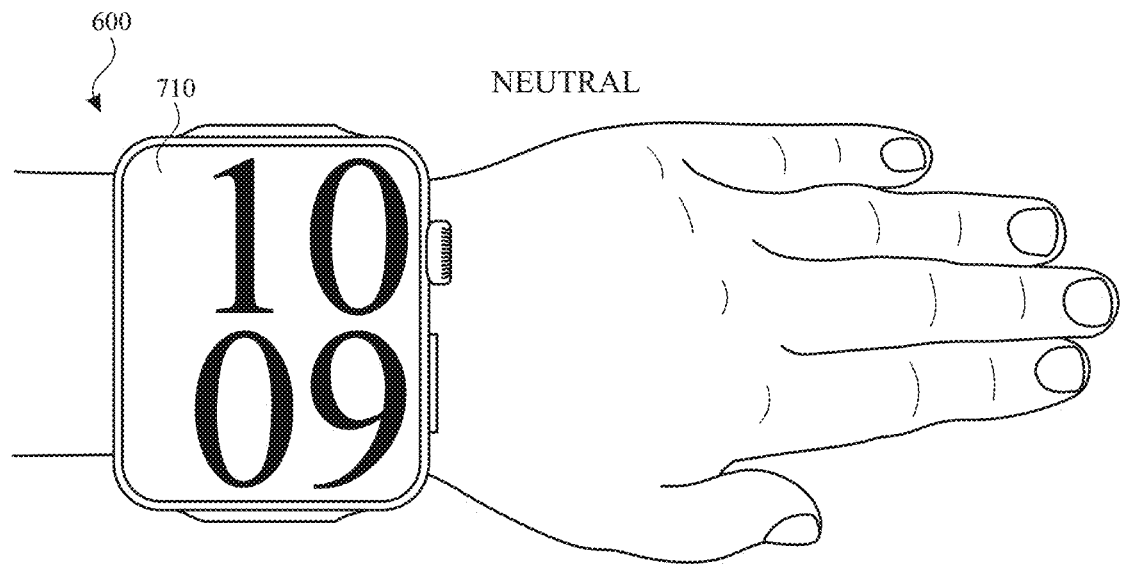

At FIG. 7D, computer system 600 detects double clench gesture 750*d*. At FIG. 7E, in response to detecting double clench gesture 750*d*, computer system 600 begins operating in a hand gesture navigation mode. At FIG. 7E, computer system 600 detects pinch gesture 750*e* (e.g., a second pinch gesture). As illustrated in FIG. 7F, in response to detecting pinch gesture 750*e*, computer system 600 displays a focus indicator around stop control 712*a* because computer system 600 is operating in the hand gesture navigation mode. Computer system 600 displays the focus indicator around stop control 712*a* to indicate that stop control 712*a* can be activated in response to computer system 600 detecting a particular hand gesture. In contrast, computer system 600 is not displaying a focus indicator around repeat control 712*b* in FIG. 7F. Thus, repeat control 712*b* cannot be activated in response to computer system 600 detecting a particular hand gesture (e.g., before repeat control 712*b* is displayed with a focus indicator). At FIG. 7F, computer system 600 detects clench gesture 750*f*. At FIG. 7G, in response to detecting clench gesture 750*f*, computer system 600 activates stop control 712*a*. Upon activating stop control 712*a*, computer system 600 ceases to display timer user interface 712, ceases to output audible sound related to the incoming alert, and re-displays clock user interface 710 (e.g., as illustrated in FIG. 7G).

Figure 7H:
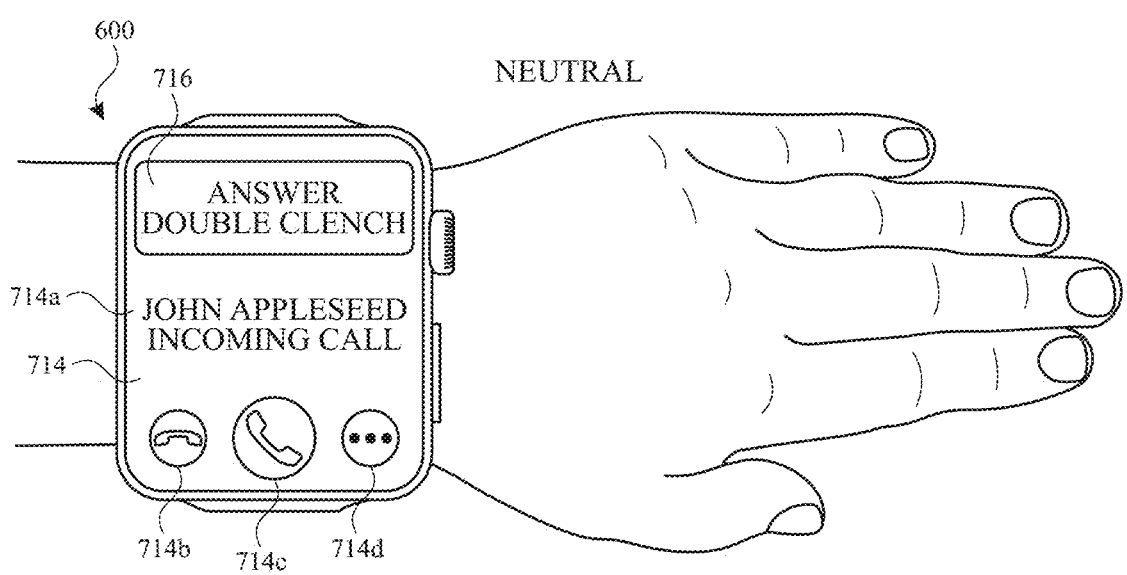

FIGS. 7G-7J illustrate exemplary user interfaces for responding to an incoming alert (e.g., incoming call) using hand gestures. As discussed above, FIG. 7G illustrates computer system 600 displaying clock user interface 710 while operating in the hand gesture navigation mode. At FIG. 7G, computer system 600 receives an alert that corresponds to an incoming phone call. As illustrated in FIG. 7H, in response to receiving the alert, computer system 600 displays phone user interface 714 that includes call identifier 714*a* (e.g., "JOHN APPLESEED INCOMING CALL"), which indicates that computer system 600 is receiving an incoming call from John Appleseed. Phone user interface 714 also includes decline control 714*b* (e.g., that, when activated, causes computer system 600 to decline the phone call), answer control 714*c* (e.g., that, when activated, causes computer system 600 to answer the phone call), and additional options control 714*d* (e.g., that, when activated, causes computer system 600 to display additional options for responding to the incoming phone call). As illustrated in FIG. 7H, computer system 600 displays hand gesture notification 716, which indicates that a user can answer the phone call by providing a double clench gesture (e.g., instead of providing multiple gestures (e.g., one or more pinch gestures to navigate to answer control 714*c* and a clench gesture to navigate to answer control 714*c*, using one or more techniques as discussed in relation to FIGS. 7C-7G) to answer the phone call). In some embodiments, computer system 600 displays hand gesture notification 716 because a determination is made that computer system 600 is operating in a hand gesture navigation mode and/or computer system 600 is operating in a use context where a particular type of operation (e.g., answering a phone call, stopping an alarm, and/or replying to a text message) can be completed via a single hand gesture (e.g., a predetermined hand gesture). In some embodiments, computer system 600 displays other and/or different hand gesture notifications (e.g., from hand gesture 716) to inform the user that one or more other gestures can be used to perform an operation.

Figure 7I:
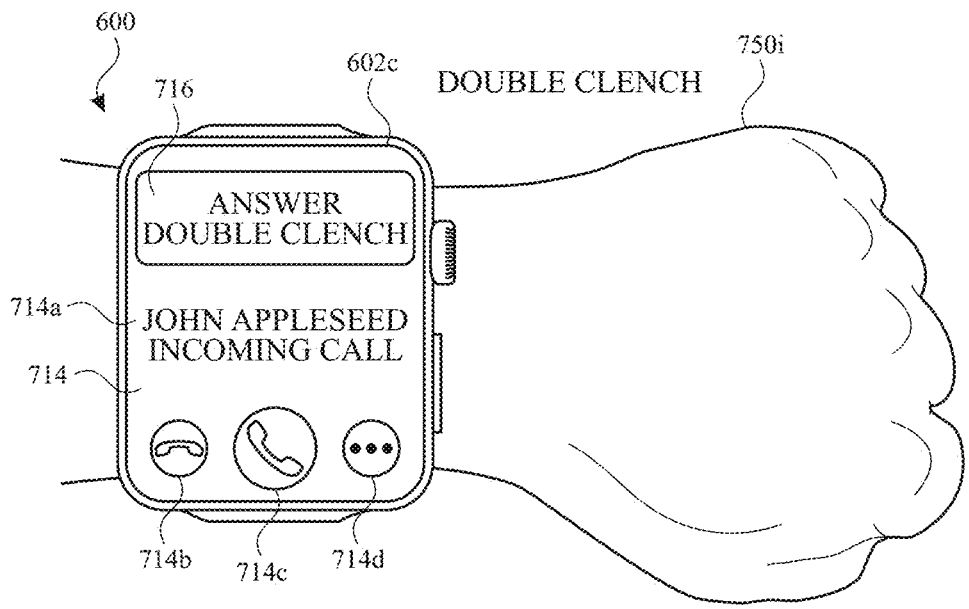
Figure 7J:
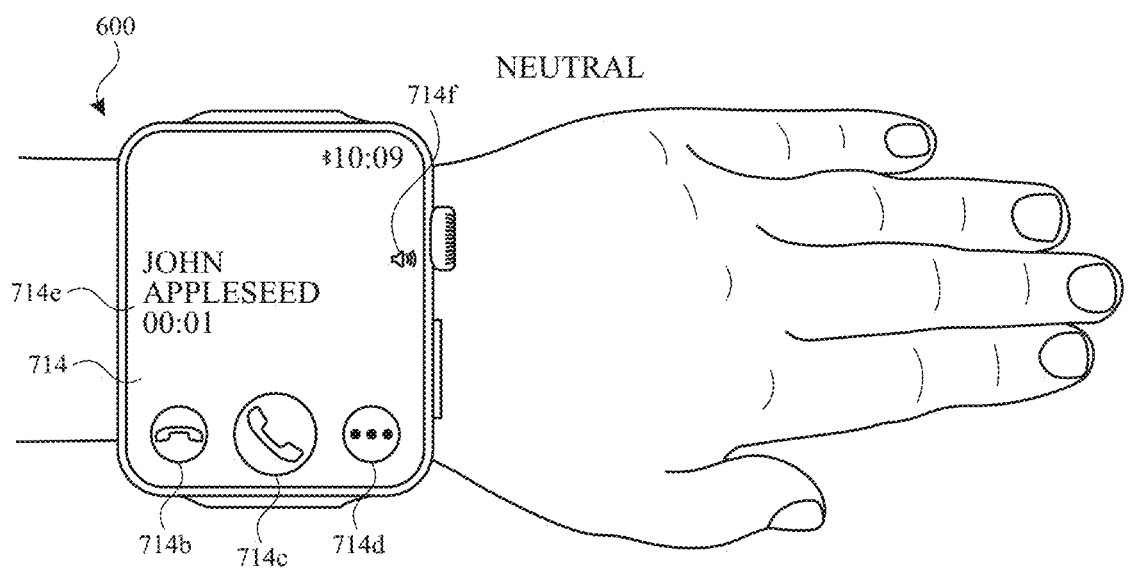

At FIG. 7I, computer system 600 detects double clench gesture 750*i*. As illustrated in FIG. 7J, in response to detecting double clench gesture 750*i*, computer system 600 replaces call identifier 714*a* with elapse time indicator 714*e*, which indicates that the incoming phone call has been answered, and display volume control 714*f* (e.g., that, when activated, causes the volume level of one or more speakers of computer system 600 to be adjusted). In other words, in response to detecting double clench gesture 750*i*, computer system 600 answers the incoming phone call. In some embodiments, computer system 600 performs a different operation (e.g., as discussed in relation to FIGS. 7D-7E and 7L-7M) in response to detecting a double clench gesture while an incoming alert is not being received (and/or has not been received within a predetermined period of time) than the operation that is performed (e.g., as discussed in relation to FIGS. 7I-7L) while an incoming alert is being received (e.g., and/or has been received within a predetermined period of time).

Figure 7K:
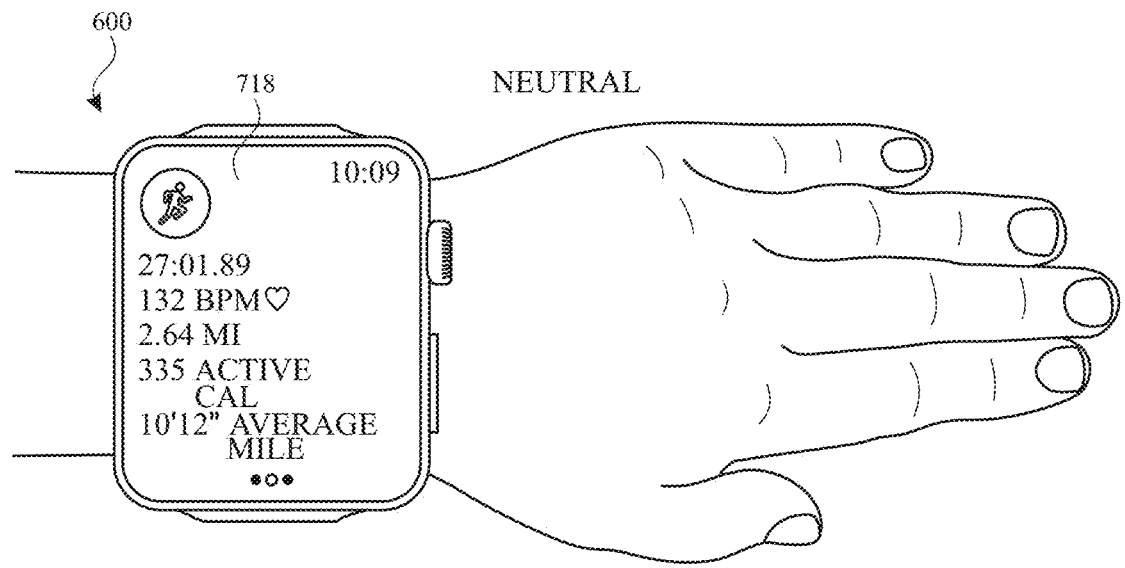
Figure 7L:
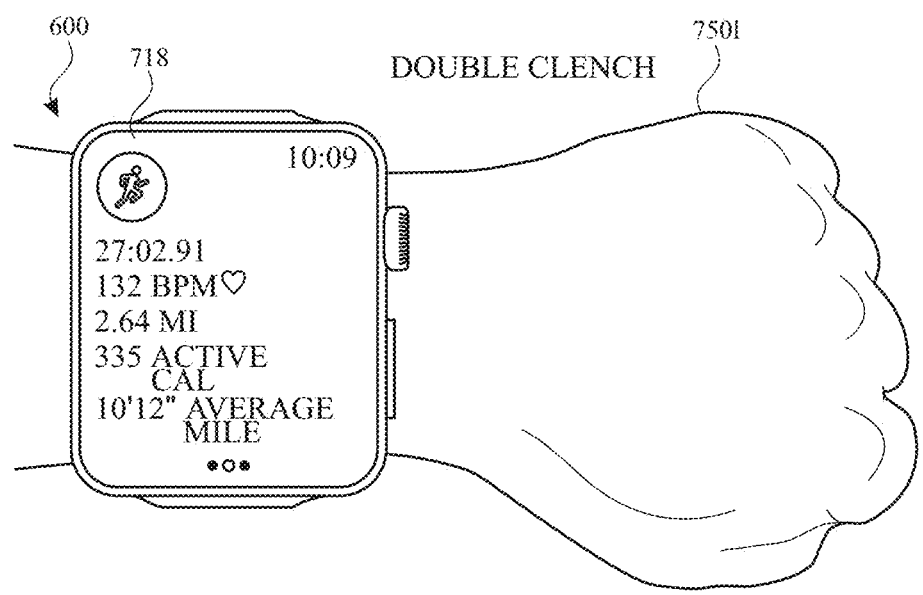
Figure 7M:
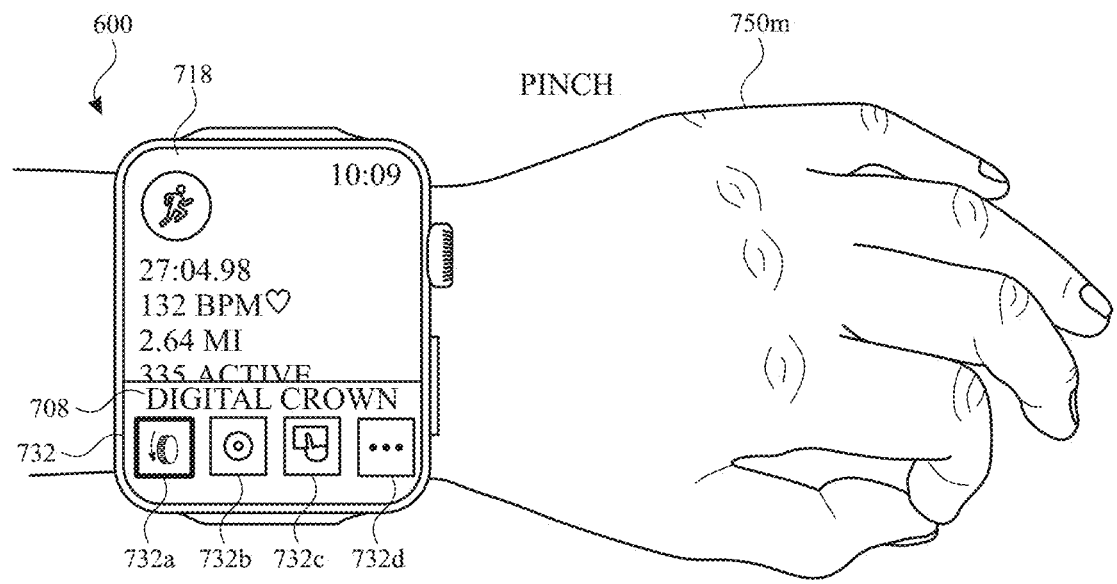

FIGS. 7I-7U illustrate exemplary user interfaces for navigating a user interface using hand gestures and a moving cursor. In particular, FIGS. 7I-7U illustrate an exemplary scenario where a workout tracker is ended using hand gestures and a moving cursor. FIG. 7K illustrates computer system 600 displaying workout user interface 718 that includes a list of workout metrics. While displaying workout user interface 718, computer system 600 detects double clench gesture 750*l* at FIG. 7L. As illustrated in FIG. 7M, in response to detecting double clench gesture 750*l*, computer system 600 displays menu 732 that includes digital hardware operation control 732*a*, moving cursor control 732*b*, interaction control 732*c*, and additional options control 732*d*. Menu 732 includes control identifier 708 ("DIGITAL CROWN") that identifies the control that is currently in focused (e.g., the black box around digital hardware operation control 732*a* in FIG. 7M). In response to detecting activation of digital hardware operation control 732*a*, computer system 600 begins operating in a digital hardware operation mode (e.g., a different hand gesture navigation mode). In response to detecting activation of interaction control 732*c*, computer system 600 replaces menu 732 with a menu with controls, that when activated, cause computer system 600 to perform different operations that correspond to various gestures being detected at a location on computer system 600 (e.g., as discussed below in relation to FIG. 7Z). In response to detecting activation of additional options control 732*d*, computer system 600 replaces menu 732 with a menu that includes additional controls (e.g., as discussed below in relation to FIG. 7Z).

Figure 7N:
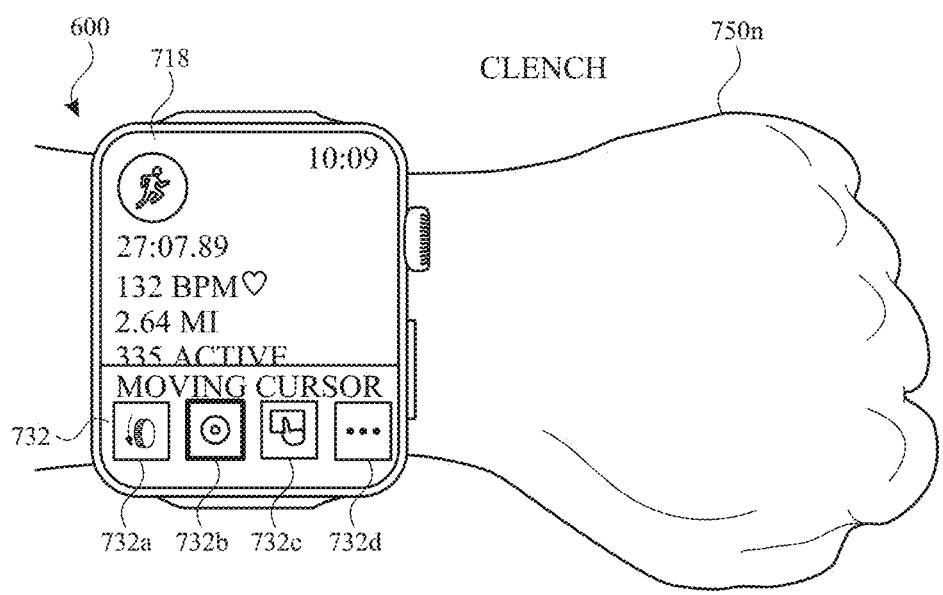

As illustrated in FIG. 7M, in response to detecting double clench gesture 750*l*, computer system 600 displays focus indicator around digital hardware operation control 732*a* to indicate that digital hardware operation control 732*a* can be activated in response to computer system 600 detecting one or more hand gestures. At FIG. 7M, computer system 600 detects pinch gesture 750*m*. As illustrated in FIG. 7N, in response to detecting pinch gesture 750*m*, computer system 600 moves focus indicator to the right, such that the focus indicator is around moving cursor control 732*b* and no longer around digital hardware operation control 732*a*. Notably, in response to detecting pinch gesture 750*m*, computer system 600 moves the focus indicator from one control to the next control (e.g., in terms of location) on a user interface. At FIG. 7N, computer system 600 detects clench gesture 750*n* while focus indicator is displayed around moving cursor control 732*b*.

Figure 7O:
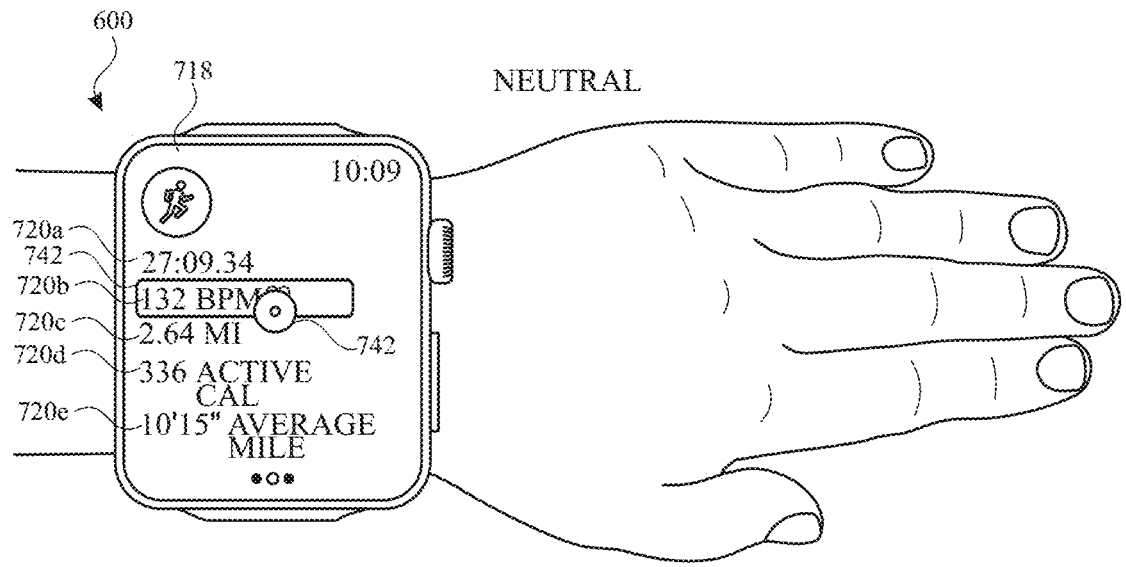
Figure 7P:
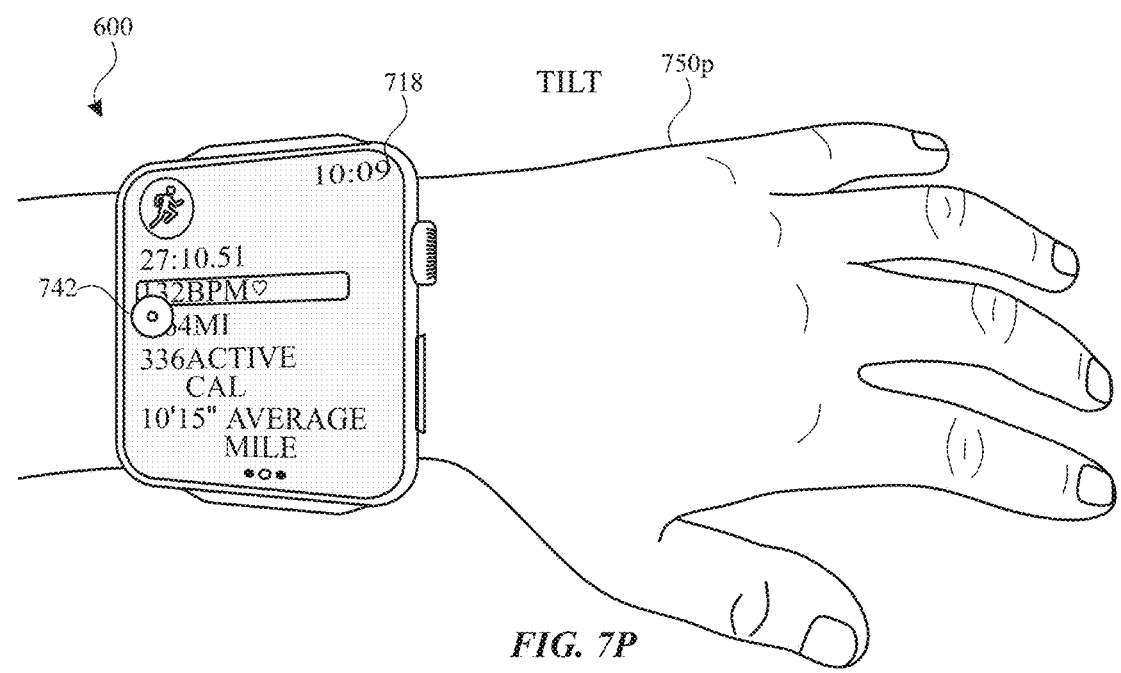
Figure 7Q:
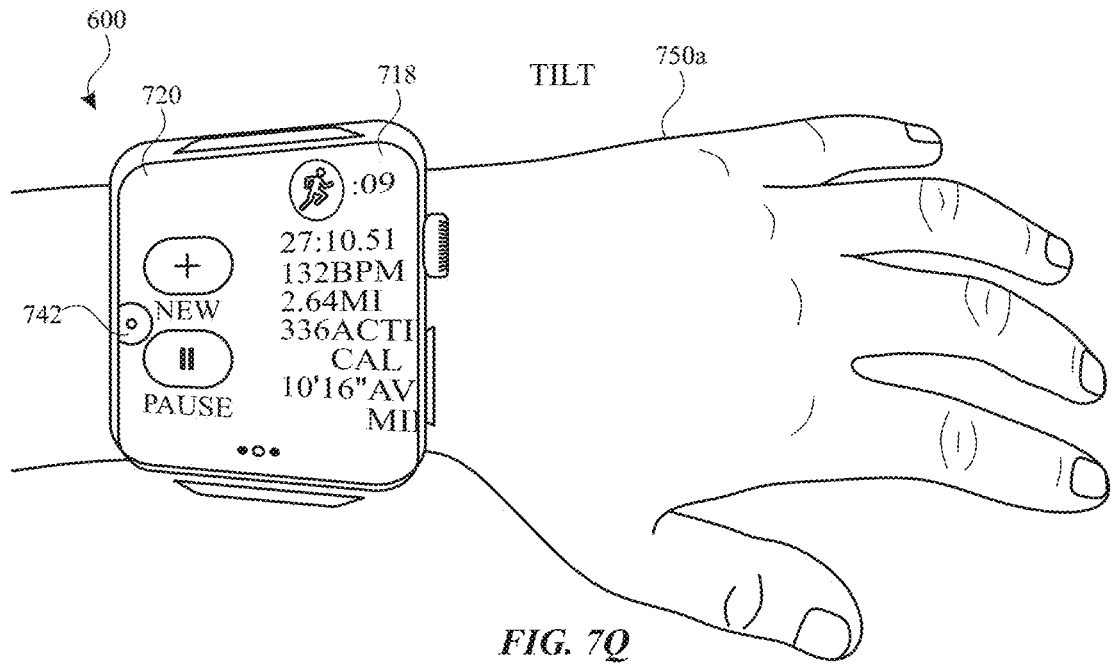
Figure 7R:
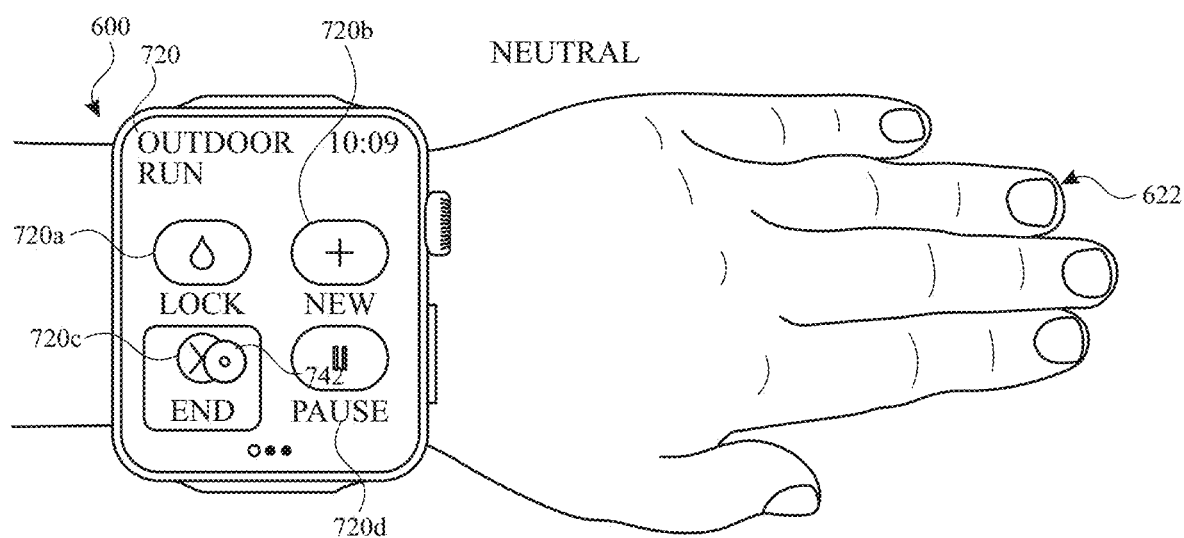

As illustrated in FIG. 7O, in response to detecting clench gesture 750*n*, computer system 600 ceases to display menu 732 and displays cursor 742 at a location on workout user interface 718. At FIG. 7O, in response to detecting clench gesture 750*n*, computer system 600 begins operating in a moving cursor operation mode (e.g., another hand gesture operation mode). At FIG. 7P, computer system 600 detects (e.g., via one or more accelerometers and/or gyroscopes via a sensor that is different from an optical/heart rate sensor, and/or via a sensor that is different from the sensor that detects one or more hand gestures) that computer system 600 is being tilted (e.g., moved) to the left (e.g., 750*p*). At FIG. 7P, in response to detecting that computer system 600 is being tilted to the left, computer system 600 moves cursor 742 to the left based on the amount of tilting and/or speed of the tilting being detected by computer system 600. As illustrated in FIG. 7P, cursor 742 is moved toward the left edge of workout user interface 718. At FIG. 7P, a determination is made that cursor 742 is positioned at (e.g., and/or near) the left edge of workout user interface 718 (e.g., for a predetermined period of time). As illustrated in FIGS. 7Q-7R, because the determination is made that cursor 742 is positioned on the left edge of workout user interface 718, computer system 600 displays an animation that slides workout user interface 718 off of the right edge of display screen 602*c*, and slides workout control user interface onto the display screen 602*c* from the left edge of display screen (e.g., slides to the right). Thus, because a determination is made that cursor 742 is positioned at (e.g., and/or near), computer system 600 replaces the currently displayed user interface with another user interface.

Figure 7S:
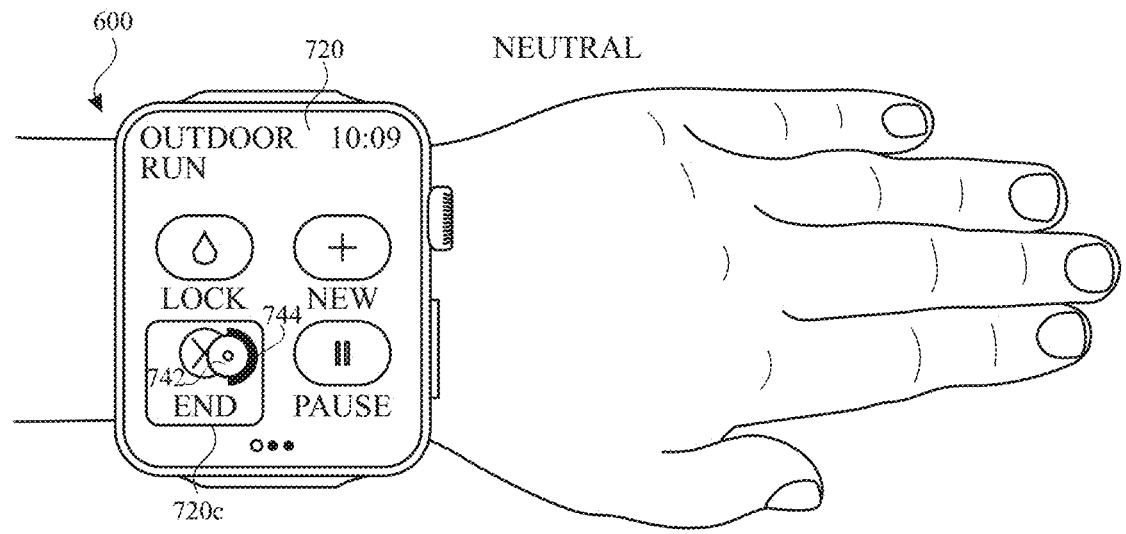

As illustrated in FIG. 7R, workout control user interface 720 includes lock control 720*a* (e.g., that, when activated, causes computer system 600 to ignore touch inputs detected on computer system 600), new control 720*b* (e.g., that, when activated, causes computer system 600 to initiate a new workout tracker), end control 720*c* (e.g., that, when activated, causes computer system 600 to stop a workout tracker that is currently tracking workout activity), and pause control 730*d* (e.g., that, when activated, cause computer system 600 to pause a workout tracker that is currently tracking workout activity). As illustrated in FIG. 7R, hand 622 is in the neutral position (e.g., 610 in FIG. 6), and cursor 742 is positioned over end control 720*c*. At FIG. 7S, a period of time has passed since cursor 742 was first positioned over end control 720*c* (and/or at the current location of cursor 742) (e.g., and hand 622 has remained in the neutral position). As illustrated in FIG. 7S, computer system 600 displays cursor 742 with indication 744. Indication 744 indicates an amount of time before an operation will be performed (e.g., an activation operation) that corresponds to the location of cursor 742, such as activating end control 720*c* and/or displaying a menu that includes one or more controls to perform an operation that corresponds to the location of cursor 742 (e.g., menu 732 of FIG. 7M). Accordingly, while cursor 742 is displayed at a location that corresponds to a user interface object, such as a control, computer system 600 displays an animation of the size of indication 744 and/or fills up cursor 742 over a period of time (e.g., a period of time that indicates the remaining time before an operation will be performed). At FIG. 7S, indication 744 filling up roughly half of cursor 742 indicates roughly half the time has passed (e.g., since cursor 742 has been positioned over end control 720*c*) before computer system 600 can perform an operation corresponds to the location of cursor 742. Looking back at FIGS. 7Q-7R, computer system 600 did not display an indication with cursor 742 while computer system 600 was not displayed on a user interface and/or at the edge of the display, irrespective of how long the computer system 600 was displayed at a particular location. Thus, in some embodiments, computer system 600 only displays an animation that includes indication 744 when moving cursor 742 is over a user interface object (e.g., a selectable and/or (able to be activated) user interface object, a user interface object that could be activated via one or more gestures that are detected on display screen 602*c*).

Figure 7T:
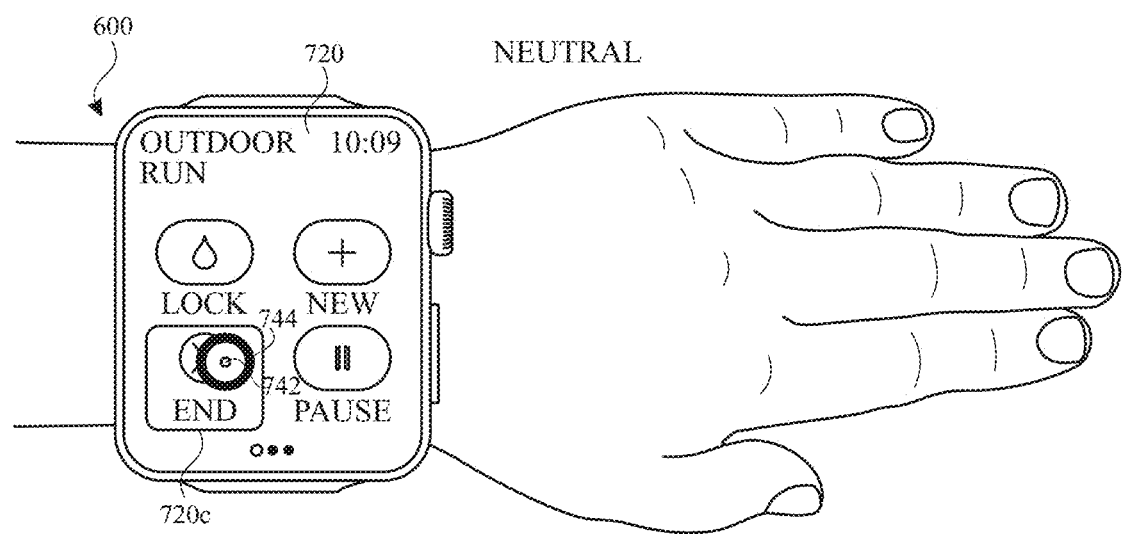

At FIG. 7S, more time has passed since cursor 742 was first positioned over end control 720*c* (e.g., and hand 622 has remained in the neutral position). As illustrated in FIG. 7T, computer system 600 has updated indication 744, such that indication 744 has filled up all of cursor 742. At FIG. 7T, a determination is made that cursor 742 has been positioned over end control 720*c* for a predetermined period of time (e.g., 1-5 seconds). At FIG. 7U, because the determination is made that cursor 742 has been positioned over end control 720*c* for the predetermined period of time, computer system 600 activates end control 720*c*. Once end control 720*c* is activated, computer system 600 displays completion user interface 770 that indicates that the workout tracker has ended.

Figure 7U:
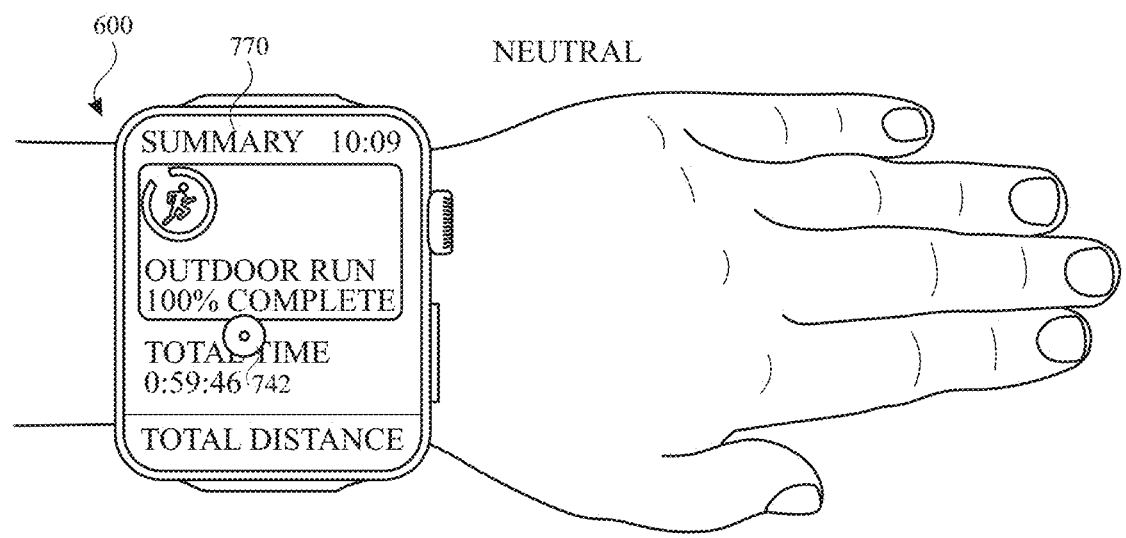
Figure 7V:
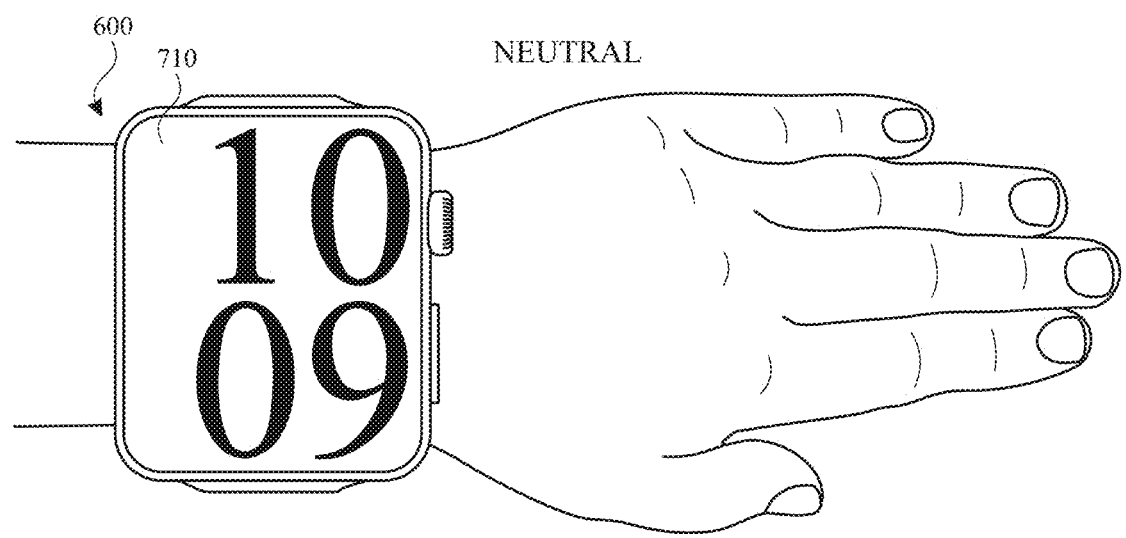
Figure 7W:
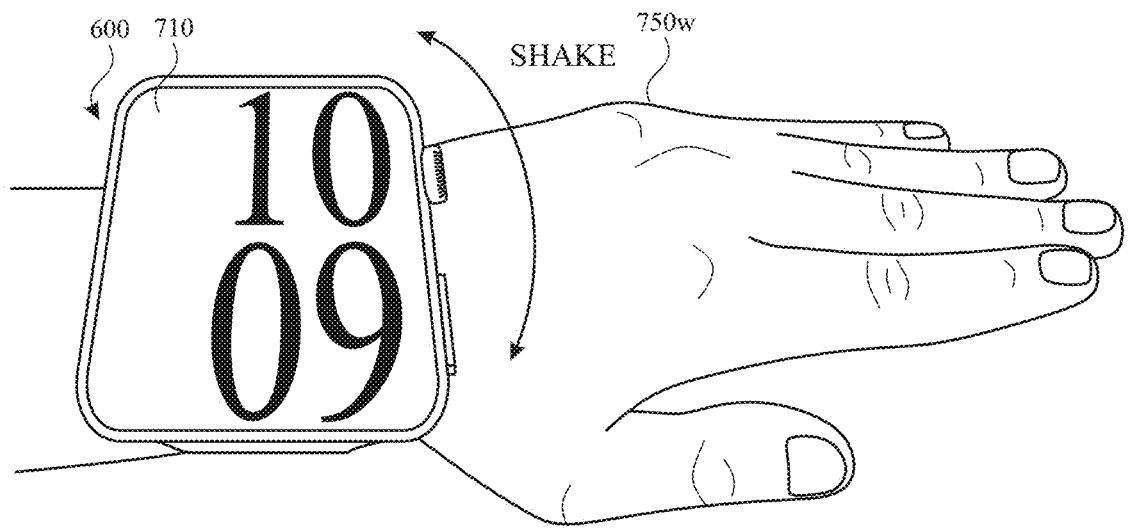
Figure 7X:
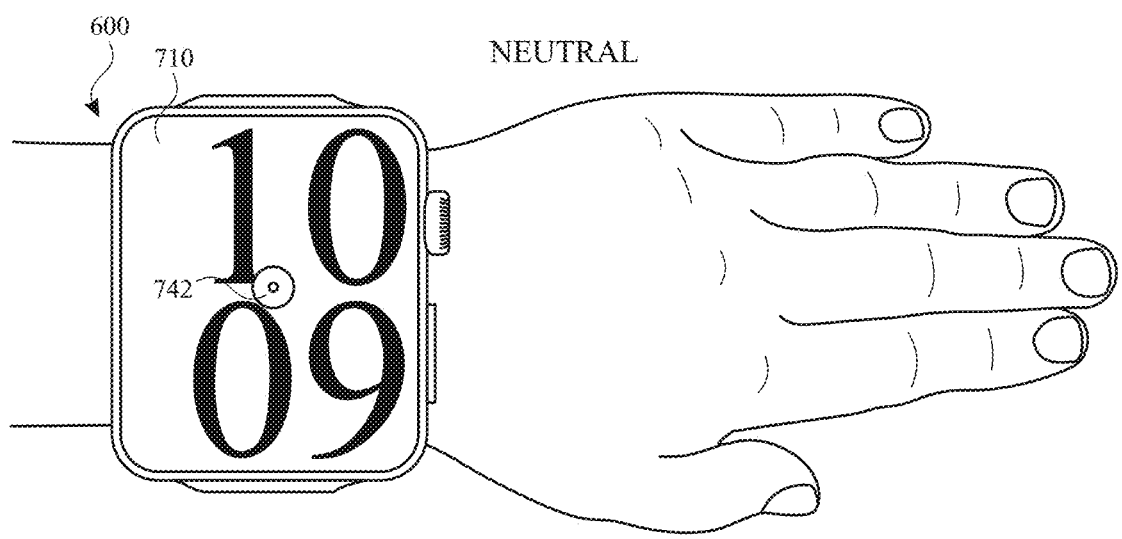
Figure 7Y:
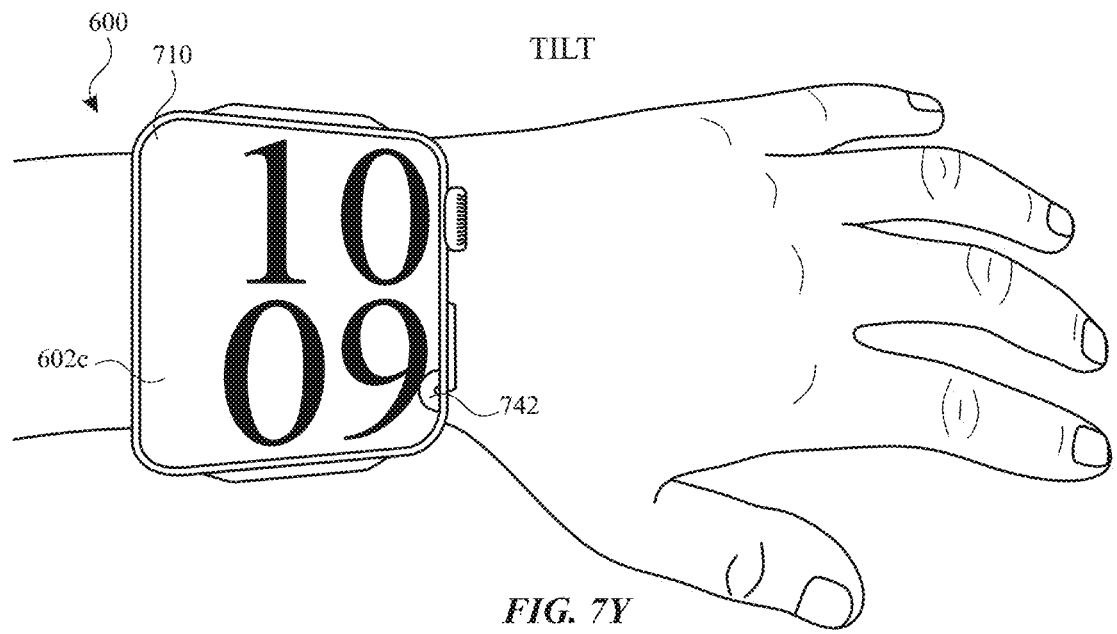
Figure 7Z:
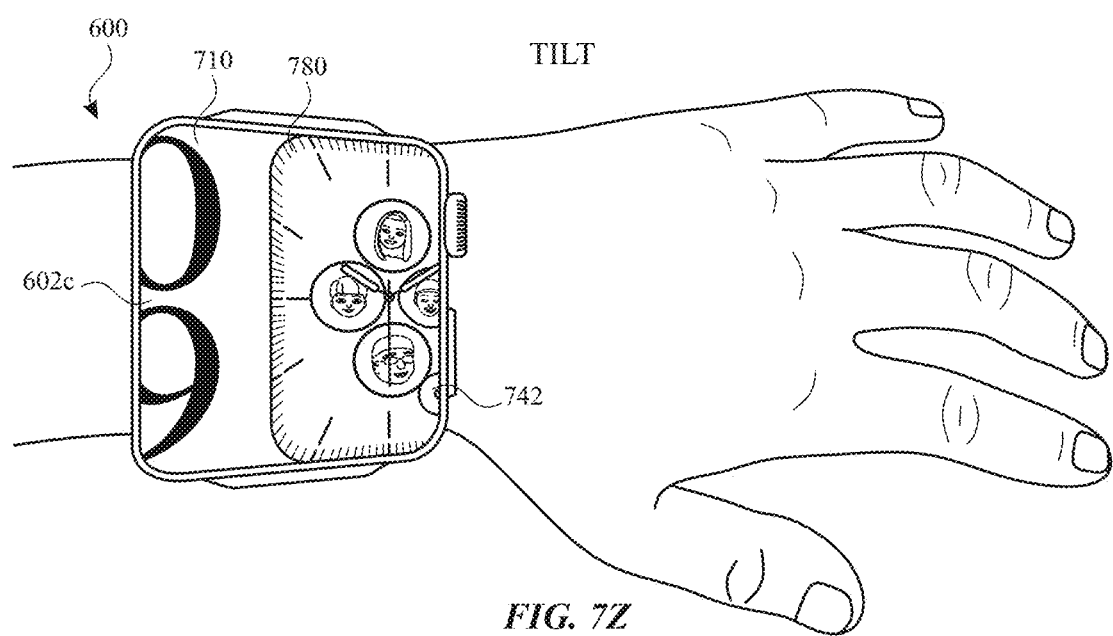
Figure 7A:
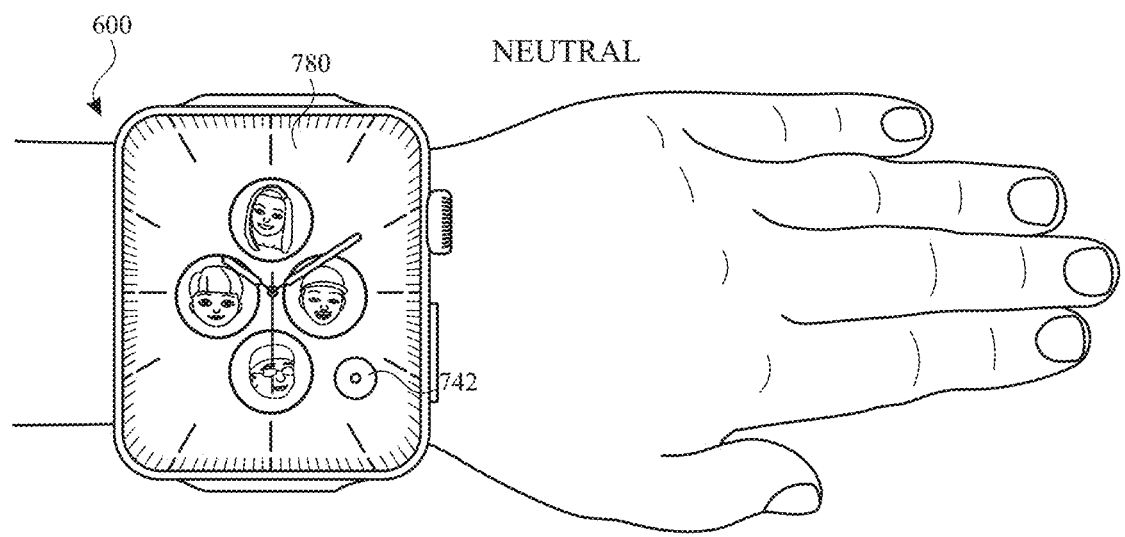

FIGS. 7U-7AA illustrate exemplary user interfaces for navigating a user interface using hand gestures and a moving cursor. In particular, FIGS. 7U-7AA illustrate an exemplary scenario where computer system 600 enters the moving cursor operation mode in response to detecting a shake gesture (e.g., instead of activating moving cursor control 732*b* on menu 732 via one or more hand gestures, as described above in relation to FIG. 7N). FIG. 7U illustrates computer system 600 displaying clock user interface 710, which includes a current time (e.g., 10:09). At FIG. 7W, computer system 600 detects that it is being (or has been) shaken (e.g., via one or more accelerometers and/or gyroscopes) (e.g., 750*w*). At FIG. 7X, in response to detecting that computer system 600 is being (or has been) shaken, computer system 600 begins operating in a moving cursor mode (e.g., transitions from not operating in a moving cursor mode to operating in the moving cursor mode). In response to detecting that computer system 600 is being (or has been) shaken, computer system 600 displays cursor 742. At FIG. 7Y, computer system 600 detects that computer system 600 is being tilted (e.g., moved) to the right (e.g., 750*y*). At FIG. 7Y, in response to detecting that computer system 600 is being tilted to the right, computer system 600 moves cursor 742 to the right based on the amount of tilting and/or speed of the tilting being detected by computer system 600. As illustrated in FIG. 7Y, cursor 742 is moved toward the right edge of clock user interface 710. At FIG. 7Y, a determination is made that cursor 742 is positioned at (e.g., and/or near) the right edge of clock user interface 710. As illustrated in FIGS. 7Z-7AA, because the determination is made that cursor 742 is positioned on the left edge of workout user interface 718, computer system 600 displays an animation that slides clock user interface off the left edge (e.g., away from the edge that cursor 742 is positioned on) of display screen 602*c* and displays analog clock user interface 780 sliding on from the right of display screen 602*c* and moving towards the left edge of display screen 602*c*.

FIGS. 8A-8J illustrate exemplary user interfaces for navigating user interfaces using hand gestures, in accordance with some embodiments. The user interfaces in these figures are used to illustrate the processes described below, including the processes in FIGS. 15-16.

Figure 8A:
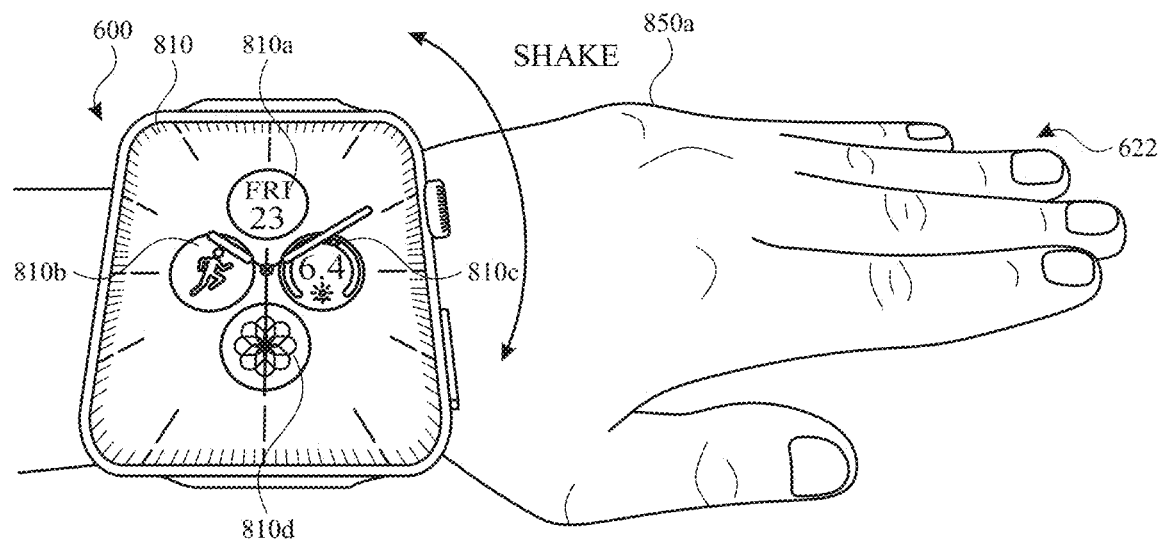
FIGS. 8A-8J illustrate exemplary user interfaces for navigating user interfaces using hand gestures, in accordance with some embodiments.
Figure 8B:
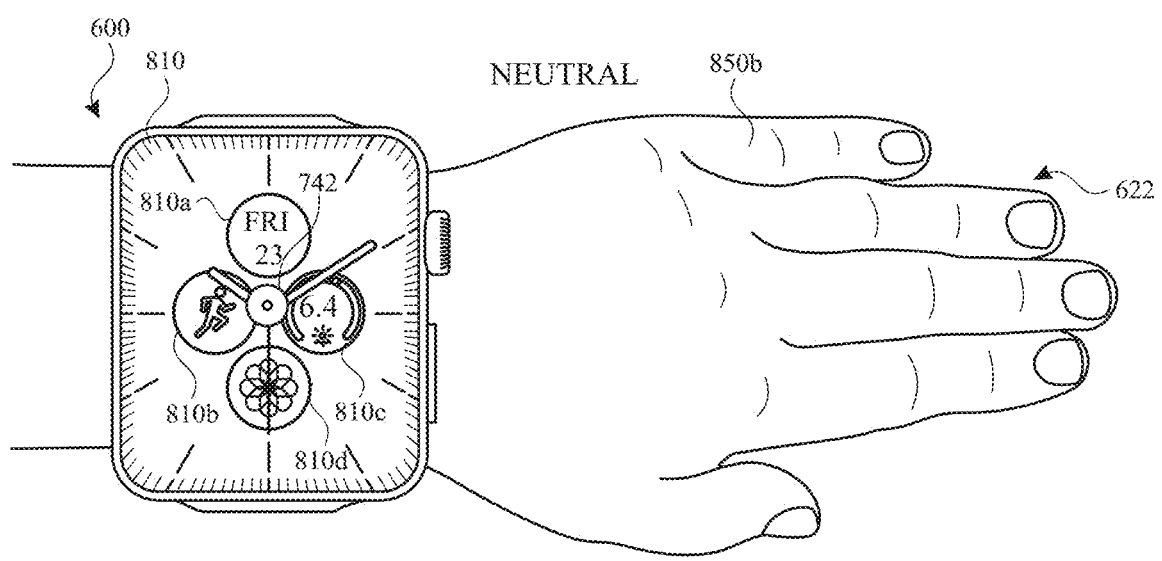

In particular, FIGS. 8A-8J illustrate an exemplary scenario where computer system 600 displays menu 732 in response to cursor 742 being located (e.g., displayed) over a user interface object (e.g., instead of activating the user interface object as described above in relation to FIGS. 7I-7U). FIG. 8A illustrates computer system 600 displaying clock user interface 810, which includes application control 810*a*-810*d* (e.g., that, when activated, each cause computer system 600 to launch an application). At FIG. 8A, computer system 600 detects that it is being (or has been) shaken (e.g., 850*a*) (e.g., using one or more techniques as described above in relation to FIGS. 7U-7AA). At FIG. 8B, in response to detecting that computer system 600 is being (or has been) shaken, computer system 600 begins operating in a moving cursor mode and displays cursor 742 on clock user interface 810.

Figure 8C:
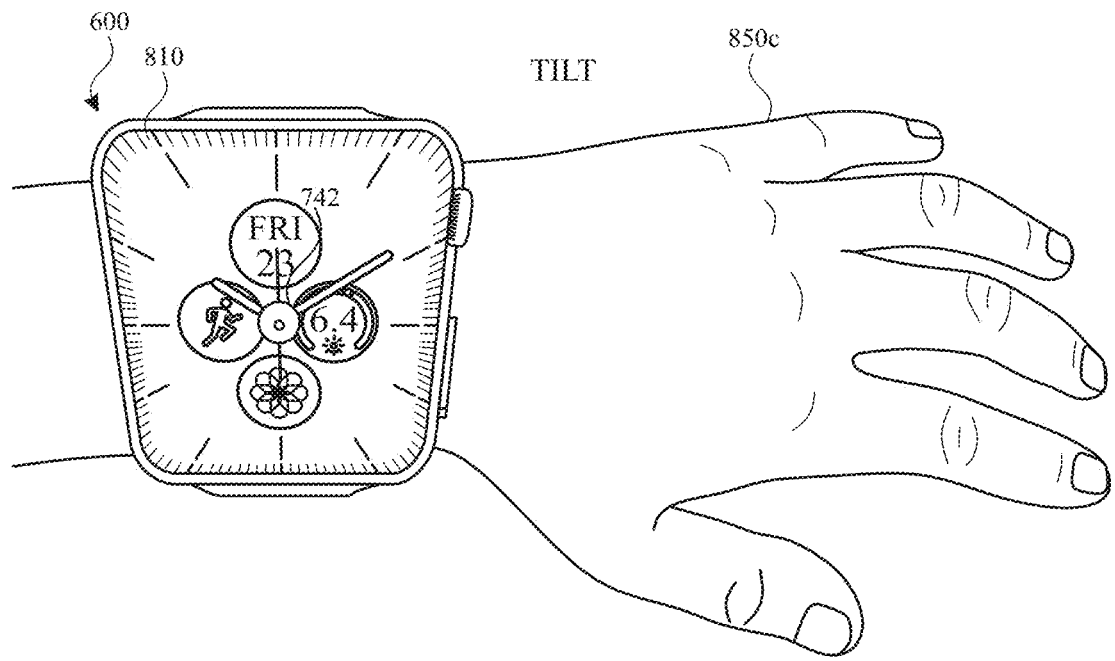
Figure 8D:
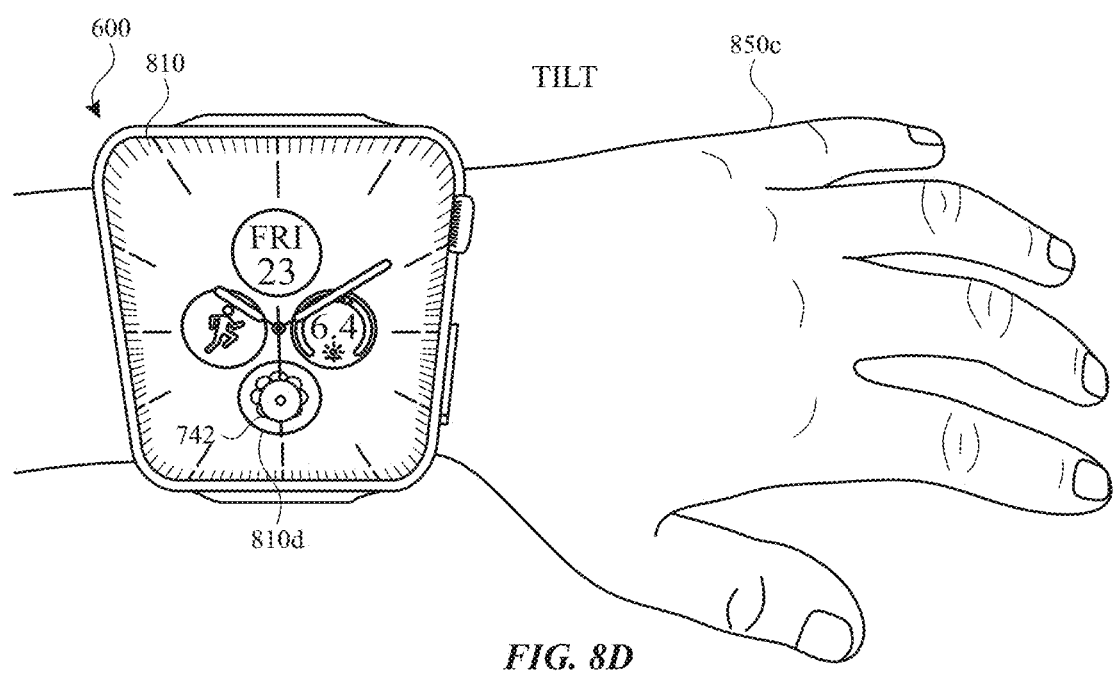

At FIG. 8C, cursor 742 has been displayed at the same location (e.g., location that it was displayed in at FIG. 8B) for a predetermined period of time. However, at FIG. 8C, computer system 600 does not display an animation of cursor 742 filling up because cursor 742 is not located at a location that corresponds to a user interface object (e.g., a selectable and/or a user interface object that can be activated and/or a user interface object that is activated when computer system 600 detects one or more inputs on the user interface object and, in some embodiments, when computer system is operating in a normal operation mode and/or not detecting hand gestures) (e.g., using one or more techniques described in relation to FIGS. 7I-7U). At FIG. 8C, computer system 600 detects that it is being tilted downward (e.g., 850*c*) (e.g., using one or more techniques described in relation to FIGS. 7I-7U). As illustrated in FIG. 8D, in response detecting that computer system 600 is being tilted downward, computer system 600 moves cursor 742 over application icon 810*d*.

Figure 8E:
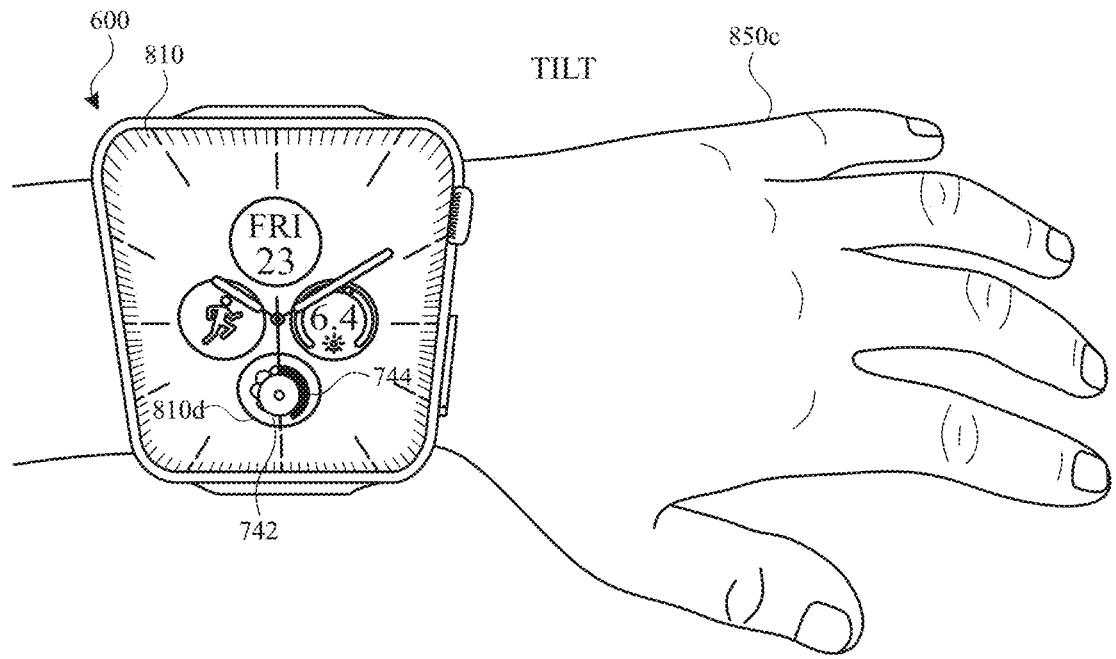
Figure 8F:
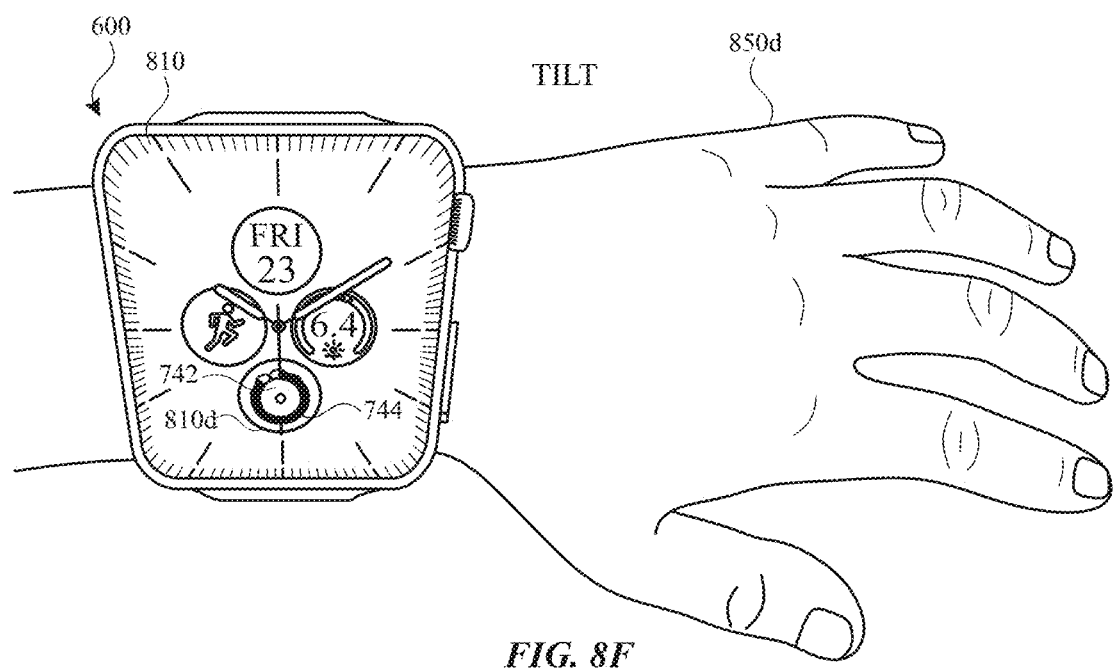
Figure 8G:
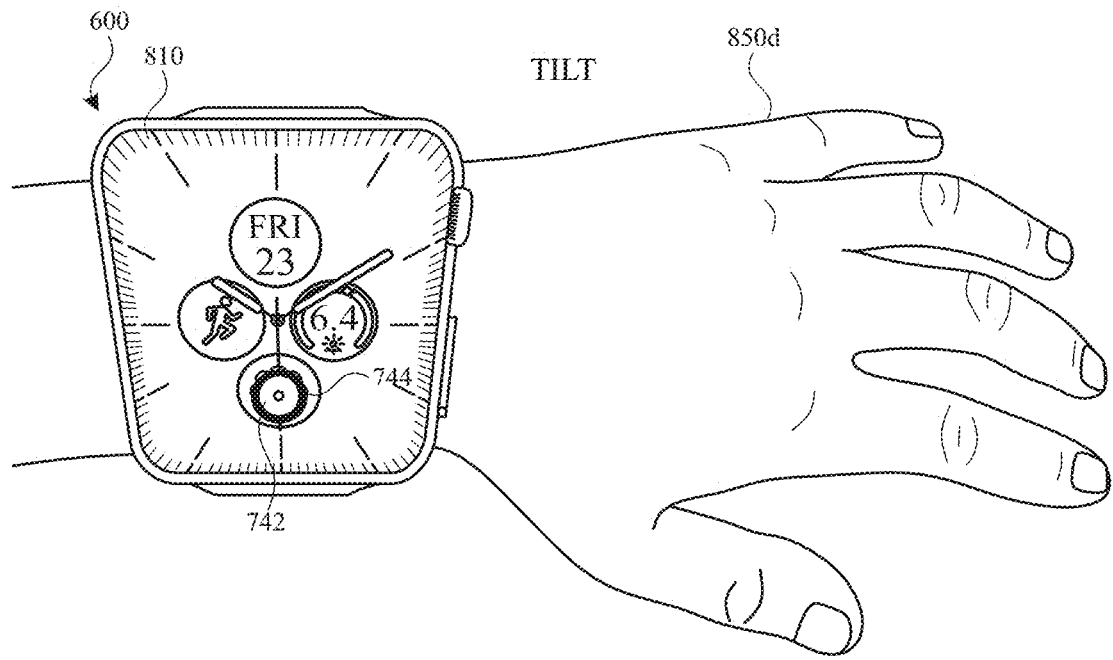

As illustrated in FIG. 8E-8G, computer system 600 displays an animation cursor of indication 744 filling up cursor 742 over a period of time because cursor 742 is displayed over application icon 810*d* (e.g., a selectable user interface object) (e.g., using one or more techniques as discussed above in relation to FIGS. 7I-7U). As illustrated in FIG. 8G, indication 744 has completely filled up cursor 742. At FIG. 8G, a determination is made that cursor 742 has been displayed over a determination is made that cursor 742 has been positioned over application icon 810*d* for a predetermined period of time (e.g., 1-5 seconds).

Figure 8H:
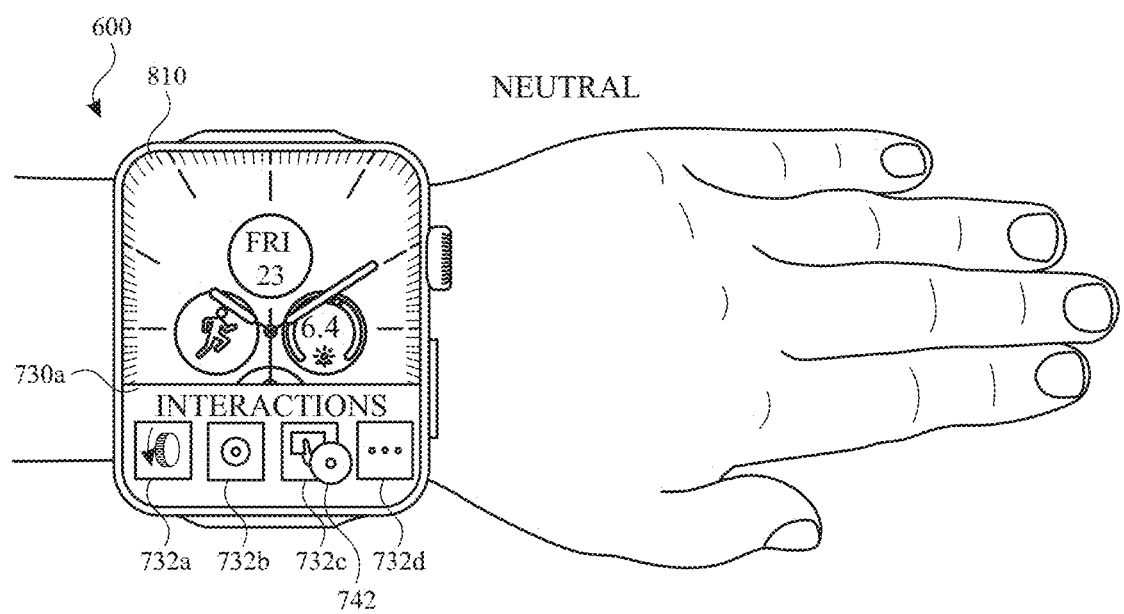

As illustrated in FIG. 8H, because the determination is made that cursor 742 has been positioned over application icon 810*d* for a predetermined period of time, computer system 600 displays menu 732 (e.g., and, in some embodiments, selects application icon 810*d* and/or the location of application icon 810*d* (e.g., such that an operation can be performed using application icon 810*d* and/or the location of application icon 810*d*) without activating application icon 810*d*). In addition, at FIG. 8H, computer system 600 is displaying cursor 742 positioned over interaction control 732*c*. In some embodiments, one or more settings control whether computer system 600 will activate a user interface object when the determination is made that cursor 742 has been positioned over the respective user interface object for a predetermined period of time, computer system 600 displays a menu when the determination is made that cursor 742 has been positioned over the respective user interface object for a predetermined period of time, or do both. In some embodiments, computer system 600 displays menu 732 in a position on the display that is further away from where cursor 742 was positioned over application icon 810d (as to not cover up the user interface object that cursor 742 was hovering over).

Figure 8I:
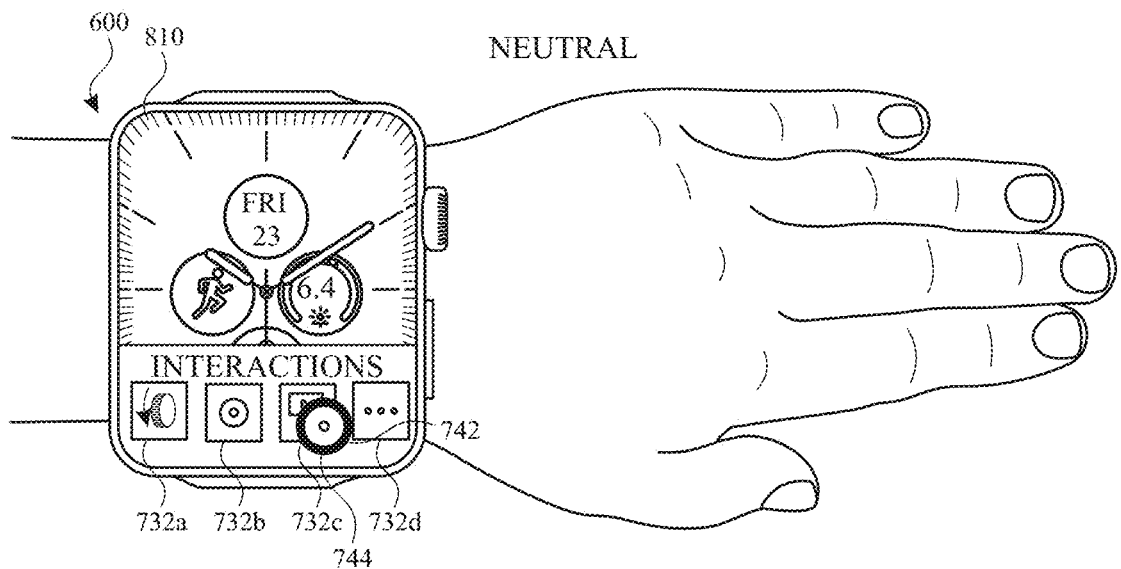

As illustrated in FIG. 8I, computer system 600 displays indication 744 that has filled up cursor 742 (e.g., using one or more techniques as discussed in relation to FIGS. 8E-8G). At FIG. 8I, a determination is made that cursor 742 has been detected over interaction control 732c for a predetermined period of time. At FIG. 8.1, because a determination is made that cursor 742 has been detected over cursor 742 for a predetermined period of time, computer system 600 activates interaction control 732c. In response to the activation of interaction control 732c, computer system 600 displays additional controls, which include tap control 832a. Notably, when a determination is made that cursor 742 has been detected over a selectable user interface object for a predetermined time while menu 732 is displayed, computer system 600 activates the user interface object (and does not re-display menu 732, irrespective of the one or more settings of computer system 600).

Figure 8J:
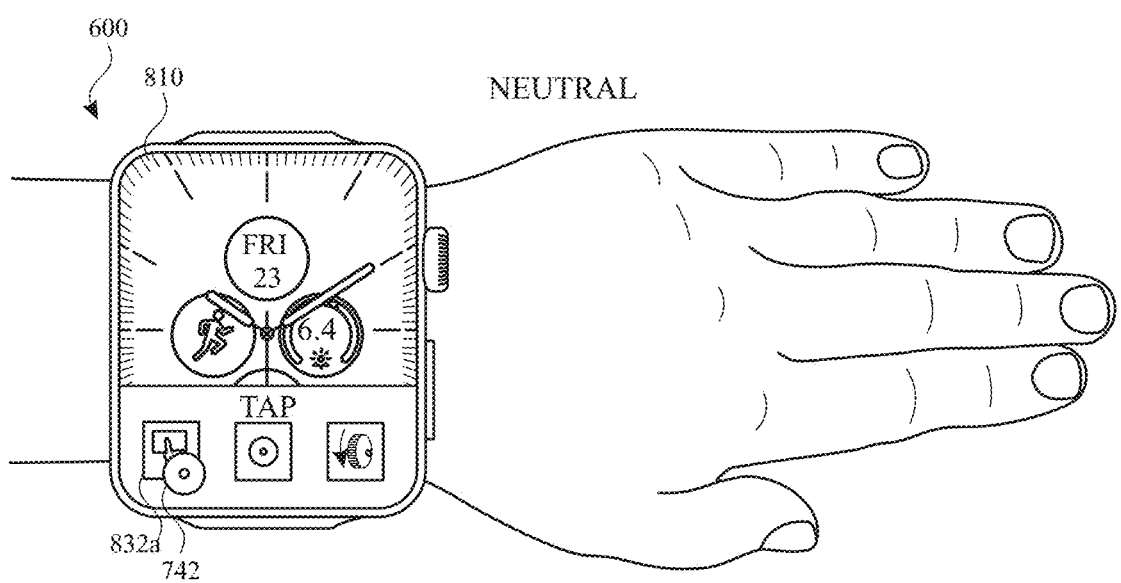

At FIG. 8J, computer system 600 displays cursor over tap control 832a. In some embodiments, when a determination is made that cursor 742 has been detected over tap control 832a, computer system 600 activates tap control 832a. In some embodiments, in response to detecting activation of tap control 832a, computer system 600 detects and/or performs an operation that would have been performed if a tap gesture was detected at the location that cursor 742 was displayed over that caused menu 732 to be displayed (e.g., in FIGS. 8G-8I). For example, at FIG. 8J, in response to detecting activation of tap control 832a, computer system 600 launches an application that corresponds to application icon 810d (e.g., the user interface of FIG. 10F). In some embodiments, other gestures control can be displayed and activated, where computer system 600 performs an operation (e.g., a different operation that if a tap gesture had been detected) (e.g., a gesture that causes a clock face menu to be displayed, a gesture that causes the application icon to be moved from one location to another location on clock user interface 810, a gesture that causes the application icon to be deleted from clock user interface 810) that would have been performed if the respective gesture (e.g., a long press gesture, a dragging gesture) was detected at the location that cursor 742 was displayed over that caused menu 732 to be displayed.

FIGS. 9A-9H illustrate exemplary user interfaces for navigating user interfaces using hand gestures, in accordance with some embodiments. The user interfaces in these figures are used to illustrate the processes described below, including the processes in FIGS. 15-16.

Figure 9A:
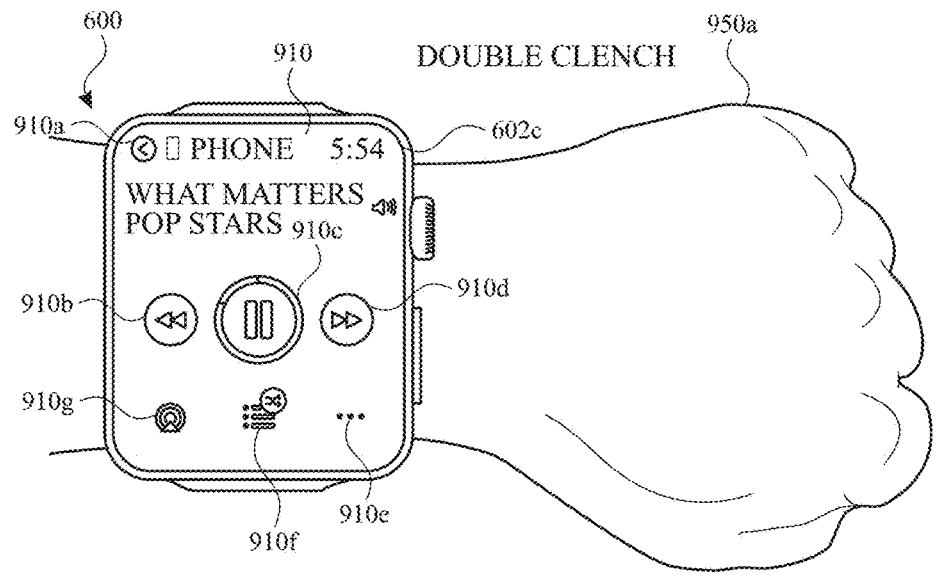
FIGS. 9A-9H illustrate exemplary user interfaces for navigating user interfaces using hand gestures, in accordance with some embodiments.

In particular, FIGS. 9A-9H illustrate an exemplary scenario where computer system 600 navigates through a user interface in response to detecting hand gestures (e.g., using similar techniques as described above in relation to FIGS. 7A-7G). FIG. 9A illustrates computer system 600 displaying media user interface 910 while not operating in a hand gesture navigation mode. Media user interface 910 includes back control 910a (e.g., that, when activated, causes computer system 600 to display a previously displayed user interface), reverse control 910b (e.g., that, when activated, causes computer system 600 to be configured to playback a previous media item that is in a list of media items), pause control 910c (e.g., that, when activated, causes computer system 600 to pause the playback of a media item), forward control 910d (e.g., that, when activated, causes computer system 600 to be configured to playback a next media item that is in a list of media items), additional options control 910e (e.g., that, when activated, causes computer system 600 to display one or more additional controls that are not currently displayed in FIG. 9A), queue control 910f (e.g., that, when activated, causes computer system 600 to display a list of queued media items), and connection control 910g (e.g., that, when activated, causes computer system 600 to display a user interface for connecting computer system 600 to one or more external computer systems). At FIG. 9A, computer system 600 detects double clench gesture 950a.

Figure 9B:
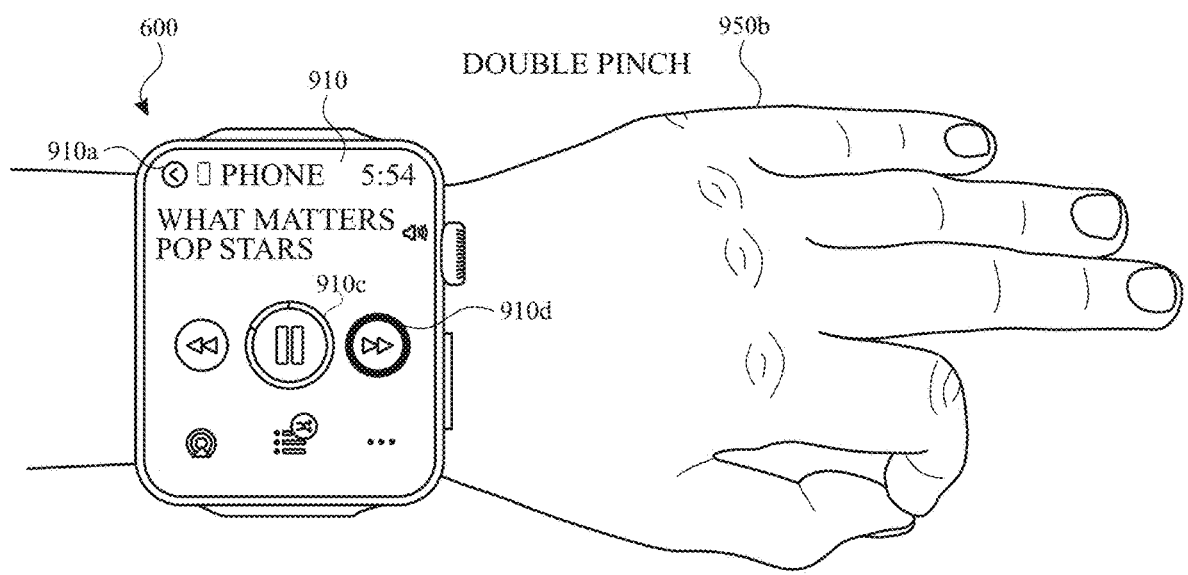

At FIG. 9B, in response to detecting double clench gesture 950a, computer system 600 begins operating in a hand gesture navigation mode (e.g., using one or more techniques as described above in relation to FIGS. 7D-7E). As illustrated in FIG. 9B, in response to detecting double clench gesture 950a, computer system 600 displays a focus indicator around forward control 910d (e.g., using one or more techniques as discussed above in relation to FIG. 7D). In some embodiments, computer system 600 displays the focus indicator around a control that is different from and/or not forward control 910d (e.g., controls 910a-910d or 910e-910g) on media user interface 910 in response to detecting double clench gesture 950a.

Figure 9C:
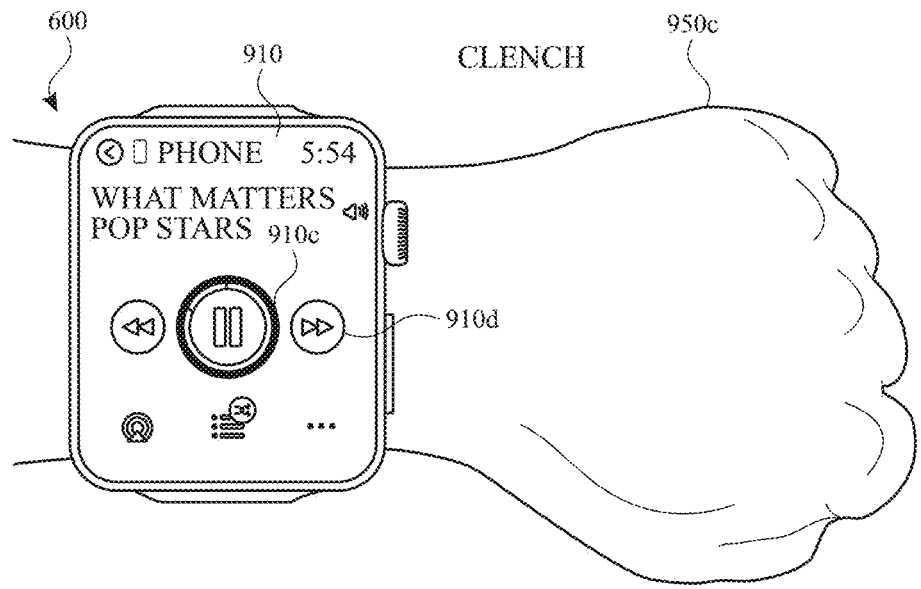

At FIG. 9B, computer system 600 detects double pinch gesture 950b. As illustrated in FIG. 9C, in response to detecting double pinch gesture 950b, computer system 600 moves the focus indicator to the left, such that the focus indicator is displayed around pause control 910c and not displayed around forward control 910d. At FIG. 9C, in response to detecting double pinch gesture 950b, computer system 600 moves the focus indicator around a control that computer system 600 has determined to be a previous control on media user interface 910 in relation to forward control 910d. In some embodiments, computer system 600 determines a previous control by identifying a control that is in the direction on media user interface 910 that travels from the location of forward control 910d (e.g., the previous control that the focus indicator was around) towards a starting row on media user interface 910 (e.g., a position on a row near and/or at the top of media user interface 910 and/or a position on a row that has a selectable user interface object (e.g., a control) that is furthest to the left/right and near the top of media user interface 910). In some embodiments, at FIG. 9C, pause control 910c is determined to be the previous control to forward control 910d because pause control 910c is adjacent (e.g., next to or next to without another control being in between the two controls) to forward control 910d and is closer to the starting row of media user interface 910 than forward control 910d (or, in some embodiments, any other of the other adjacent controls (e.g., queue control 910f, additional options control 910e)). At FIG. 9C, computer system 600 detects clench gesture 950c.

Figure 9D:
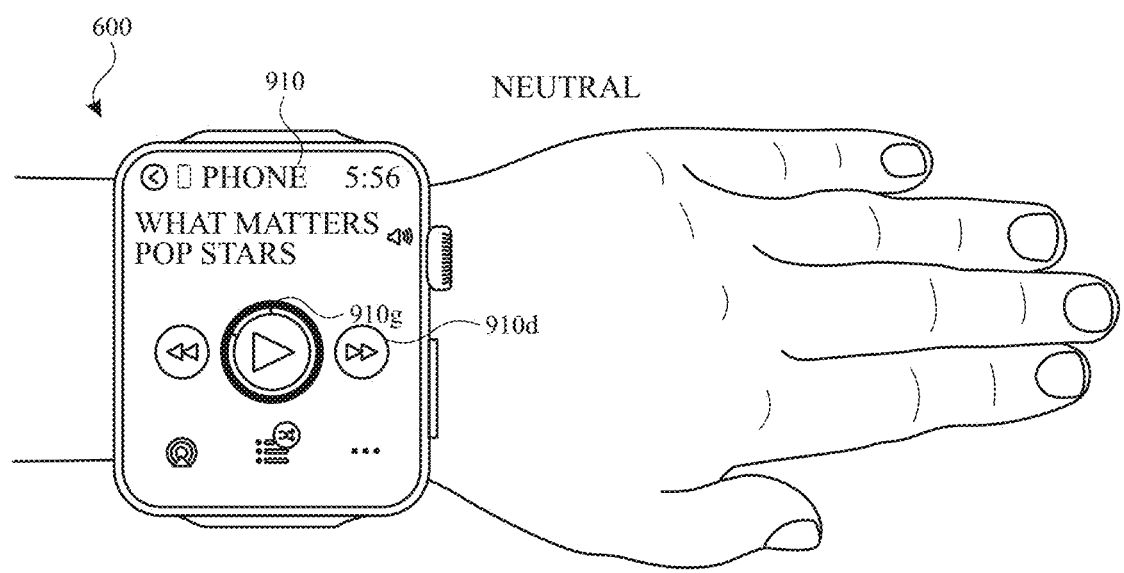

At FIG. 9D, in response to detecting clench gesture 950c, computer system 600 activates pause control 910c and pauses the playback of media (e.g., "WHAT MATTERS" by "POP STARS"). As illustrated in FIG. 9D, in response to detecting clench gesture 950c, pause control 910c is replaced with play control 910h (e.g., that, when activated, initiates the playback of a media item). As illustrated in FIG. 9D, in response to detecting clench gesture 950c, computer system 600 maintains the focus indicator in the same position on media user interface 910. Thus, in some embodiments, computer system 600 does not move the focus control when detecting clench gesture 950c and/or when activating a control in response to detecting a hand gesture, irrespective of whether the control is replaced with another control. At FIG. 9E, computer system 600 detects pinch gesture 950e.

Figure 9E:
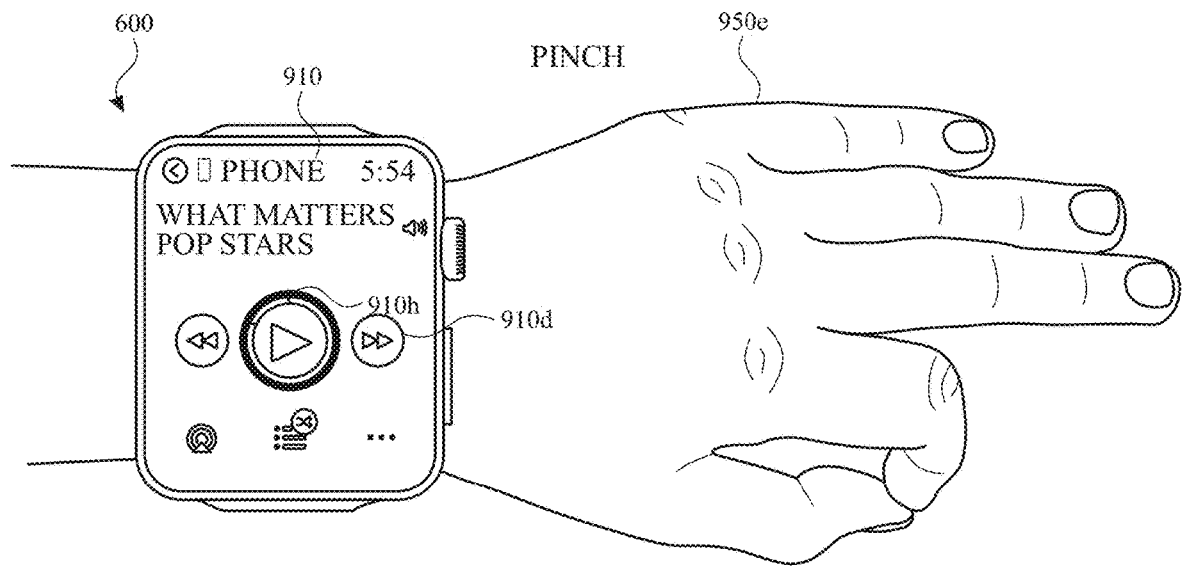
Figure 9F:
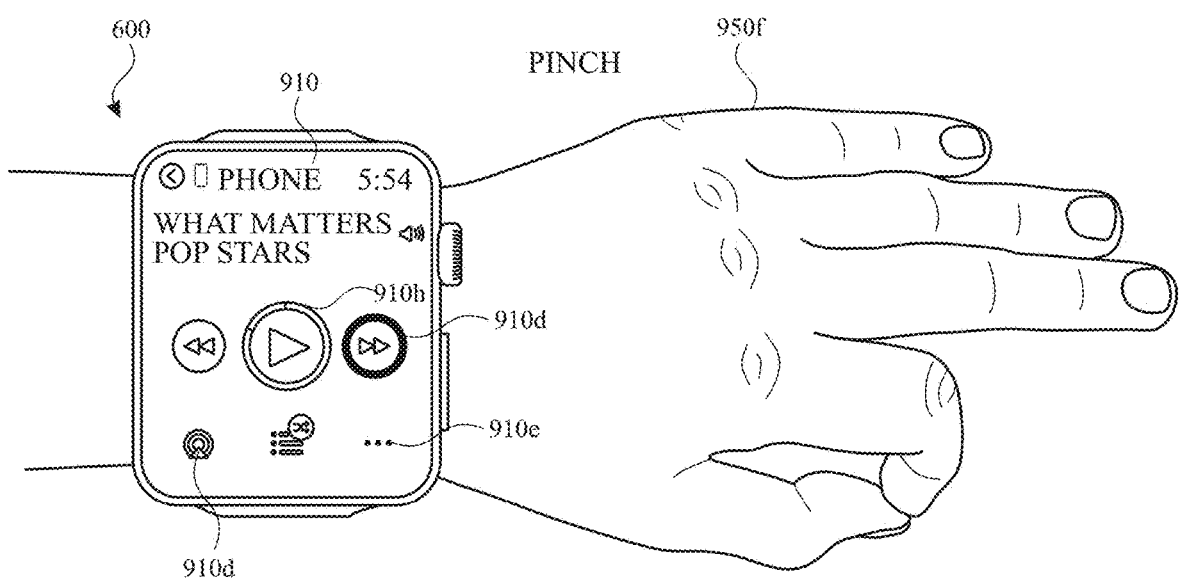

As illustrated in FIG. 9F, in response to detecting pinch gesture 950e, computer system 600 moves the focus indicator to the right, such that the focus indicator is displayed around forward control 910d and not displayed around play control 910h. At FIG. 9F, in response to detecting pinch gesture 950e, computer system 600 moves the focus indicator to around a control that computer system 600 has determined to be a next control on media user interface 910 in relation to play control 910h. In some embodiments, computer system 600 determines a next control by identifying a control that is in the direction on media user interface 910 that travels from the location of forward control 910d (e.g., the previous control that the focus indicator was around) towards an ending row on media user interface 910 (e.g., a position on a row near and/or at the bottom of media user interface 910 and/or a position on a row that has a selectable user interface object (e.g., a control) that is furthest to the left/right and near the top of media user interface 910). In some embodiments, at FIG. 9F, forward control 910d is determined to be the next control to play control 910h because forward control 910d is adjacent (e.g., next to or next to without another control being in between the two controls) to forward control 910d and is closer to the starting row of media user interface 910 than play control 910h.

Notably, double pinch gesture 950b of FIG. 9B includes multiple instances of pinch gesture 950e of FIG. 9E. In addition, computer system 600 performs an opposing operation (e.g., navigating to a previous control) in response to detecting double pinch gesture 950b to the operation that computer system 600 performed in response to detecting pinch gesture 950e. Thus, in some embodiments, computer system 600 performs opposing operations in response to detecting gestures that include multiple instances of each other. In some embodiments, the opposing gestures help the user navigate the user interfaces more easily because of the connectedness (e.g., similarity between) of the different gestures. Turning back to FIG. 9F, computer system 600 detects pinch gesture 950f.

Figure 9G:
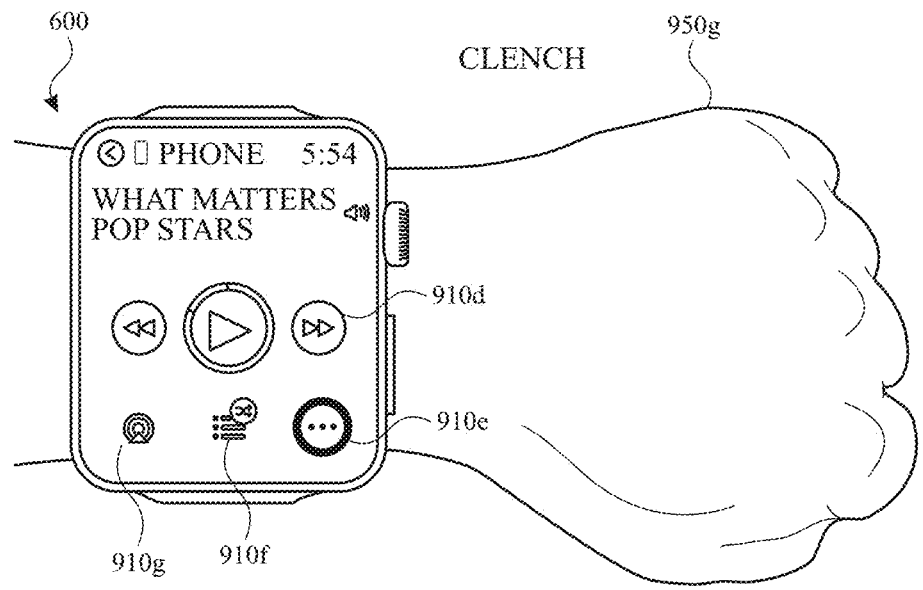

As illustrated in FIG. 9G, in response to detecting pinch gesture 950f, computer system 600 moves the focus indicator downward, such that the focus indicator is displayed around additional options control 910e and not displayed around forward control 910d. Here, computer system 600 moves the focus indicator downward because additional options control 910e is the next control. At FIG. 9G, computer system 600 does not display the focus indicator around connection control 910g because connection control 910g is not adjacent to forward control 910d (e.g., so connection control 910g is not determined to be the next control). In some embodiments, computer system 600 moves the focus around a user interface in a pattern that is based on the particular layout of the controls on the particular user interface. Looking back at FIG. 9A, in some embodiments, computer system 600 moves focus indicator around media user interface 910 in the identifying order of the controls (910a, 910b, 910c, 910d, 910e, 910f, and 910g, consecutively (or in reverse)). In some embodiments, when the focus indicator is around the last control (e.g., 910g), computer system 600 moves the focus indicator around the first control (e.g., 910a) in response to detecting a pinch gesture (or a gesture to move the next control). In some embodiments, when the focus indicator is around the first control (e.g., 910a), computer system 600 moves the focus indicator around the last control (e.g., 910g) in response to detecting a double pinch gesture (or a gesture to move the previous control). Turning back to FIG. 9G, computer system 600 detects clench gesture 950g while the focus indicator is around additional options control 910e.

Figure 9H:
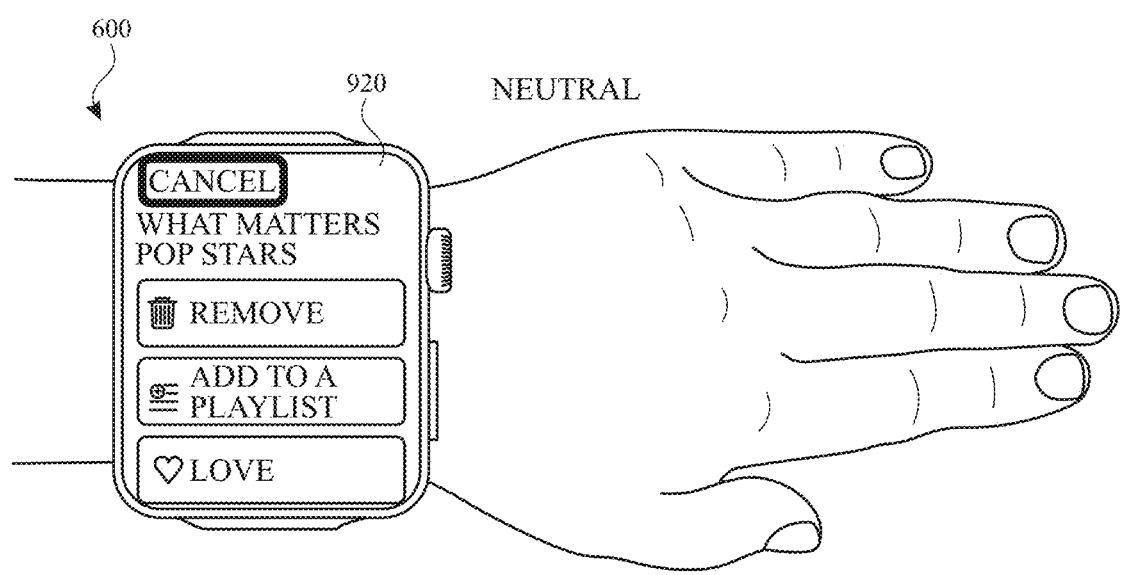

As illustrated in FIG. 9H, in response to detecting clench gesture 950g, computer system 600 displays additional options user interface 920 and ceases to display media user interface 910. As illustrated in FIG. 9H, in response to detecting clench gesture 950g, computer system 600 displays a focus indicator around a control (e.g., a control at a position on the beginning row) of additional options user interface 920. In some embodiments, in response to detecting one or more hand gestures to move the focus indicator around additional options user interface 920 (e.g., pinch and/or double pinch gestures), computer system 600 moves the focus indicator around different controls included in additional options user interface 920. In some embodiments, computer system 600 moves the focus indicator around different controls included in additional options user interface 920 in a different pattern (e.g., vertical pattern) from the pattern (e.g., snaking pattern) that computer system 600 moved the focus indicator around the controls included media user interface 910 (e.g., as described above in relations to FIGS. 9A-9G).

FIGS. 10A-10F illustrate exemplary user interfaces for navigating user interfaces using hand gestures, in accordance with some embodiments. The user interfaces in these figures are used to illustrate the processes described below, including the processes in FIGS. 15-16.

Figure 10A:
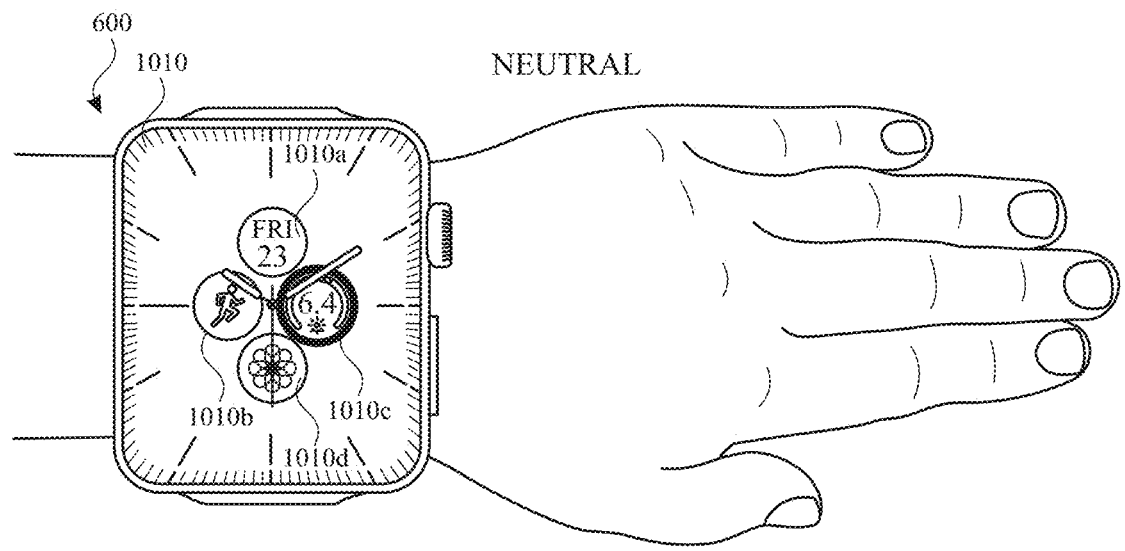
FIGS. 10A-10F illustrate exemplary user interfaces for navigating user interfaces using hand gestures, in accordance with some embodiments.
Figure 10B:
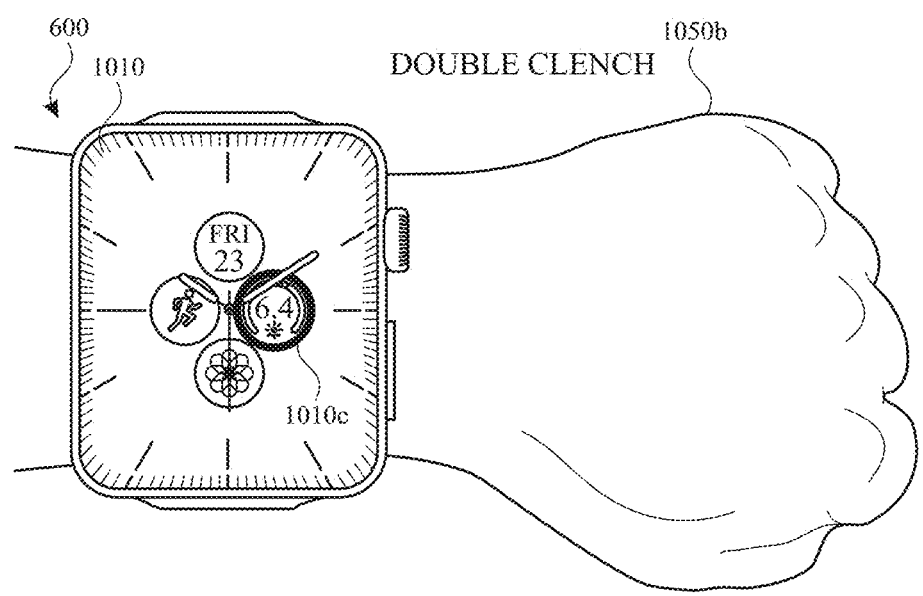

In particular, FIGS. 10A-10F illustrate an exemplary scenario where computer system 600 navigates through a user interface in response to detecting hand gestures (e.g., using similar techniques as described above in relation to FIGS. 7A-7G). FIG. 10A illustrates computer system 600 displaying media user interface 1010 while not operating in a hand gesture navigation mode. Media user interface 1010 includes application icons 1010a-1010d (e.g., that, when activated, causes computer system 600 to display a user interface for the respective application icon that was activated). At FIG. 10A, computer system 600 is operating in a hand navigation operation mode (e.g., as discussed above in relation to FIGS. 7A-7G and 9A-9H). In some embodiments, computer system 600 navigates through media user interface 1010 using one or more techniques described above in relation to FIGS. 7A-7G and 9A-9H. At FIG. 10B, computer system 600 detects double clench gesture 1050b.

Figure 10C:
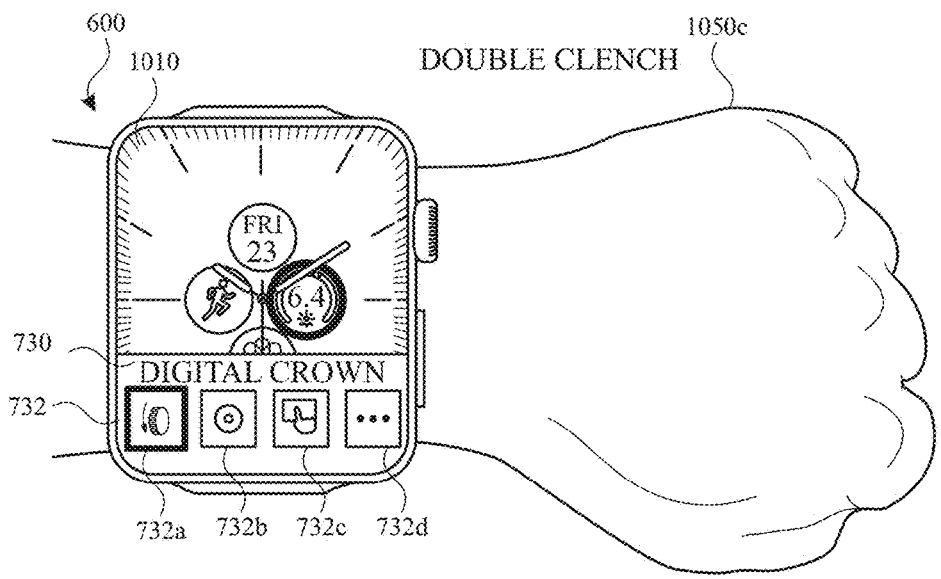

As illustrated in FIG. 10C, in response to detecting double clench gesture 1050b, computer system 600 displays menu 732 that includes controls 732a-732d (e.g., as discussed above in relation to FIG. 7D). Menu 732 includes control identifier 708 ("DIGITAL CROWN") that identifies the control that is currently in focused (e.g., the black box around digital hardware operation control 732a in FIG. 10C). As illustrated in FIG. 10C, computer system 600 displays focus indicators around both digital hardware operation control 732a and application icon 1010c because application icon 1010c was selected before double clench gesture 1050b was detected and/or computer system 600 can perform an operation at the location of application icon 1010c (e.g., activation of application icon 1010c, as discussed above in relation to FIG. 8J). At FIG. 10C, computer system detects double clench gesture 1050c.

Figure 10D:
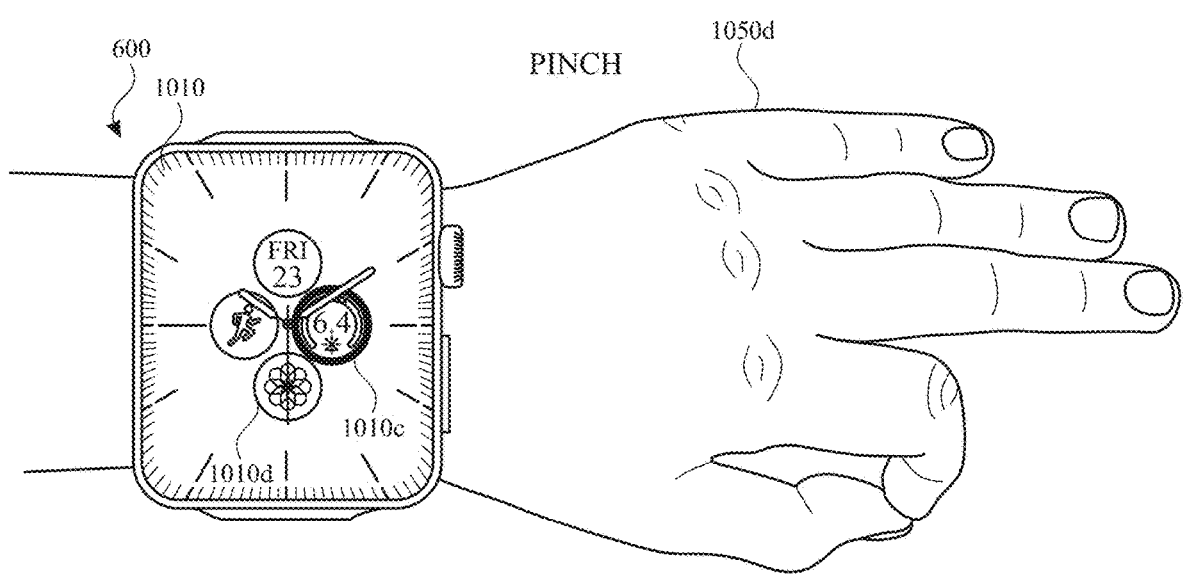
Figure 10E:
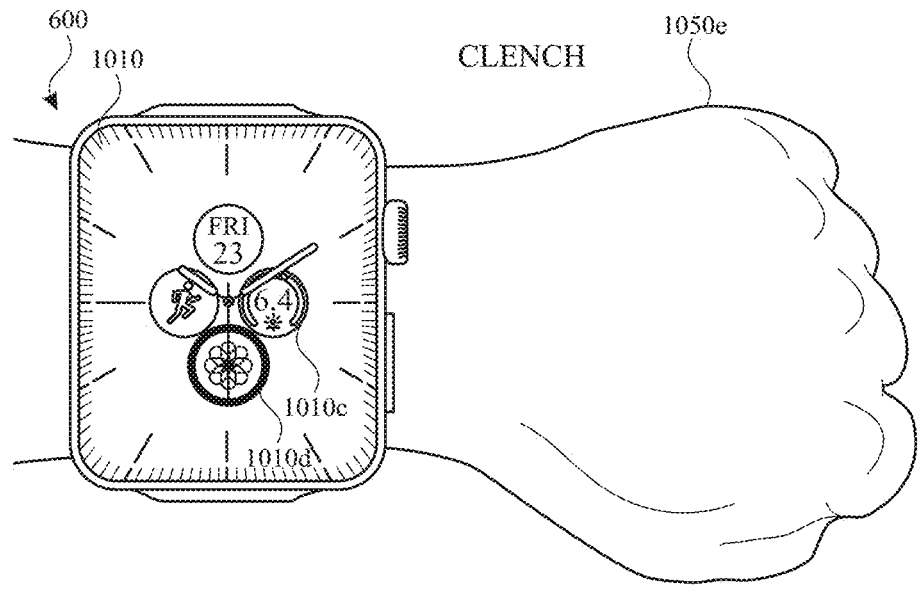
Figure 10F:
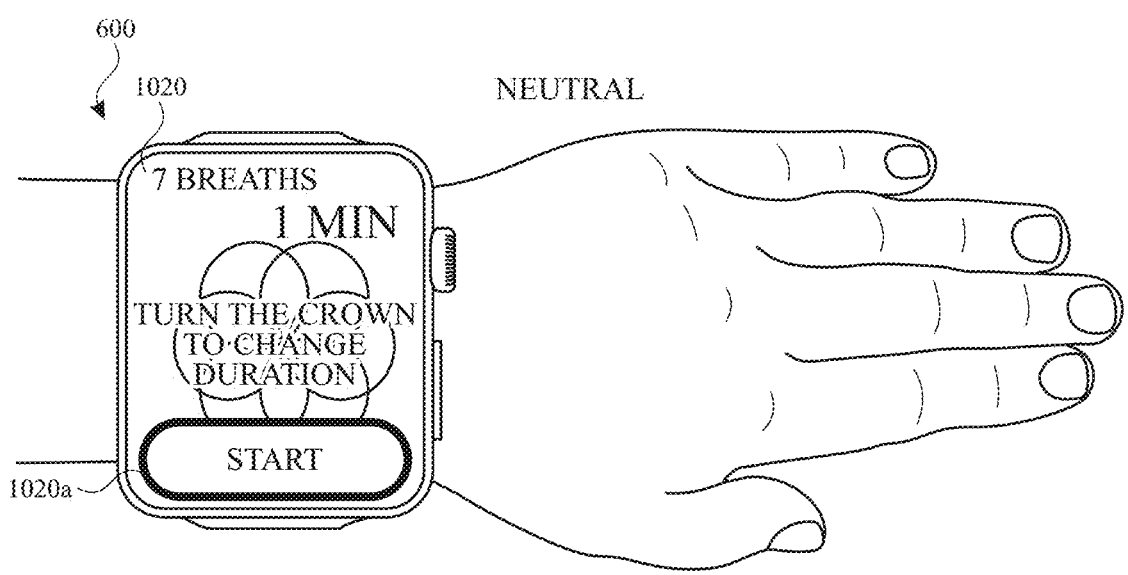

As illustrated in FIG. 10D, in response to detecting double clench gesture 1050c, computer system 600 ceases to display menu 732 (e.g., while computer system 600 has continued to operate in the hand gesture navigation mode). At FIG. 10D, computer system 600 detects pinch gesture 1050d. As illustrated in FIG. 10E, in response to detecting pinch gesture 1050d, computer system 600 moves the focus indicator downward and to the left, such that the focus indicator is displayed around application icon 1010d and not displayed around application icon 1010c. Computer system 600 displays the focus indicator around application icon 1010d because a determination was made that application icon 1010d was the next control (e.g., in response to detecting pinch gesture 1050d). In some embodiments, this determination was made using one or more techniques discussed above in relation to FIGS. 9A-9H. At FIG. 10E, computer system 600 detects clench gesture 1050e. At FIG. 10F, in response to detecting clench gesture 1050e, computer system 600 activates application icon 1010d and displays an application (e.g., breather application) that corresponds to application icon 1010d (e.g., a breathing application icon).

FIGS. 11A-11H illustrate exemplary user interfaces for navigating user interfaces using hand gestures, in accordance with some embodiments. The user interfaces in these figures are used to illustrate the processes described below, including the processes in FIGS. 15-16. In particular, FIGS. 11A-11H illustrate an exemplary scenario where computer system 600 automatically scrolls through a user interface and performs different operations in response to detecting one or more hand gestures. In some embodiments, computer system 600 automatically scrolls through the user interface when the computer system is operating in a digital hardware operation mode (e.g., a hand gesture navigation mode) using one or more techniques as described in relation to FIGS. 11A-11H. In some embodiments, computer system 600 begins operating in the digital hardware operation mode in response to activation of digital hardware operation control 732a. In some embodiments, computer system 600 automatically scrolls through the user interface in a similar and/or performs the same operation(s) as the operation(s) that are performed in response to computer system 600 detecting an input (e.g., a rotatable input) on input mechanism. In some embodiments, computer system 600 automatically scrolls through the user interface when the computer system is operating in an automatic scrolling mode (e.g., as discussed below in relation to 1412).

Figure 11A:
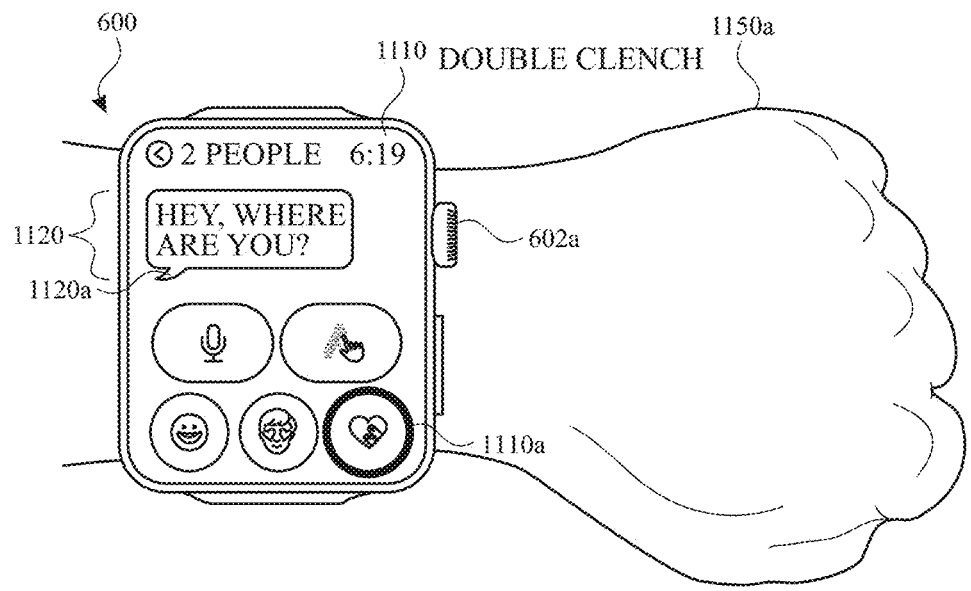
FIGS. 11A-11H illustrate exemplary user interfaces for navigating user interfaces using hand gestures, in accordance with some embodiments.

FIG. 11A illustrates computer system 600 displaying text message user interface 1110. Text message user interface 1110 includes text message region 1120 and one or more controls that include animated image control 1110a. As illustrated in FIG. 11A, text message region 1120 includes text message 1120a ("HEY, WHERE ARE YOU?"). As illustrated in FIG. 11A, computer system 600 is displaying a focus indicator around animated image control 1110a, which is displayed at the bottom of text message user interface 1110. At FIG. 11A, computer system 600 detects double clench gesture 1150a.

Figure 11B:
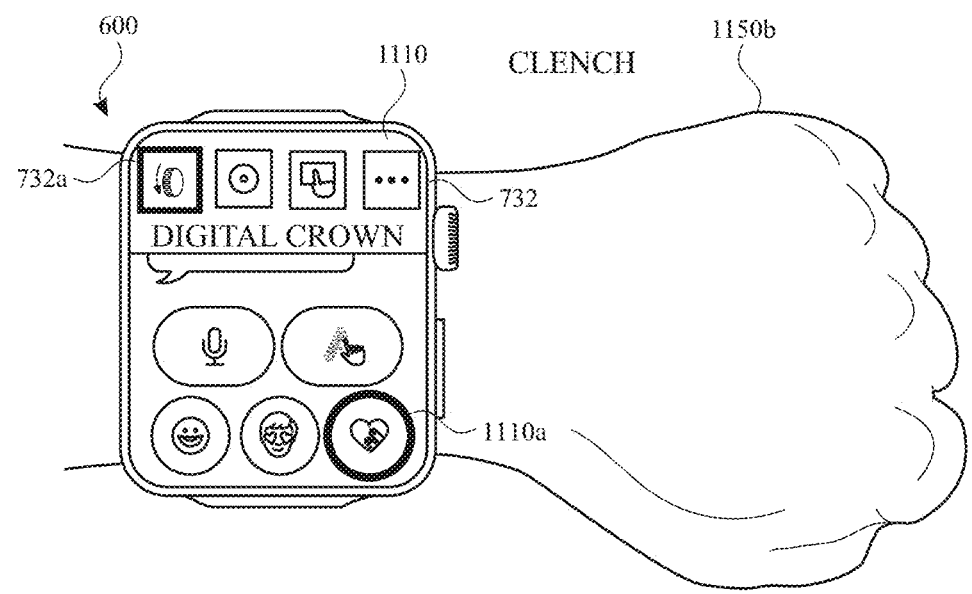

As illustrated in FIG. 11B, in response to detecting double clench gesture 1150a, computer system 600 displays menu 732 that includes digital hardware operation control 732a. At FIG. 11B, computer system 600 displays menu 732 at the top of text message user interface 1110. In some embodiments, computer system 600 displays menu 732 at the top of text message user interface 1110 because the focus indicator was displayed around animated image control 1110a, and animated image control 1110a is displayed at the bottom of text message user interface 1110. In some embodiments, computer system 600 displays menu 732 at the bottom (or another area of a user interface) in response to a determination that a selected control (e.g., a control with a focus indicator around it) is not displayed at the bottom of media user interface 1110. At FIG. 11B, computer system 600 detects double clench gesture 1150b while the focus indicator is displayed around digital hardware operation control 732a.

Figure 11C:
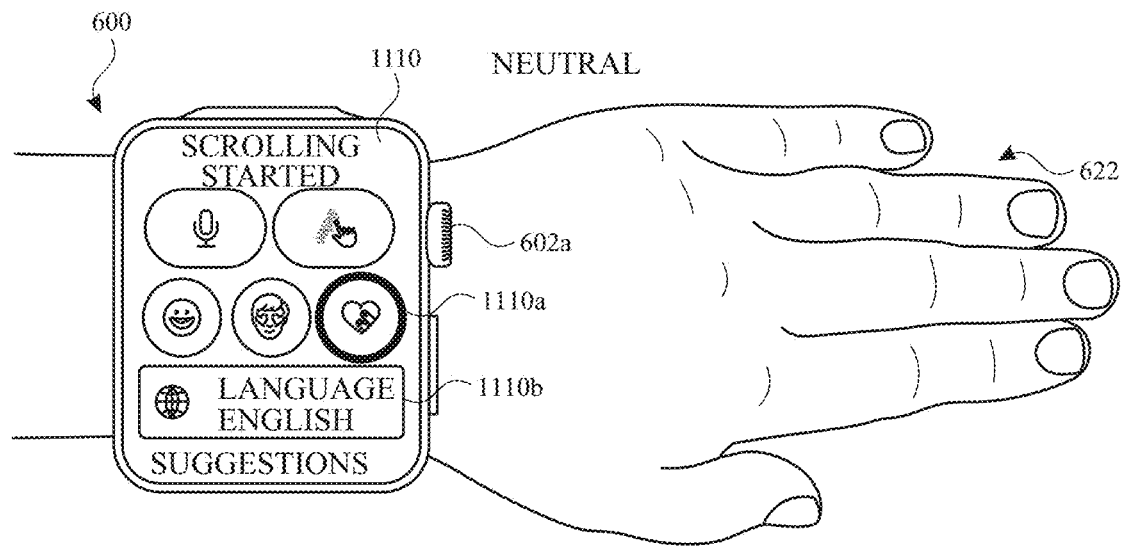
Figure 11D:
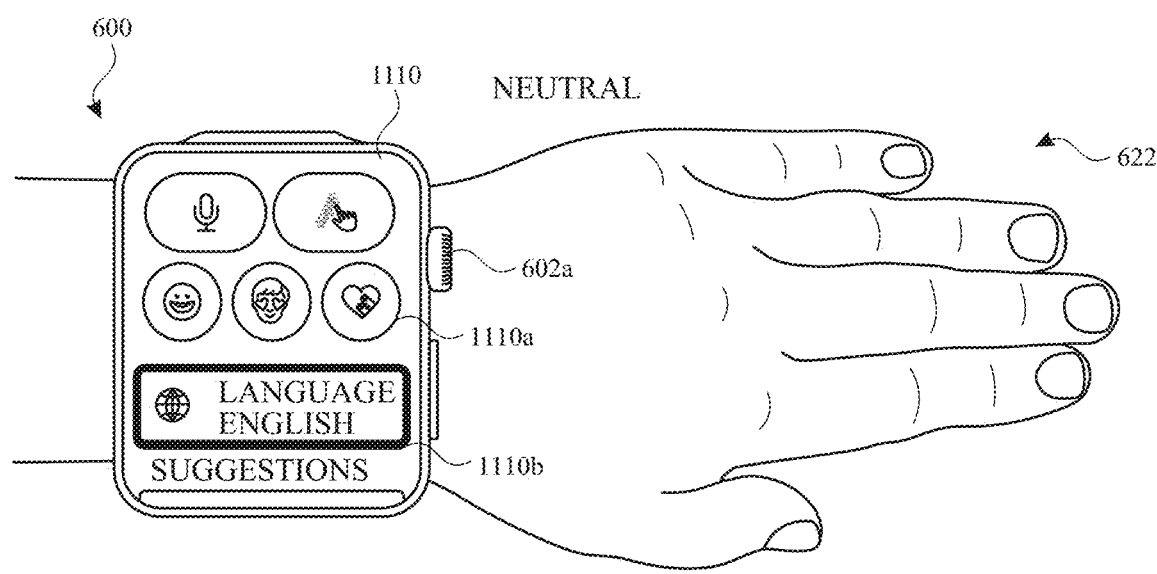
Figure 11E:
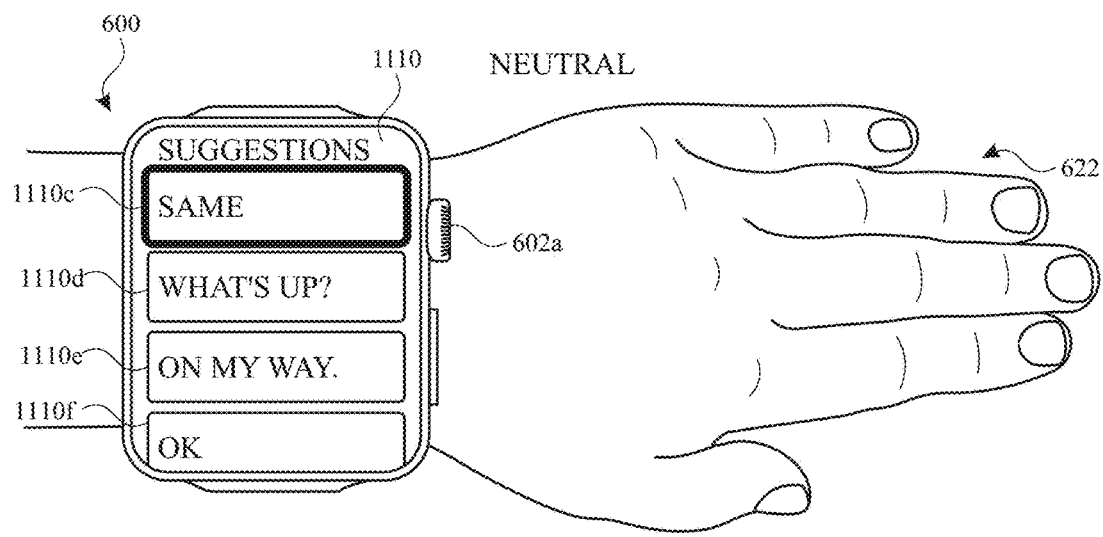
Figure 11F:
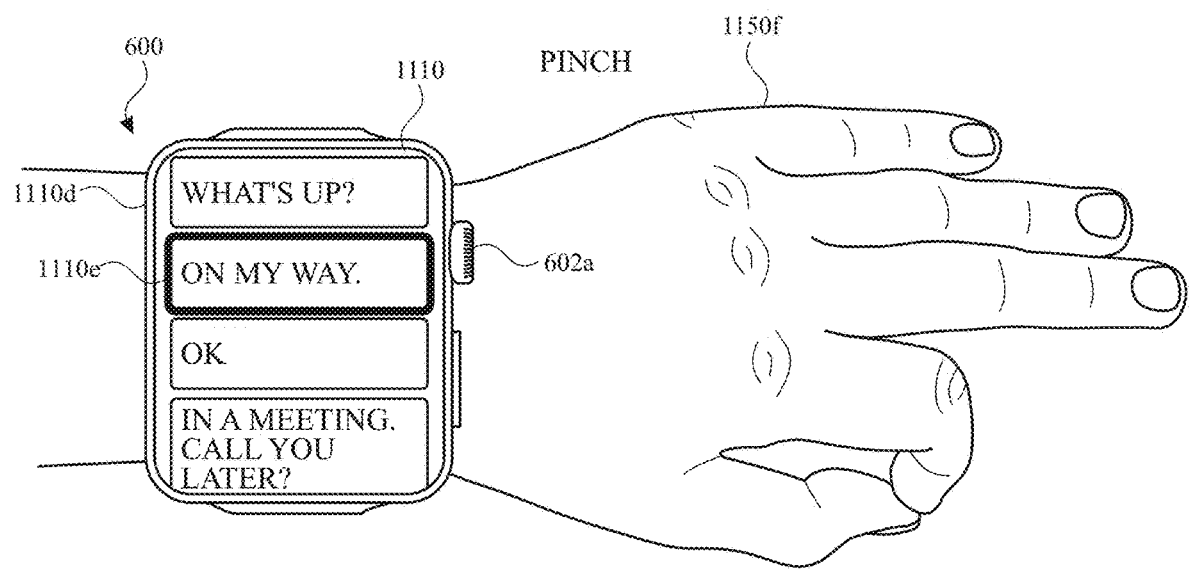
Figure 11G:
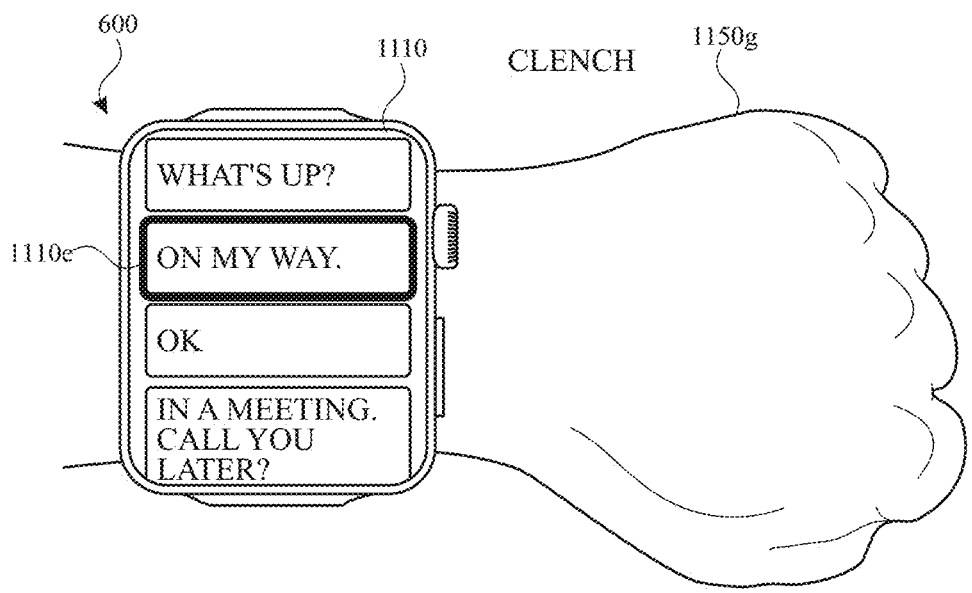
Figure 11H:
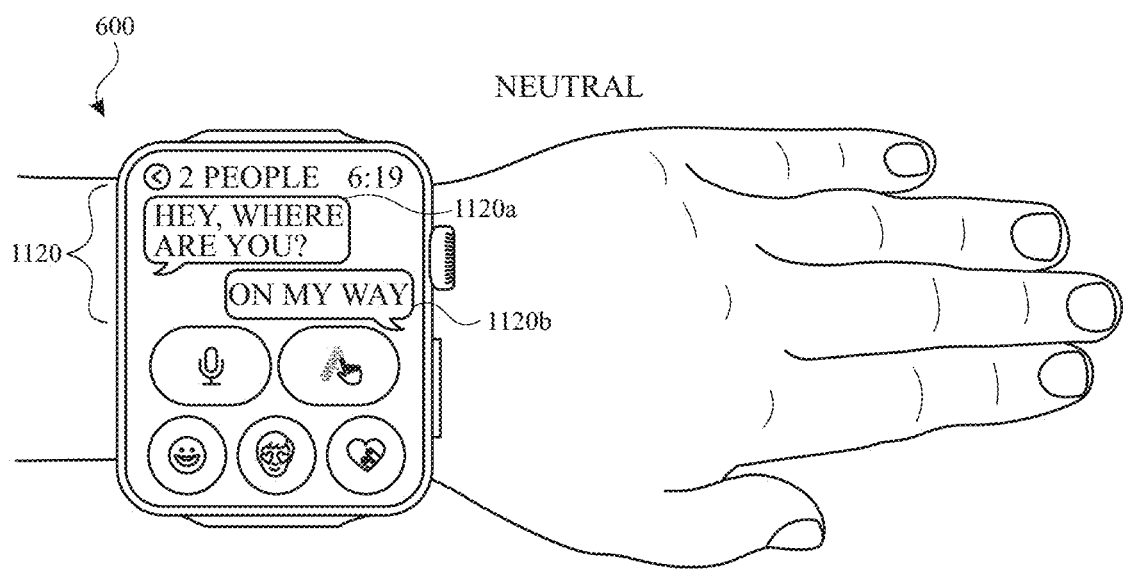

As illustrated in FIG. 11C, in response to detecting double clench gesture 1150b, computer system 600 begins operating in a digital hardware operation mode (e.g., and/or an automatic scrolling mode). While operating in the digital hardware operation mode, computer system 600 performs operations as if one or more inputs (e.g., rotational inputs, press inputs, sliding inputs) were received at an input mechanism of computer system 600. Sometime after displaying the user interface of FIG. 10C, computer system 600 performs an operation that is consistent with one or more inputs being detected on input mechanism 602a without detecting an input and/or hand gesture (e.g., hand 622 being in the neutral position). As illustrated in FIG. 11D, when performing the operation, computer system 600 moves the focus indicator from being around animated image control 1110a to be around language control 1110b (e.g., without an input being detected on input mechanism 602a), which is an operation that is consistent with an input being detected on input mechanism 602a. Sometime after displaying the user interface of FIG. 11D, computer system 600 performs another operation that is consistent with one or more inputs being detected on input mechanism 602a without detecting an input and/or hand gesture (e.g., hand 622 being in the neutral position). As illustrated in FIG. 11E, when performing the operation, computer system 600 scrolls text message user interface 1110 and moves the focus indicator from being around language control 1110b to be around reply control 1110c. Sometime after displaying the user interface of FIG. 11E, computer system 600 performs another operation that is consistent with one or more inputs being detected on input mechanism 602a without detecting an input and/or hand gesture (e.g., hand 622 being in the neutral position), computer system 600 scrolls text message user interface 1110 (e.g., a new control is displayed) and moves the focus indicator from being around reply control 1110c to be around reply control 1110e. At FIG. 11F, computer system 600 detects pinch gesture 1150f while the focus indicator is displayed around reply control 1110e. As illustrated in FIG. 11G, in response to detecting pinch gesture 1150f, computer system 600 ceases to automatically perform operations that are consistent with one or more inputs being detected on input mechanism 602a (e.g., and/or pausing the scrolling). In some embodiments, in response to detecting an additional pinch gesture, computer system 600 resumes performing operations that are consistent with one or more inputs being detected on input mechanism 602a.

At FIG. 11G, computer system 600 detects clench gesture 1150g while the focus indicator is displayed around reply control 1110e. As illustrated in FIG. 11G, in response to detecting clench gesture 1150g, reply control 1110e is activated. At FIG. 11G, in response to detecting clench gesture 1150g, computer system 600 inserts reply message 1120b ("ON MY WAY") that corresponds to reply control 1110e in text message region 1120. In some embodiments, computer system 600 sends reply message 1120b to one or more external computer systems that are a part of a text messaging conversation.

FIGS. 12A-12J illustrate exemplary user interfaces for navigating user interfaces using hand gestures, in accordance with some embodiments. The user interfaces in these figures are used to illustrate the processes described below, including the processes in FIGS. 15-16.

In particular, FIGS. 12A-12J illustrate an exemplary scenario where computer system 600 automatically scrolls through a user interface and performs different operations in response to detecting one or more hand gestures. In some embodiments, computer system 600 automatically scrolls through the user interface when the computer system is operating in a digital hardware operation mode (e.g., a hand gesture navigation mode) using one or more techniques as described in relation to FIGS. 12A-12J. In some embodiments, computer system 600 begins operating in the digital hardware operation mode in response to activation of digital hardware operation control 732a. In some embodiments, computer system 600 automatically scrolls through the user interface in a similar and/or performs the same operation(s) as the operation(s) that are performed in response to computer system 600 detecting an input (e.g., a rotatable input) on input mechanism. In some embodiments, computer system 600 automatically scrolls through the user interface when the computer system is operating in an automatic scrolling mode (e.g., as discussed below in relation to 1412).

Figure 12A:
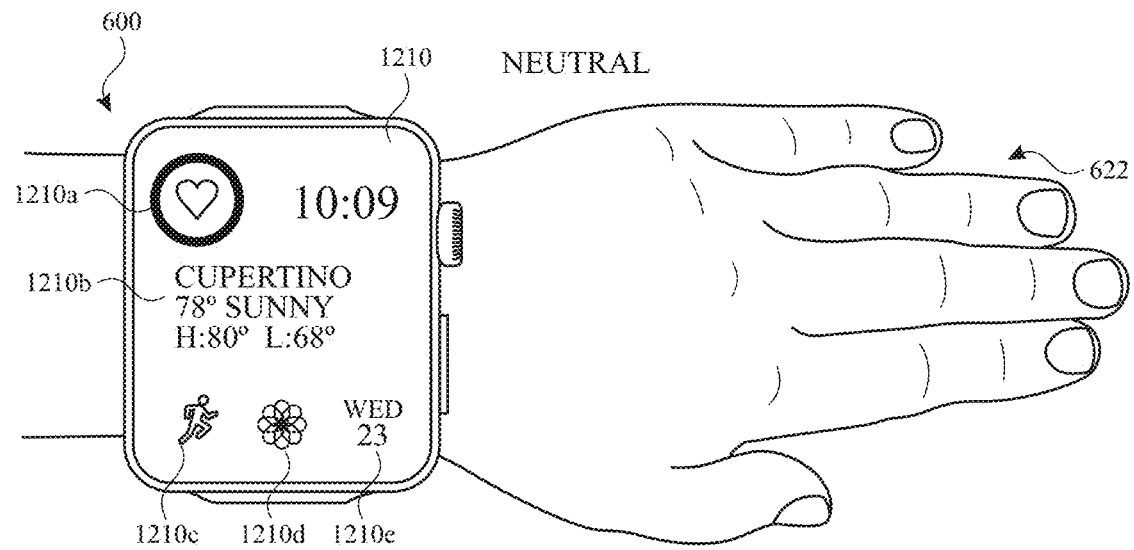
FIGS. 12A-12J illustrate exemplary user interfaces for navigating user interfaces using hand gestures, in accordance with some embodiments.
Figure 12B:
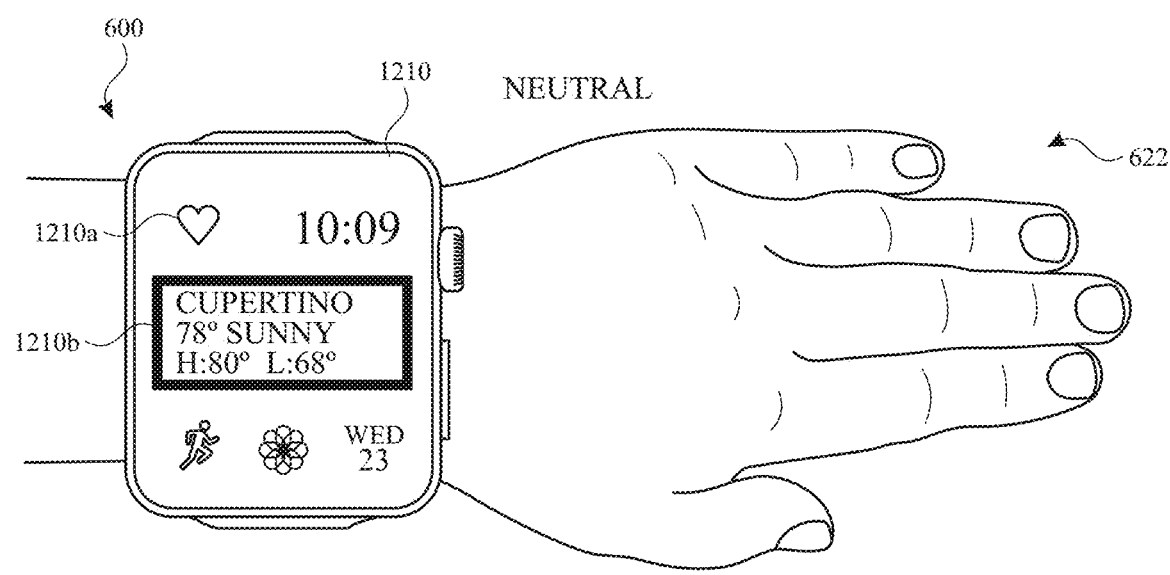
Figure 12C:
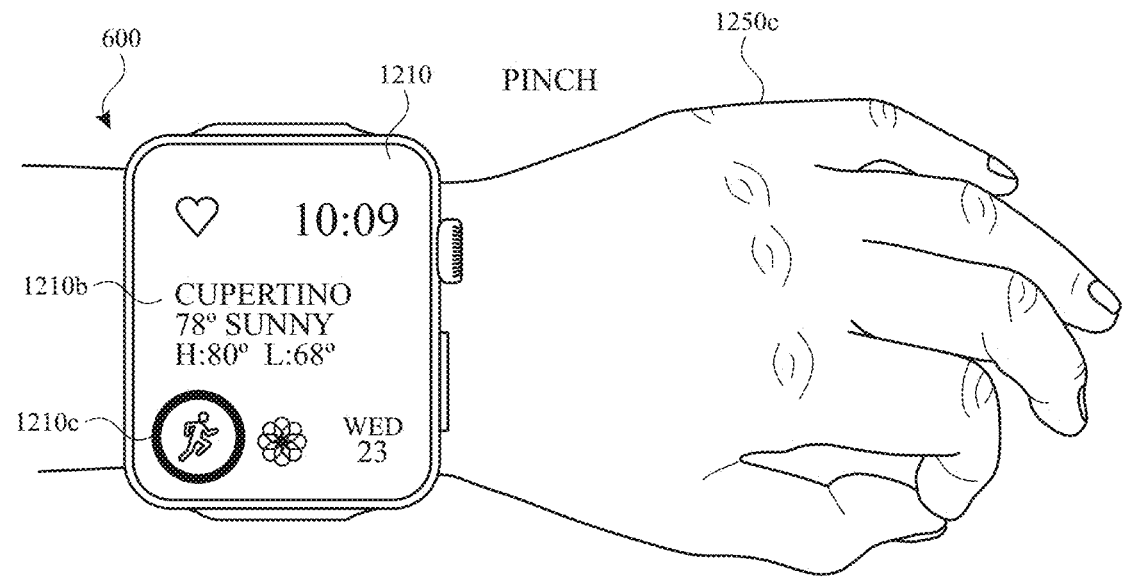
Figure 12D:
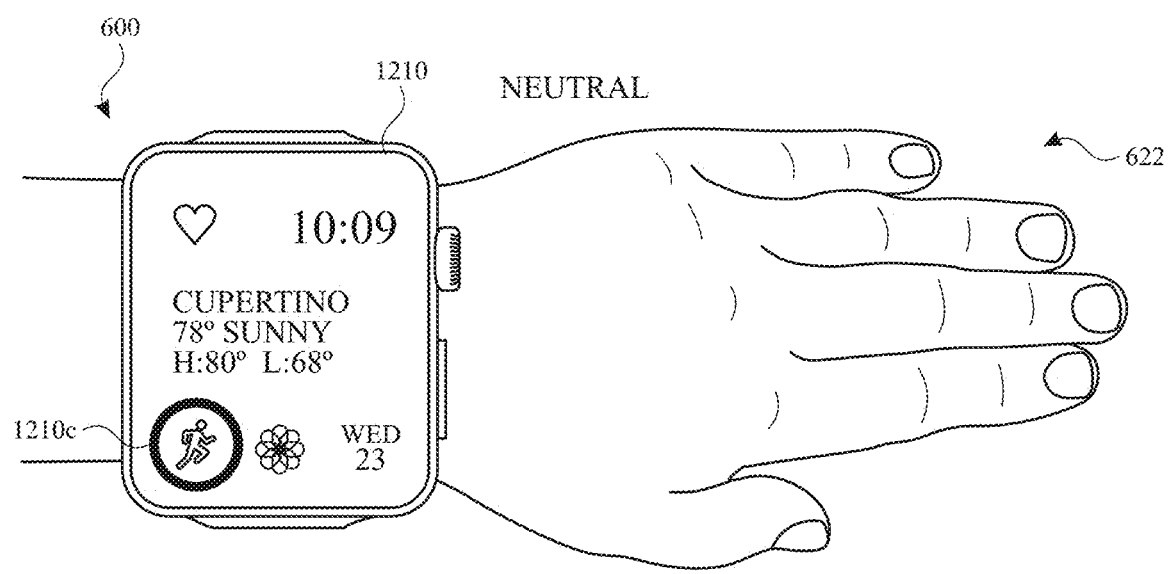
Figure 12E:
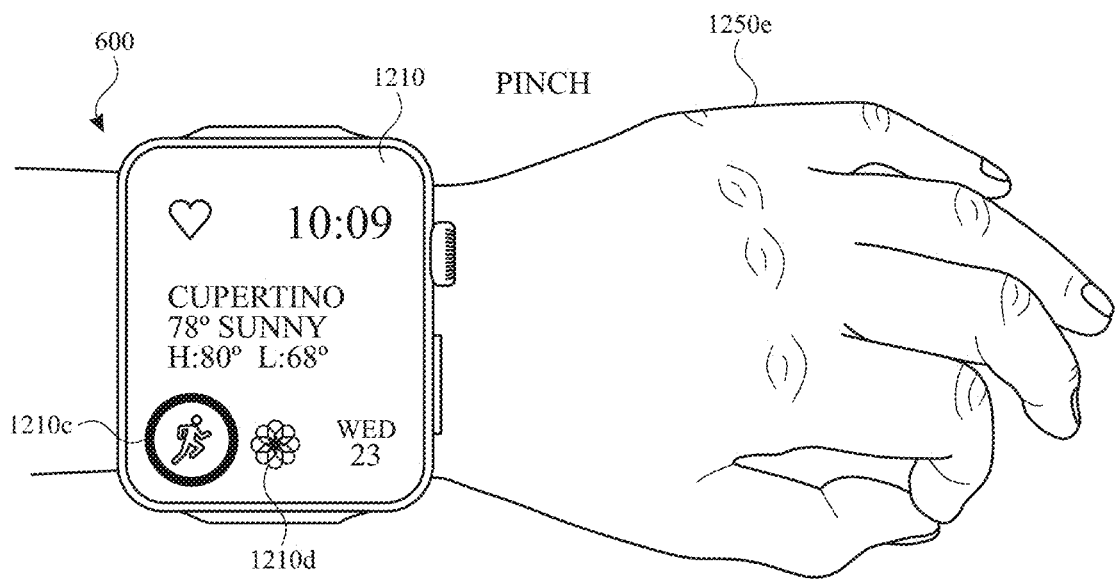
Figure 12F:
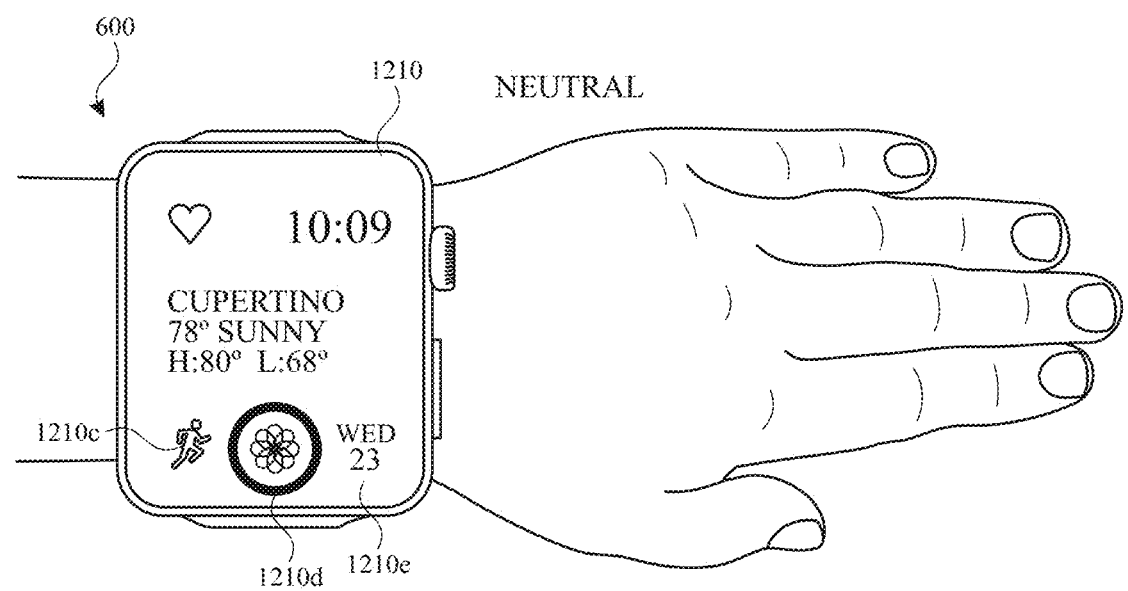
Figure 12G:
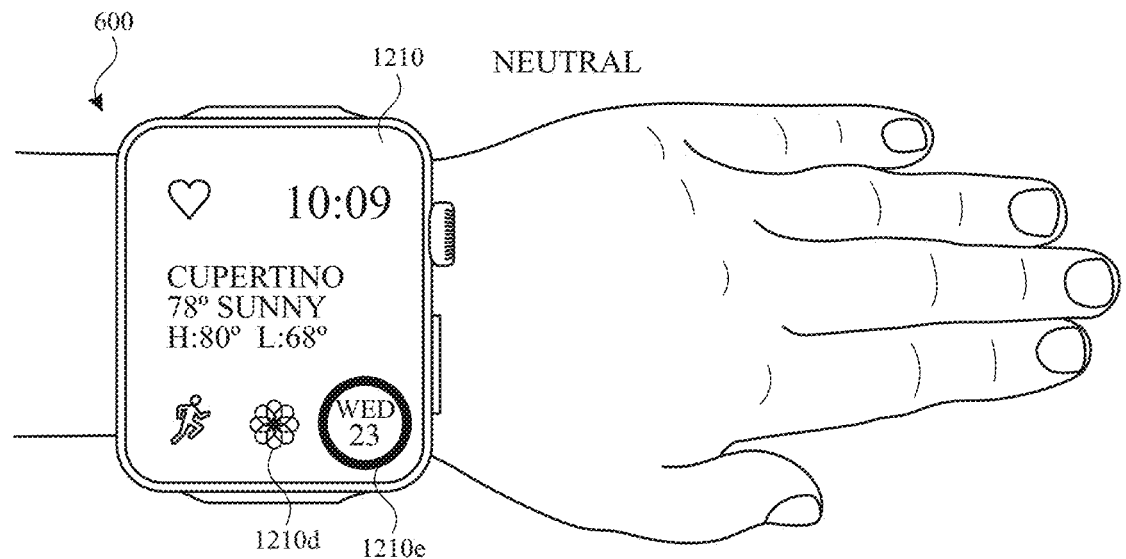

FIG. 12A illustrates computer system 600 displaying clock face user interface 1210. Clock face user interface 1210 includes selectable controls 1210a-1210e. At FIG. 12A, computer system 600 is operating in an automatic scrolling mode. As illustrated in FIGS. 12A-12C, computer system 600 automatically (e.g., as indicated by hand 622 being in the neutral position) moves the focus indicator between selectable controls 1210a-1210c (e.g., without computer system 600 detecting an input) (e.g., at a first speed). At FIG. 12C, computer system 600 detects pinch gesture 1250c while focus indicator is displayed around selectable control 1210c. As illustrated in FIG. 12D, in response to detecting pinch gesture 1250c, computer system 600 stops automatically moving the focus indicator between selectable controls and continues to display the focus indicator around selectable control 1210c (e.g., as indicated by hand 622 being in the neutral position). At FIG. 12E, computer system 600 detects pinch gesture 1250e while focus indicator is displayed around selectable control 1210c. As illustrated in FIG. 12F-12G, in response to detecting pinch gesture 1250e, computer system 600 resumes moving the focus indicator (e.g., displaying the focus indicator around selectable control 1210d and, then around selectable control 1210e).

Figure 12H:
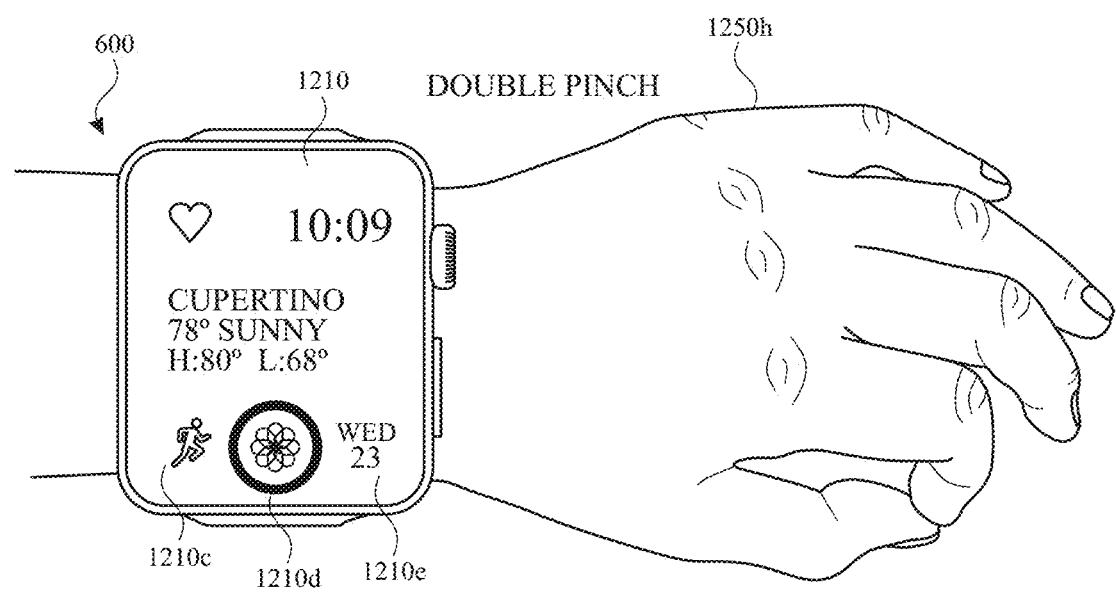
Figure 12I:
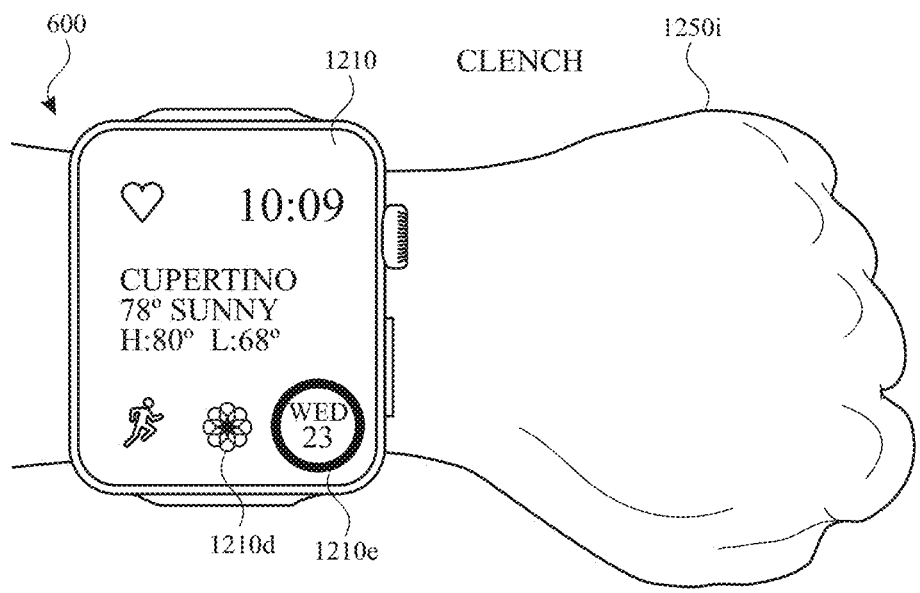
Figure 12J:
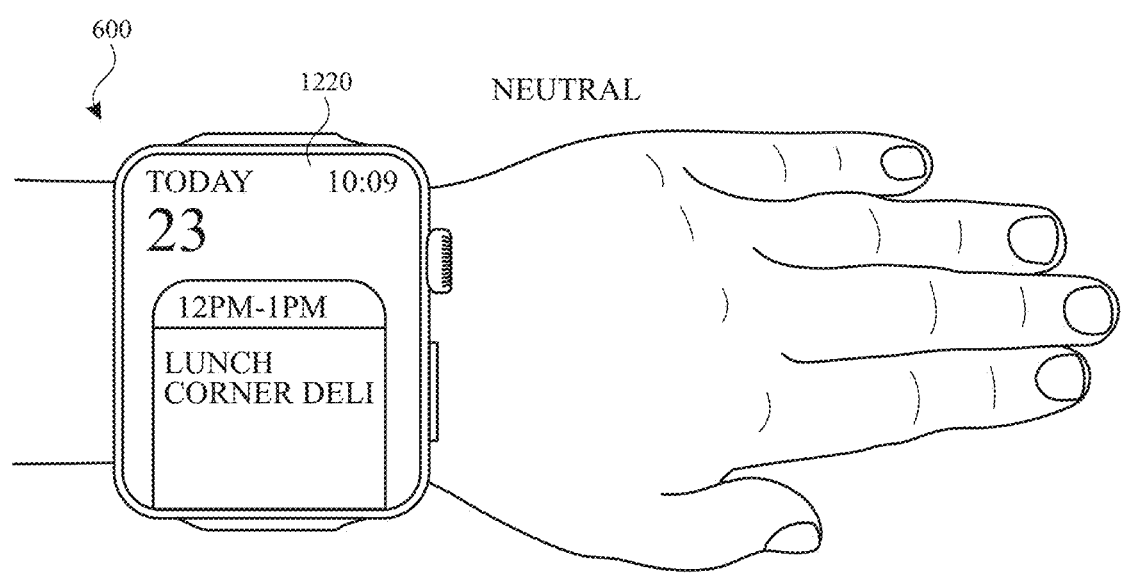

At FIG. 12H, computer system 600 moves focus indicator to the left, such that focus indicator is displayed around selectable control 1210d and not displayed around 1210e. At FIG. 12H, computer system 600 moves the focus indicator from selectable control 1210e to selectable control 1210d because 1210e is determined to be the last selectable control on clock face user interface 1210. Thus, at FIG. 12H, computer system 600 reverses the direction of movement of the focus indicator around selectable user interface objects of clock face user interface 1210. In some embodiments, computer system 600 displays the focus indicator around selectable control 1210c when a predetermined amount of time has passed. At FIG. 12H, computer system 600 detects double pinch gesture 1250h. At FIG. 12G, in response to detecting double pinch gesture 1250h, computer system 600 reverses the direction of the movement of focus indicator around selectable user interface objects of clock face user interface 1210. As illustrated in FIG. 12I, in response to detecting double pinch gesture 1250h, computer system 600 displays the focus indicator around selectable control 1210e (e.g., instead of displaying the focus indicator around selectable control 1210c to which computer system 600 would have displayed the focus indicator around if double pinch gesture 1250h was not detected). At FIG. 12I, computer system 600 detects clench gesture 1250i while the focus indicator is displayed around selectable control 1210e. As illustrated in FIG. 12J, in response to detecting clench gesture 1250j, computer system 600 activates selectable control 1210e. As illustrated in FIG. 12J, in response to detecting clench gesture 1250j, computer system 600 displays calendar application user interface 1220, which the user interface of an application that corresponds to selectable control 1210e.

FIGS. 13A-13G illustrate exemplary user interfaces for navigating user interfaces using hand gestures, in accordance with some embodiments. The user interfaces in these figures are used to illustrate the processes described below, including the processes in FIGS. 15-16.

Figure 13A:
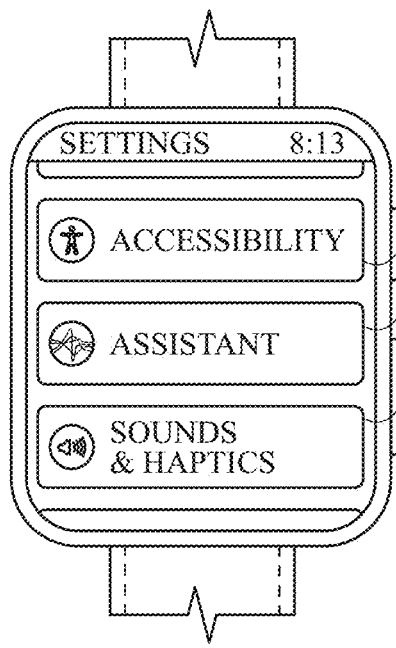
FIGS. 13A-13G illustrate exemplary user interfaces for navigating user interfaces using hand gestures, in accordance with some embodiments.
Figure 13B:
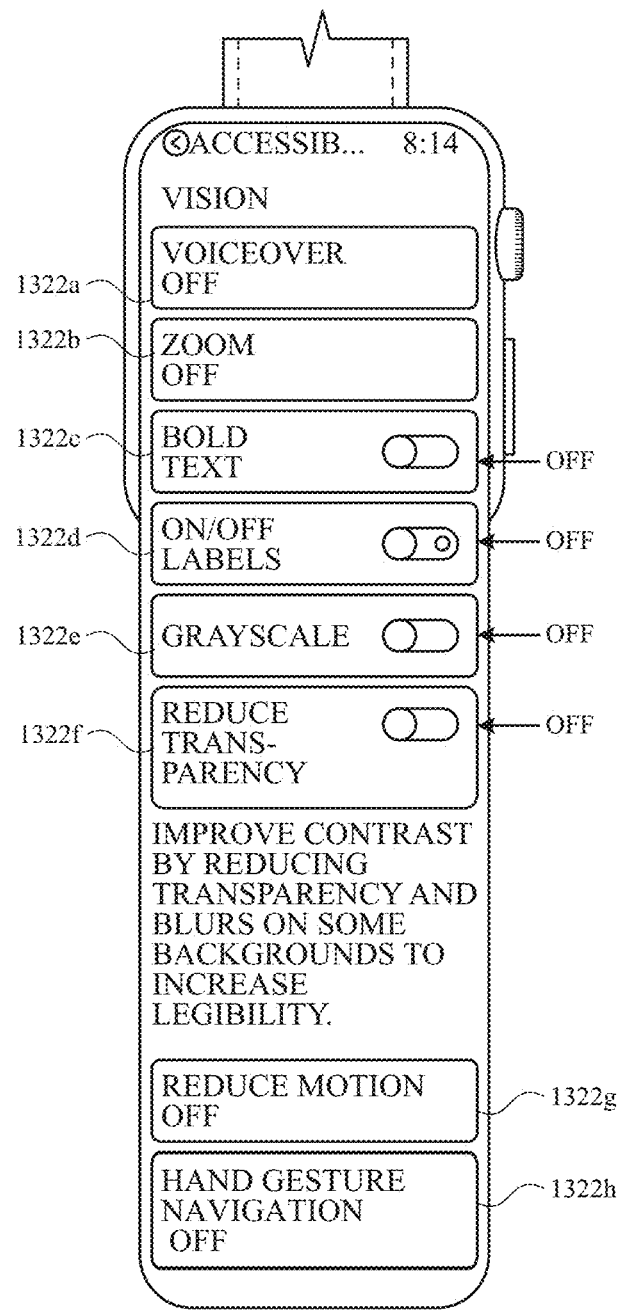

In particular, FIGS. 13A-13G illustrate one or more exemplary settings for controlling one or more hand gesture navigations modes (e.g., as described above in relation to FIGS. 7A-7AA, FIGS. 8A-8J, FIGS. 9A-9H, FIGS. 10A-10F, FIGS. 11A-11H, and FIGS. 12A-12J). FIG. 13A illustrates computer system 600 displaying one or more settings that include accessibility setting controls 1312a, 1312b, and 1312c. In some embodiments, in response to detecting an input on accessibility setting control 1312a, computer system 600 displays one or more of accessibility settings 1322a-1322f (e.g., as illustrated in FIG. 13B).

As illustrated in FIG. 13B, accessibility settings 1312a-1312f include hand gesture navigation control 1322h. In some embodiments, when hand gesture navigation control 1322h is off (e.g., inactive), computer system 600 does not perform operations in response to detecting hand gestures. In some embodiments, when hand gesture navigation control 1322h is on (e.g., active), computer system 600 performs operations in response to detecting hand gestures. In some embodiments, in response to detecting a gesture directed to hand gesture navigation control 1322h, computer system 600 displays the user interface of FIG. 13C.

Figure 13C:
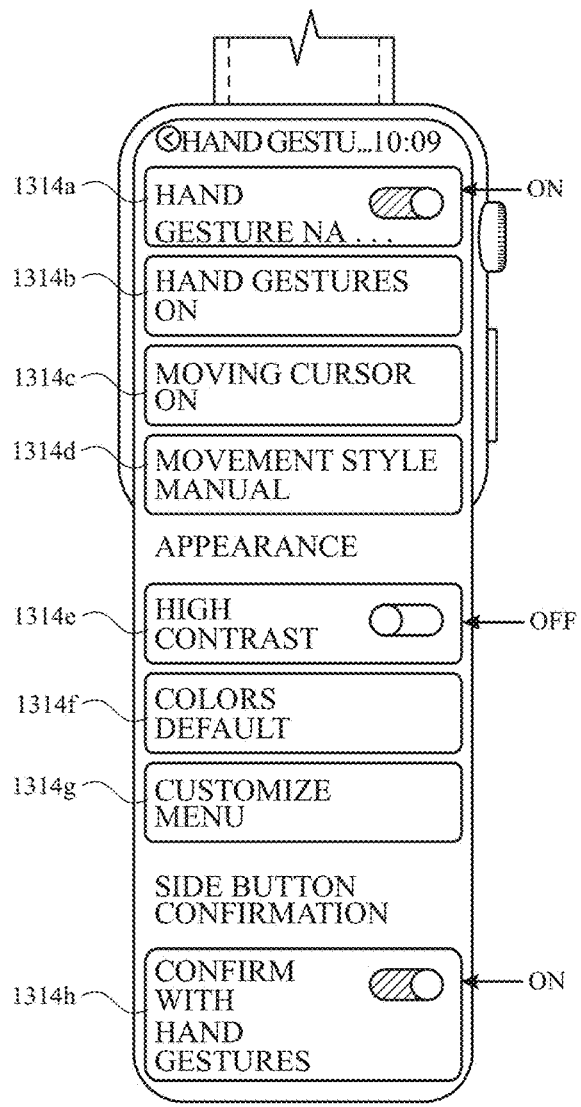

As illustrated in FIG. 13C, computer system 600 displays hand gesture navigation controls 1314a-1314h. The hand gesture navigation controls include main setting control 1314a, hand gesture control 1314b, moving cursor control 1314c, movement style control 1314d, and one or more appearance settings controls 1314e-1314g, and confirm with hand gestures controls 1314h. In response to detecting an input directed to main setting control 1314a, computer system 600 turns the hand gesture navigation mode on/off (e.g., as described above in relation to hand gesture navigation control 1322h). In response to detecting an input directed to hand gesture control 1314b, computer system 600 toggles hand gesture control 1314b on/off. When hand gesture control 1314b is on, computer system 600 is configured to perform one or more operations in response to detecting a hand gesture. When hand gesture control 1314b is off, computer system 600 is not configured to perform one or more operations in response to detecting a hand gesture. In response to detecting an input directed to moving cursor control 1314c, computer system 600 toggles moving cursor control on/off. When moving cursor control 1314c is on, computer system 600 can be configured to operate in a moving cursor mode (e.g., as described above in relation to FIGS. 7I-7U and FIGS. 8A-8J). When moving cursor control 1314c is off, computer system 600 cannot be configured to operate in a moving cursor mode (e.g., in response to a shake gesture and/or in response to detecting an input on moving cursor control 732b of menu 732 in FIG. 7N). In response to detecting an input directed to movement style control 1314d, computer system 600 toggles movement style control 1314*d* between different movement options. The different movement options include one or more of automatic movement and manual movement (e.g., of the focus indicator on a displayed user interface). In response to detecting an input directed to one or more appearance settings controls 1314*e*-1314*g*, computer system 600 changes one or more appearances of menu 732 (e.g., as described in relation to FIG. 7N), cursor 742 (e.g., as described in relation to FIGS. 7A-7AA), and indication 744 (e.g., as described in relation to FIGS. 7A-7AA), such as the color and/or controls of one or more user interfaces objects that are displayed. In response to an input directed to detecting confirm with hand gestures control 1314*h*, computer system 600 toggles confirm with hand gestures control 1314*h* on/off. When confirm with hand gestures control 1314*h* is on, computer system 600 is configured to confirm one or more operations (e.g., a payment transaction) in response to detecting one or more hand gestures. When confirm with hand gestures control 1314*h* is off, computer system 600 is not configured to confirm one or more operations in response to detecting one or more hand gestures.

Figure 13D:
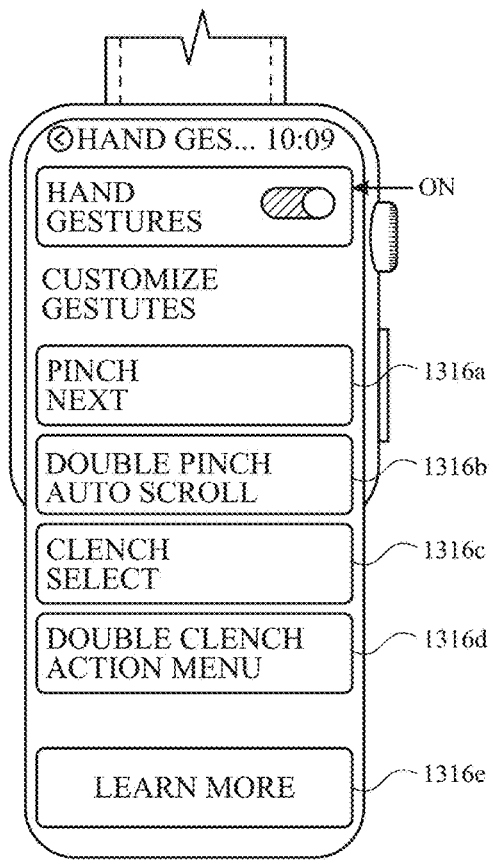

As illustrated in FIG. 13D, computer system 600 displays one or more setting controls (e.g., setting controls 1316*a*-1313*e*) for changing one or more operations that computer system 600 performs in response to detecting a respective hand gesture. In some embodiments, in response to detecting one or more gestures directed to learn control 1316*e*, computer system 600 displays the user interface of FIG. 13E.

Figure 13E:
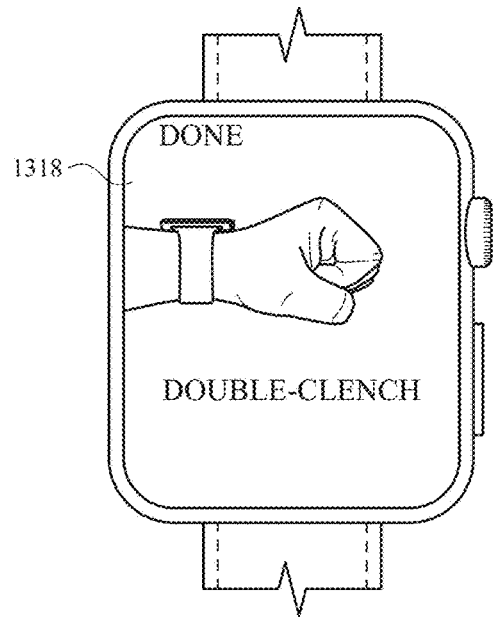

As illustrated in FIG. 13E, computer system 600 displays user interface 1318. User interface 1318 can include one or more instructions (e.g., with graphical representations) that indicate how the user can perform one or more gestures. In some embodiments, at FIG. 13C, computer system 600 displays the user interface of FIG. 13F in response to detecting a gesture directed to moving cursor control 1314*c*. In some embodiments, while displaying user interface 1318, computer system 600 will provide feedback as to whether a user has performed a gesture correctly and/or incorrectly during a learning mode session.

Figure 13F:
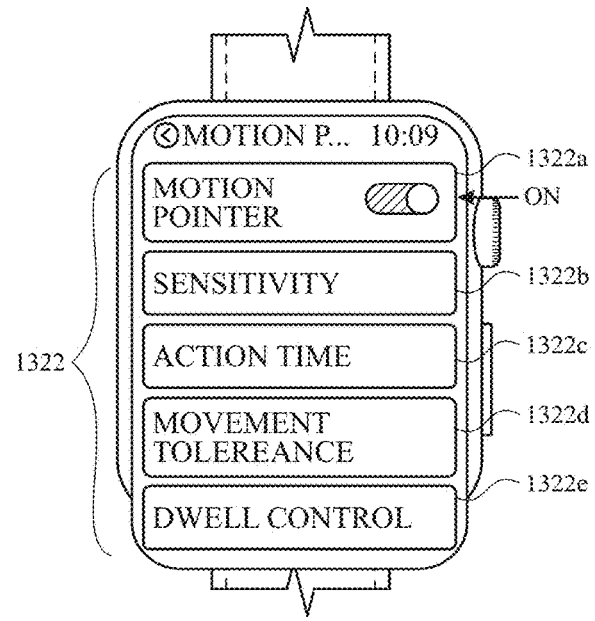
Figure 13G:
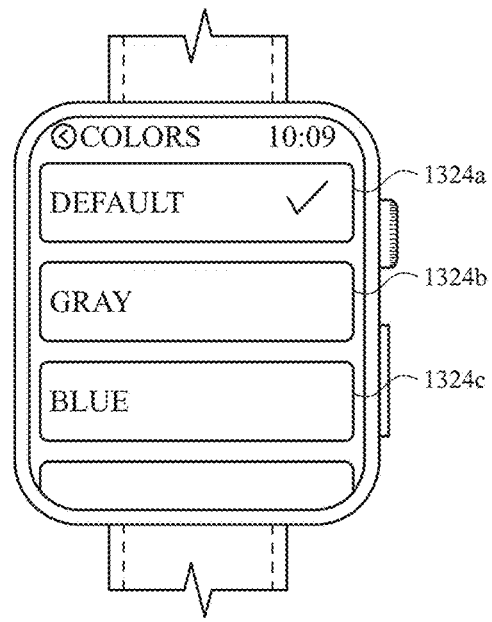

As illustrated in FIG. 13F, computer system 1300 displays one or more controls for controlling one or more aspect of a moving cursor mode, such as the sensitivity (e.g., 1322*b*) (e.g., how and/or how much a moving cursor moves in response to detecting movement (e.g., tilt) of computer system 600), active time (e.g., 1322*c*) (e.g., the predetermined amount of time that a moving cursor has to be located over a user interface object in order for an operation to be performed and/or the amount of time that the indication (e.g., indication 744 of FIG. 7N) represents), movement tolerance (e.g., 1322*d*) (e.g., how much movement that needs to be performed before indication 744 is reset and/or the animation ceases to be displayed after moving cursor has been moved from a location that corresponds to a user interface object), and dwell control (e.g., 1322*e*) (e.g., the predetermined amount of time that a moving user has to be located over a user interface object in order for an operation to be performed and/or whether computer system can begin operation in the moving cursor mode via one or more shake inputs). At FIG. 13G, computer system 600 displays one or more settings for changing the color (e.g., 1324*a*-1324*c*) of a moving cursor.

FIG. 14 illustrates multiple menu controls that can be displayed on menu 732 (e.g., as described above in relation to FIG. 7N). Menu 732 can include a hierarchy of controls, such as the hierarchy of controls described in relation to FIG. 14. In some embodiments, in response to detecting input directed to interaction control 1410, computer system 600 displays one or more of tap control gesture 1410*a* (e.g., as described above in relation to 832*a*), moving cursor control 1410*b* (e.g., as described above in relation to moving cursor control 732*b*), digital hardware operation control 1410 (e.g., as described above in relation to digital hardware operation 732*a*). In some embodiments, in response to detecting input directed to system control 1414, computer system 600 displays one or more of icon grid 1414*a* (e.g., that, when activated, displays a grid that including multiple application icons), control center 1414*b* (e.g., that, when activated, displays one or more device controls, such as a Wi-Fi control for toggling a Wi-Fi setting, a Bluetooth control for toggling a Bluetooth setting, a mute control for toggling sound output on/or), settings 1414*c* (e.g., that, when activated, displays one or more settings for configured the computer system, as described above in relation to FIGS. 13A-13G), and dock control 1414*d* (e.g., that, when activated, displays one or more controls for navigating to one or more applications (e.g., open applications and/or applications that are running in the background)). In some embodiments, in response to detecting input directed to additional options control 1416 (e.g., 732*d*), computer system 600 displays wallet control 1416*a* (e.g., that, when activated, causes computer system 600 to display one or more user interface object for initiating a payment transaction), side button 1416*b* (e.g., that, when activated, causes computer system 600 to perform one or operations that are consistent with input mechanism 602*b* be pressed, such as turning computer system 600 off), and gesture mode 1416*c* (e.g., that, when activated, causes computer system 60 to begin operating in a gesture mode). In some embodiments, in response to detecting an input directed to auto-scroll control 1412, computer system 600 begins operating in an auto-scrolling mode (e.g., as described above in relation to FIGS. 11A-11H and FIGS. 12A-12J). In some embodiments, in response to detecting an input directed to exit control 1418, computer system 600 ceases to display menu 732 (e.g., as described above in relation to FIG. 7N). In some embodiments, menu 732 includes one or more controls that are not shown in FIG. 14. In some embodiments, the controls of menu 732 are in a different hierarchy than the one described in FIG. 14.

FIG. 15 is a flow diagram illustrating a method for 1500 using a computer system in accordance with some embodiments. Method 1500 is performed at a computer system (e.g., 100, 300, 500) (e.g., a wearable device (e.g., a smartwatch)) that is in communication with a display generation component (e.g., a display controller, a touch-sensitive display system) and an optical sensor (e.g., a hear rate sensor). In some embodiments, the computer system is in communication with one or more sensors (e.g., one or more biometric sensors (e.g., an optical sensor (e.g., a heart rate sensor), a camera), a gyroscope, an accelerometer)). In some embodiments, the computer system is in communication with one or more input devices (e.g., a touch-sensitive surface, a microphone). In some embodiments, the computer system is in communication with one or more output devices (e.g., one or more speakers, one or more microphones). Some operations in method 1500 are, optionally, combined, the orders of some operations are, optionally, changed, and some operations are, optionally, omitted.

As described below, method 1500 provides an intuitive way for navigating user interfaces using hand gestures. The method reduces the cognitive burden on a user for navigating user interfaces using hand gestures, thereby creating a more efficient human-machine interface. For battery-operated computing devices, enabling a user to navigate user interfaces faster and more efficiently conserves power and increases the time between battery charges.

The computer system displays (1502), via the display generation component, a user interface that includes a first user interface object (e.g., 712a-712b, 910a-910h, or 1010a-1010d), a second user interface object (e.g., 712a-712b, 910a-910h, or 1010a-1010d), a third user interface object (e.g., 712a-712b, 910a-910h, or 1010a-1010d), and an indication (e.g., the focus indicator as discuss as being around 712a-712b, 910a-910h, or 1010a-1010d) that (e.g., a visual indication (e.g., highlighting (e.g., a border of), displaying text, enlarging) the first user interface object (e.g., 712a-712b, 910a-910h, or 1010a-1010d) is selected (e.g., without indicating that the second user interface object and the third user interface object is selected). In some embodiments, the first user interface object, the second user interface object, and the third user interface object are different from each other. In some embodiments, the first user interface object is displayed between the second user interface object and the third user interface object. In some embodiments, the first user interface object, the second user interface object, and the third user interface object are different user interface objects.

In some embodiments, while displaying the user interface that includes the first user interface object (e.g., 712a-712b, 910a-910h, or 1010a-1010d) (e.g., and while the computer system is in a first operation mode (e.g., first accessibility mode)), the second user interface object (e.g., 712a-712b, 910a-910h, or 1010a-1010d), the third user interface object (e.g., 712a-712b, 910a-910h, or 1010a-1010d), and the indication (e.g., the focus indicator as discuss as being around 712a-712b, 910a-910h, or 1010a-1010d) that the first user interface object is selected, the computer system detects (1504), via (e.g., using) at least the optical sensor (e.g., and/or one or more other sensors, such as a gyroscope, an accelerometer), a hand gesture (e.g., 750e, 750f, 750i, 750l, 750m, 750n, 950a, 950b, 950c, 950e, 950f, 950g, 1050b, 1050c, 1050d, or 1050e) (e.g., a first hand gesture) (e.g., that does not contact the device (e.g., not directed towards an object on the user interface and/or any device that is in communication with the device)) (e.g., a hand gesture that is not detected by one or more cameras of the device) (e.g., a hand gesture that occurs while the wrist of a user is located at a single location and/or does not move, a hand gesture that is detected while the computer system is being worn on a wrist (e.g., a wrist of a user)).

In some embodiments, in response to (1506), via at least the optical sensor, the hand gesture (e.g., 750e, 750f, 750i, 750l, 750m, 750n, 950a, 950b, 950c, 950e, 950f, 950g, 1050b, 1050c, 1050d, or 1050e) (and while displaying the user interface that includes the first user interface object, the second user interface object, the third user interface object) (e.g., and while the computer system is operating in a first operation mode) and in accordance with a determination that the hand gesture (e.g., 750e, 750f, 750i, 750l, 750m, 750n, 950a, 950b, 950c, 950e, 950f, 950g, 1050b, 1050c, 1050d, or 1050e) is a first type of gesture (e.g., 610, 620, 630, 640, 650) (e.g., type of hand gesture) (e.g., a finger tap/pinch gesture (e.g., a gesture where two or more fingers touch each other)) (and, in some embodiments, the first type of gesture is a non-finger tap/pinch gesture (e.g., a clench gesture (e.g., a gesture that makes a fist), a multi-clench gesture (e.g., a gesture that includes multiple clench gestures), a finger spreading gesture (e.g., a gesture where one or more fingers do not touch portion of hand), a multi-finger spreading gesture (e.g., a gesture that include multiple spreading gestures), and/or any combination thereof), the computer system displays (1508), via the display generation component, an indication (e.g., the focus indicator as discuss as being around 712a-712b, 910a-910h, or 1010a-1010d) that (e.g., a visual indication (e.g., highlighting (e.g., a border of), displaying text, enlarging) the second user interface object (e.g., 712a-712b, 910a-910h, or 1010a-1010d) (e.g., new user interface object that is selected) is selected (e.g., ceasing to display the indication that the first user interface object is selected and/or without displaying the indication that the third user interface object is selected) (e.g., without indicating that the first user interface object and the third user interface object is selected). In some embodiments, the indication that the second user interface object was not previously displayed before the first indication that the first user interface object was displayed. In some embodiments, in accordance with a determination that the hand gesture is the first type of gesture, the computer system moves an indication from (e.g., from being displayed around, adjacent to (e.g., above, below, next to)) the first user interface object (e.g., the indication that the first user interface object is selected) to (e.g., to being displayed around, adjacent to (e.g., above, below, next to)) the second user interface object (e.g., the indication that the second user interface object is selected).

In some embodiments, in response to (1506), via at least the optical sensor, the hand gesture (e.g., 750e, 750f, 750i, 750l, 750m, 750n, 950a, 950b, 950c, 950e, 950f, 950g, 1050b, 1050c, 1050d, or 1050e) (and while displaying the user interface that includes the first user interface object, the second user interface object, the third user interface object) (e.g., and while the computer system is operating in a first operation mode) and in accordance with a determination that the hand gesture (e.g., 750e, 750f, 750i, 750l, 750m, 750n, 950a, 950b, 950c, 950e, 950f, 950g, 1050b, 1050c, 1050d, or 1050e) is a second type of gesture (e.g., 610, 620, 630, 640, 650) (e.g., type of hand gesture) (e.g., a multi-finger tap/pinch gesture (e.g., a gesture where two or more fingers touch each other multiple times)) (and, in some embodiments, the first type of gesture is a non-finger tap/pinch gesture (e.g., a clench gesture (e.g., a gesture that makes a fist), a multi-clench gesture (e.g., a gesture that includes multiple clench gestures), a finger spreading gesture (e.g., a gesture where one or more fingers do not touch portion of hand), a multi-finger spreading gesture (e.g., a gesture that include multiple spreading gestures), and/or any combination thereof) that is different from the first type of gesture, the computer system displays (1510), via the display generation component, an indication (e.g., the focus indicator as discuss as being around 712a-712b, 910a-910h, or 1010a-1010d) that (e.g., a visual indication (e.g., highlighting (e.g., a border of), displaying text, enlarging) the third user interface object (e.g., 712a-712b, 910a-910h, or 1010a-1010d) (e.g., a previous user interface object that was selected) is selected (e.g., without indicating that the first user interface object and the second user interface object is selected) (e.g., ceasing to display the indication that the first user interface object is selected and/or without displaying the indication that the second user interface object is selected). In some embodiments, the indication that the third user interface object was previously displayed before the first indication that the first user interface object was displayed. In some embodiments, in accordance with a determination that the hand gesture is the second type of gesture, the computer system moves an indication from (e.g., from being displayed around, adjacent to (e.g., above, below, next to)) the first user interface object (e.g., the indication that the first user interface object is selected) to (e.g., to being displayed around, adjacent to (e.g., above, below, next to)) the third user interface object (e.g., the indication that the second user interface object is selected). In some embodiments, at least two of the indication that the first user interface object is selected, the indication that the second user interface object is selected, and/or the indication the third user interface object is selected are different sizes. Choosing whether to display an indication that the second user interface object is selected or to display an indication that the third user interface object is selected based on the type of hand gesture that is detected provides the user with more control of the system and helps the user navigate the user interface without touching the computer system, which can lead to more efficient control of the user interface for some users.

In some embodiments, the hand gesture (e.g., 750e, 750f, 750i, 750l, 750m, 750n, 950a, 950b, 950c, 950e, 950f, 950g, 1050b, 1050c, 1050d, or 1050e) is detected based on heart rate data that is determined using data detected via the optical sensor. In some embodiments, the second type of gesture (e.g., 630 or 650) is a type of gesture that is multiple instances (e.g., multiple finger taps/pinches, multiple finger spreading gestures, and/or multiple clench gestures) of the first type of gesture (e.g., 620 or 640). In some embodiments, the second type of gesture includes at least one instance of the first type of gesture. Choosing whether to display an indication that the second user interface object is selected or to display an indication that the third user interface object is selected based on the type of hand gesture that is detected, where the second type of gesture is a type of gesture that is multiple instances of the first type of gesture, provides the user with more control of the system and helps the user navigate the user interface to perform a similar action differently (e.g., selecting an object to the right vs. selecting an object to the left) using similar hand gestures (e.g., where one hand gesture includes the other hand gesture) without touching the computer system, which can lead to more efficient control of the user interface for some users.

In some embodiments, in response to detecting, via at least the optical sensor, the hand gesture (e.g., 750e, 750f, 750i, 750l, 750m, 750n, 950a, 950b, 950c, 950e, 950f, 950g, 1050b, 1050c, 1050d, or 1050e) and in accordance with a determination that the hand gesture is a third type of gesture (e.g., 620, 630, 640, or 650) (e.g., type of hand gesture) that is different from the first type of gesture and the second type of gesture, the computer system performs (e.g., via the display generation component) an operation (e.g., an action) corresponding to selection of the first user interface object (e.g., selecting a play/pause button, selecting an interaction on the menu, selecting a cancel button, selecting an answer/decline button for an incoming phone call) (e.g., without displaying a menu that includes one or more selectable options). In some embodiments, in response to detecting, via at least the optical sensor, the hand gesture (e.g., 750e, 750f, 750i, 750l, 750m, 750n, 950a, 950b, 950c, 950e, 950f, 950g, 1050b, 1050c, 1050d, or 1050e) and in accordance with a determination that the hand gesture is a fourth type of gesture (e.g., 620, 630, 640, or 650) (e.g., type of hand gesture) that is different from the first type of gesture, the second type of gesture, and the third type of gesture, the computer system displays, via the display generation component, a menu that includes one or more selectable options (e.g., as described below in relation to method 1600) (e.g., without performing the option corresponding to selection of the first user interface object). Choosing whether to perform an operation corresponding to selection of the first user interface object or display a menu that includes one or more selectable options based on the type of hand gesture that is detected provides the user with more control of the system and helps the user navigate the user interface without touching the computer system, which can lead to more efficient control of the user interface for some users.

In some embodiments, before detecting the hand gesture (e.g., 750e, 750f, 750i, 750l, 750m, 750n, 950a, 950b, 950c, 950e, 950f, 950g, 1050b, 1050c, 1050d, or 1050e), the computer system (e.g., 600) is in a first operation mode (e.g., an operation mode where the computer system performs the operation (e.g., operation) described above (e.g., as described above in relation to FIGS. 7A-7I) in response to detecting one or more of the first type, second type, third type, and/or fourth type of gesture). In some embodiments, as a part of performing the operation corresponding to selection of the first user interface object (e.g., 1412 or 736a) (e.g., as described above in relation to FIGS. 11A-11H and 12A-12J), the computer system transitions the computer system from (e.g., 600) the first operation mode to a second operation mode (e.g., as described above in relation to FIGS. 7I-7U) (e.g., a mode where a cursor moves automatically across the display, a mode where the user interface is automatically scrolled in a direction (e.g., up, down, right, left, oblique), a mode where detection of one or more the first type, second type, third type, and/or fourth type of gestures cause the computer system to perform different operations than those perform when the computer system is operating in the first operation mode).

In some embodiments, while the computer system (e.g., 600) is in the second operation mode, the computer system detects, via at least the optical sensor, a second hand gesture (e.g., 750e, 750f, 750i, 750l, 750m, 750n, 950a, 950b, 950c, 950e, 950f, 950g, 1050b, 1050c, 1050d, or 1050e). In some embodiments, in response to detecting, via at least the optical sensor, the second hand gesture (e.g., while the computer system is in the second operation mode and not the first operation mode) and in accordance with a determination that the second hand gesture is the first type (e.g., 620, 630, 640, or 650) of gesture, the computer system toggles a first automatic scrolling operation between an active state (e.g., a resume state) and an inactive state (e.g., a paused state) (e.g., as discussed above in relation to FIGS. 12C-12E) (e.g., without reversing the direction of the automatic scrolling operation) (e.g., an operation where one or more user interface objects are automatically selected (e.g., without user input) in a sequence) (e.g., toggling an automatic scrolling operation between an active state and an inactive state is a different operation than displaying an indication that the second user interface object is selected). In some embodiments, in accordance with a determination that the hand gesture is the first type of gesture and in accordance with a determination that a scrolling operation is in the inactive state (e.g., a paused state, a scrolling paused state, a scrolling off state), the computer system transitions the automatic scrolling operation from the inactive state to the active state (e.g., resumes the scrolling operation). In some embodiments, in accordance with a determination that the hand gesture is the second type of gesture and in accordance with a determination that a scrolling operation is in the active state (e.g., a scrolling on state, a resumed state), the computer system transitions the automatic scrolling operation from the active state to the inactive state (e.g., pauses the scrolling operation). In some embodiments, in accordance with a determination that the automatic scrolling operation is active, the computer system displays a notification that indicates that the automatic scrolling operation is active. In some embodiments, in accordance with a determination that the automatic scrolling operation is inactive, the computer system a notification that indicates that the automatic scrolling operation is inactive and/or ceases to display the notification that indicates that the automatic scrolling operation is active. In some embodiments, in response to detecting, via at least the optical sensor, the second hand gesture (e.g., while the computer system is in the second operation mode and not the first operation mode) and in accordance with a determination that the second hand gesture is the second type of gesture, the computer system reverses a first direction of the first automatic scrolling operation (e.g., without toggling the automatic scrolling operation between an active state and an inactive state) (e.g., reversing a first direction of the automatic scrolling operation is a different operation than displaying an indication that the third user interface object is selected). In some embodiments, as apart of reversing the direction of the automatic scrolling operation, the computer system selects the user interface objects in a reverse order in which the user interfaces were previously selected and/or reverse an interface being scrolling in a direction. Choosing whether to toggle a first automatic scrolling operation between an active state and an inactive state or reverse a first direction of the automatic scrolling operation based on the type of hand gesture that is detected provides the user with more control of the system and helps the user navigate the user interface without touching the computer system, which can lead to more efficient control of the user interface for some users.

In some embodiments, in response to detecting, via at least the optical sensor, the second hand gesture (e.g., 750*e*, 750*f*, 750*i*, 750*l*, 750*m*, 750*n*, 950*a*, 950*b*, 950*c*, 950*e*, 950*f*, 950*g*, 1050*b*, 1050*c*, 1050*d*, or 1050*e*): in accordance with a determination that the second hand gesture is the third type of gesture (e.g., 610, 620, 630, 640, or 650), the computer system performs a second operation (e.g., changing a speed of the automatic scrolling operation); and in accordance with a determination that the second hand gesture is the fourth type of gesture (e.g., 610, 620, 630, 640, or 650), the computer system performs a third operation that is different from the second operation (e.g., selecting a user interface at the current location of a user interface object that was highlighted by the scrolling operation when the second hand gesture was detected, ending the automatic scrolling mode). Choosing whether to perform a first operation or a second operation based on the type of hand gesture that is detected provides the user with more control of the system and helps the user navigate the user interface without touching the computer system, which can lead to more efficient control of the user interface for some users.

In some embodiments, while the computer system (e.g., 600) is in the second operation mode, the computer system performs a second automatic scrolling operation that scrolls a sequence of a plurality of interface objects in a second direction (e.g., as discussed above in relation to FIGS. 12G-12H). In some embodiments, while performing the second automatic scrolling operation, the computer system detects an end of the sequence of the plurality of user interface objects (e.g., detecting that a scroll position is at or near the last user interface object in the sequence and/or detecting a boundary of the user interface) (e.g., as discussed above in relation to FIGS. 12G-12H). In some embodiments, in response to detecting the end of the sequence of the plurality of user interface objects, the computer system performs a third automatic scrolling operation that scrolls the sequence of a plurality of interface objects in a third direction that is different from (e.g., opposite from) the second direction (e.g., as discussed above in relation to FIGS. 12G-12H). Automatically performing a third automatic scrolling operation that scrolls the sequence of a plurality of interface objects in a third direction that is different from the second direction in response to detecting the end of the sequence of the plurality of user interface objects allows the computer system to provide the user with a method for automatically navigating the user interface without the user providing additional input to restart/reset the automatic navigation when the automatic navigation has cycled through the user interface objects on the user interface.

In some embodiments, in response to detecting, via at least the optical sensor, the second hand gesture (e.g., 750*e*, 750*f*, 750*i*, 750*l*, 750*m*, 750*n*, 950*a*, 950*b*, 950*c*, 950*e*, 950*f*, 950*g*, 1050*b*, 1050*c*, 1050*d*, or 1050*e*) and in accordance with a determination that the second hand gesture is the fourth type of gesture (e.g., 610, 620, 630, 640 or 650), the computer system transitions the computer system from the second operation mode to a third operation mode (and/or ending/exiting the second operation mode). In some embodiments, the third operation mode is the first operation mode. Transitioning the computer system from the second operation mode to a third operation mode in accordance with a determination that the second hand gesture is the fourth type of gesture provides the user with more control of the system and helps the user navigate the user interface without touching the computer system, which can lead to more efficient control of the user interface for some users.

In some embodiments, in accordance with a determination that the second hand gesture (e.g., 750*e*, 750*f*, 750*i*, 750*l*, 750*m*, 750*n*, 950*a*, 950*b*, 950*c*, 950*e*, 950*f*, 950*g*, 1050*b*, 1050*c*, 1050*d*, or 1050*e*) is the first type of gesture (e.g., 610, 620, 630, 640, or 650), the computer system displays a notification (e.g., 716) that indicates a state of the automatic scrolling operation (e.g., scrolling paused, scrolling stopped). Displaying a notification that indicates a state of the automatic scrolling operation in accordance with a determination that the second hand gesture is the first type of gesture provides the user with visual feedback that an operation has been performed in response to a hand gesture being detected, which can prevent the user from mistakenly performing multiple gesture that can cause the computer system to perform unnecessary operations and/or unintended operations.

In some embodiments, the third type of gesture (e.g., 610, 620, 630, 640, or 650) is a type of gesture that is multiple instances (e.g., multiple finger taps/pinches, multiple finger spreading gestures, and/or multiple clench gestures) of the fourth type of gesture (e.g., 610, 620, 630, 640, or 650). In some embodiments, the third type of gesture includes at least one instance of the fourth type of gesture. In some embodiments, the fourth type of gesture (e.g., 610, 620, 630, 640, or 650) does not include multiple instance of the first type of gesture (e.g., 610, 620, 630, 640, or 650) (and/or the second type of gesture) and the third type of gesture (e.g., 610, 620, 630, 640, or 650) does not include multiple instances of the second type of gesture (e.g., 610, 620, 630, 640, or 650) (and/or the first type of gesture) (e.g., as discussed above in relation to FIG. 6). In some embodiments, the fourth type of gesture does not include the first type of gesture and/or the second type of gesture. In some embodiments, the third type of gesture does not include the first type of gesture and/or the second type of gesture.

In some embodiments, in response to detecting, via at least the optical sensor, the second hand gesture (e.g., 750*e*,

750*f*, 750*i*, 750*l*, 750*m*, 750*n*, 950*a*, 950*b*, 950*c*, 950*e*, 950*f*, 950*g*, 1050*b*, 1050*c*, 1050*d*, or 1050*e*) and in accordance with a determination that a notification (e.g., a notification that corresponds to a phone call, an e-mail, a text message, a voice-mail message) was received within a threshold period of time and in accordance with a determination that the second hand gesture is the fourth type of gesture, the computer system performs an action related to the notification (e.g., answer the phone call, respond/open a text message and/or e-mail that corresponds to the notification, play a voice-mail message) (e.g., as discussed above in relation to FIG. 7H). Performing an action related to the notification in accordance with a determination that a notification was received within a threshold period of time and in accordance with a determination that the second hand gesture is the fourth type provides the user with more control of the system and helps the user navigate the user interface (e.g., cause the computer system to perform an action related to the notification) without touching the computer system, which can lead to more efficient control of the user interface for some users.

In some embodiments, the one or more selectable options (e.g., 732*a*-732*d*, 832*a*, or 1410-1418) includes a first selectable user interface object (e.g., 732*a*-732*d*, 832*a*, or 1410-1418) for changing operations that one or more hand gestures can cause to the computer system to perform. In some embodiments, selection of the first selectable user interface object causes the computer system to display a plurality of settings. In some embodiments, each setting controls an operation that the one or more hand gestures can cause the computer system to perform when the one or more hand gestures are detected by the computer system (e.g., as discussed above in relation to FIGS. 8A-8J). Displaying a menu that includes a first selectable user interface objects for changing what operations that one or more hand gestures can cause to the computer system to perform allows the computer system to provide the user with an option to perform an operation without requiring more complex hand gestures, which reduces the number of hand gestures that are used to perform the operation, and allows the user to customize the hand gestures that causes an operation to be performed.

In some embodiments, the one or more selectable options (e.g., 732*a*-732*d*, 832*a*, or 1410-1418) includes a second selectable option for transitioning the computer system to a fourth operation mode and a third selectable option for transitioning the computer system to a fifth operation mode that is different from the fourth operation mode. In some embodiments, selection of the second selectable option (e.g., 732*a*-732*d*, 832*a*, or 1410-1418) causes the computer system to transition to the fourth operation mode (e.g., an automatic scrolling mode, a cursor mode (e.g., as discussed herein in relation to method 1600). In some embodiments, selection of the third selectable option (e.g., 732*a*-732*d*, 832*a*, or 1410-1418) causes the computer system to transition to the fifth operation mode (e.g., an automatic scrolling mode, a cursor mode (e.g., as discussed herein in relation to method 1600). Displaying a menu that includes the second selectable option for transitioning the computer system to a fourth operation mode and the third selectable option for transitioning the computer system to a fifth operation mode that is different from the fourth operation mode provides the user with more control over the computer system by allowing the user to cause the computer system to transitioned to different operation modes (e.g., without providing more complex hand gestures) and also reduces the number of hand gestures that are used to perform the operation.

In some embodiments, the one or more selectable options (e.g., 732*a*-732*d*, 832*a*, or 1410-1418) include a fourth selectable option (e.g., 1416) for displaying one or more additional selectable options (e.g., an option that corresponds to an option to perform an operation that corresponds to an operation that is performed when an input is detected at the location of the selectable user interface object (e.g., second location); an option to perform operation, such as turning on/off the computer system, displaying a different menu and/or user interface; an option that corresponds to an operation that is perform in response to detecting an input via one or more input devices in communication with the computer system). In some embodiments, selection of the fourth selectable option causes the computer system (e.g., 600) to display the one or more additional selectable options (e.g., that, when selected, each cause the computer system to perform one or more operations (e.g., different operations)) that were not previously displayed before selection of the fourth selectable option. In some embodiments, in response to detecting of the fourth selectable option, the computer system ceases to display one or more selectable options that were displayed before selection of the fourth selectable option was detected. Displaying a menu that includes fourth selectable option for displaying one or more additional options provides the user with more control over the computer system by allowing the user to choose to display additional selectable options that were not previously displayed, reduces the number of hand gestures that are used to perform additional operations, and reduces the number of selectable user interface options that are displayed when the menu is initially displayed, which de-clutters the user interface.

In some embodiments, the menu is displayed: in accordance with a determination that a respective user interface object (e.g., a user interface object that is selected, a user interface object that is surrounded by a focus indicator) is at a first location on the user interface, at the first location (e.g., as discussed above in relation to FIG. 11B); and in accordance with a determination that the respective user interface object is not at the first location on the user interface, at a second location that is different from the first location (e.g., as discussed above in relation to FIG. 11B). Automatically choosing to display the menu at a location based on where a respective user interface object is displayed allows the computer system to avoid displaying the menu at a location of a user interface object that could be of interest to the user (e.g., a selected user interface object) and also reduces the number of inputs that a user would need to make to move the menu from impacting the display of the user interface object.

In some embodiments, while displaying a third menu (e.g., 732) that includes one or more selectable options (e.g., 732*a*-732*d*, 832*a*, or 1410-1418) (e.g., the menu that includes the one or more selectable options, the second menu that includes one or more selectable options), the computer system detects, via at least the optical sensor, a third hand gesture (e.g., as discussed above in relation to FIGS. 10A-10E). In some embodiments, in response to detecting, via at least the optical sensor, the third hand gesture (e.g., as discussed above in relation to FIGS. 10A-10E) and in accordance with a determination that the third hand gesture is the fourth type of gesture, the computer system ceases to display the third menu that includes the one or more selectable options. Ceasing to display the menu that includes the one or more selectable options in accordance with a determination that the third hand gesture is the fourth type of gesture provides the user with more control of the system and helps the user navigate the user interface without touching the computer system, which can lead to more efficient control of the user interface for some users.

In some embodiments, after displaying the user interface that includes the first user interface object (e.g., 732*a*-732*d*, 832*a*, or 1410-1418), the computer system detects, via at least the optical sensor, a fourth hand gesture. In some embodiments, in response to detecting, via at least the optical sensor, the fourth hand gesture and in accordance with a determination that the fourth hand gesture is a fifth type of gesture (e.g., and, in some embodiments, the fifth type of gesture is the same gesture as the fourth type of gesture) that is different from the first type of gesture and the second type of gesture (and/or the first type of gesture), the computer system transitions the computer system from an inactive state (e.g., a sleep state, a hibernate state, a reduced power mode state, a state where the display generation component is less bright than the display generation component in the active state) to an active (e.g., a wake state, a full power state) state (or transitioning the computer system from the active state to the inactive state) (e.g., as discussed above in relation to FIG. 14 (e.g., 1416*b*)). Transitioning the computer system from an inactive state to an active state in accordance with a determination that the fourth hand gesture is a fifth type of gesture provides the user with more control of the system without touching the computer system, which can lead to more efficient control of the user interface for some users.

In some embodiments, while displaying, via the display generation component, the indication that the second user interface object is selected, the computer system detects, via at least the optical sensor, a fifth hand gesture. In some embodiments, in response to detecting, via at least the optical sensor, the fourth hand gesture: in accordance with a determination that the fifth hand gesture is the first type of gesture, the computer system displays, via the display generation component, an indication that a fourth first user interface object (e.g., a next user interface object that was selected) is selected; and in accordance a determination that the fifth hand gesture is the second type of gesture, the computer system displays, via the display generation component, the indication that the first user interface object (e.g., a previous user interface object that was selected) is selected. In some embodiments, while displaying, via the display generation component, the indication that the third user interface object is selected, the computer system detects, via at least the optical sensor, a respective hand gesture. In some embodiments, in response to detecting the respective hand gesture and in accordance with a determination that the respective hand gesture is the first type of gesture, the computer system displays the indication that a fourth user interface object is selected that is different from the first, second, and third user interface objects. In some embodiments, in response to detecting the respective hand gesture and in accordance a determination that the respective hand gesture is the second type of gesture, the computer system displays the indication that the first user interface object is selected. Choosing whether to display an indication that a fourth first user interface object or to display the indication that the first user interface object is selected based on the type of hand gesture that is detected while the indication that the second user interface object is selected provides the user with more control of the system and helps the user navigate (e.g., consistently navigate the user interface in the same way) the user interface without touching the computer system, which can lead to more efficient control of the user interface for some users.

In some embodiments, while displaying the user interface that includes the first user interface object, the computer system detects a request to transition the computer system from a first operation mode to a fourth operation mode (e.g., as discussed above in relation to FIGS. 13A-13G and FIG. 14) (e.g., an operation mode where the computer system does not perform an operation in response to detecting a hand gesture and/or a mode where the computer system does not detect one or more hand gestures). In some embodiments, in response to detecting the request to transition the computer system from the first operation mode to the fourth operation mode, the computer system transitions the computer system from the first operation mode to the fourth operation mode (e.g., as described above in relation to 7A-7C). In some embodiments, while the computer system is in the fourth operation mode and while displaying the user interface that includes the first user interface object, the second user interface object, and the third user interface object, and the indication that the first user interface object is selected, the computer system detects, via at least the optical sensor, a sixth hand gesture (e.g., as described above in relation to 7A-7C). In some embodiments, in response detecting, via least the optical sensor, the sixth hand gesture (e.g., and while the computer system is in the fourth operation mode) (e.g., as described above in relation to 7A-7C): in accordance with a determination that the hand gesture is the first type of gesture, the computer system continues to display the indication that the first user interface object is selected (and without displaying, via the display generation component, the indication that the second user interface object is selected and/or the indication that the third user interface object is selected and/or without performing an operation) (e.g., as described above in relation to 7A-7C); and in accordance with a determination that the hand gesture is the second type of gesture, the computer system continues to display the indication that the first user interface object is selected (and without displaying, via the display generation component, the indication that the third user interface object is selected and/or the indication that the second user interface object is selected and/or without performing an operation) (e.g., as described above in relation to 7A-7C). Continuing to display the indication that the first user interface object is selected in accordance with a determination that the hand gesture is the first type of gesture and in accordance with a determination that the hand gesture is the first type of gesture (e.g., and while the computer system is in the fourth operation mode) provides the user with more control of the system to control the computer system detection of hand gestures and/or performance of operations in response to detecting hand gestures.

Note that details of the processes described above with respect to method 1500 (e.g., FIG. 15) are also applicable in an analogous manner to the methods described herein. For example, method 1500 optionally includes one or more of the characteristics of the various methods described herein with reference to method 1600. For example, method 1500 can be performed when the computer system is switched from operating in an operation mode in which the computer system is operating using the techniques of method 1600. For brevity, these details are not repeated below.

FIG. 16 is a flow diagram illustrating a method for navigating using a computer system in accordance with some embodiments. Method 1600 is performed at a computer system (e.g., 100, 300, 500) (e.g., a wearable device (e.g., a smartwatch)) that is in communication with a display generation component (e.g., a display controller, a touch-sensitive display system). In some embodiments, the computer system is in communication with one or more sensors (e.g., one or more biometric sensors (e.g., a heart rate sensor, a camera), a gyroscope, an accelerometer)). In some embodiments, the computer system is in communication with one or more input devices (e.g., a touch-sensitive surface, a microphone). In some embodiments, the computer system is in communication with one or more output devices (e.g., one or more speakers, one or more microphones). Some operations in method 1500 are, optionally, combined, the orders of some operations are, optionally, changed, and some operations are, optionally, omitted.

As described below, method 1600 provides an intuitive way for navigating user interfaces using hand gestures. The method reduces the cognitive burden on a user for navigating user interfaces using hand gestures, thereby creating a more efficient human-machine interface. For battery-operated computing devices, enabling a user to navigate user interfaces faster and more efficiently conserves power and increases the time between battery charges.

The computer system displays (1602), via the display generation component, a user interface (e.g., 710, 720, 810, or 780) that includes a selectable user interface object (e.g., 720*c*, 732*c*, 810*d*, or 832*a*) and a cursor (e.g., 742) (e.g., a user interface object, a non-selectable user interface object) that is displayed at a first location (e.g., a location that is different form the location of the user interface object) on the user interface.

While displaying the selectable user interface object (e.g., 720*c*, 732*c*, 810*d*, or 832*a*) and the cursor (e.g., 742) at the first location on the user interface (e.g., 710, 720, 810, or 780), the computer system detects (1604) a request to move the cursor (e.g., 742) (e.g., via hand gesture (e.g., tilting of wrist and/or one or more other hand gestures as described above in relation to method 1500)) from the first location to a second location (e.g., a location that is different from the first location) on the user interface. In some embodiments, the request to move the cursor is detected based on movement of the computer system, movement of one or more devices (e.g., a mouse) that is associated with the computer system, and/or one or more inputs/gestures (e.g., a swipe gesture) detected on the display generation component of the computer system.

In response to (1606) detecting the request (e.g., 750*p*, 850*c*, 850*d*, or tilting in FIG. 7Y or 7Z) to move the cursor from the first location to the second location, the computer system displays (1608) the cursor at the second location (e.g., moving the cursor from the first location to the second location). In some embodiments, as a part of displaying the cursor at the second location, the computer system moves the cursor from the first location to the second location. In some embodiments, the computer system moves the cursor according to a direction in which the computer system was moved.

In response to (1606) detecting the request (e.g., 750*p*, 850*c*, 850*d*, or tilting in FIG. 7Y or 7Z) to move the cursor from the first location to the second location, the computer system, in accordance with a determination that the second location corresponds to a location of the selectable user interface object (e.g., 720*c*, 732*c*, 810*d*, or 832*a*) (and/or corresponds to an area (e.g., an edge) of the display), displays (1610) an animation that provides a visual indication (e.g., 744) of how long the cursor (e.g., 742) needs to be located at the second location to perform an operation (e.g., an animation of the visual indication (e.g., an object) filling up, changing color, flashing, counting down/up, increasing/decreasing in size, fading in/out), where the visual indication (e.g., 742) is updated over a period of time (e.g., a period of time less than or equal to a threshold period of time) (e.g., while the cursor/visual indication is displayed at the second location) (e.g., without perform an action that includes selecting the selectable user interface object). In some embodiments, while displaying the animation (e.g., for less than the period of time), the computer system detects a request to move the cursor and, in response to detecting the second request, the computer system ceases to display the animation. In some embodiments, after displaying the animation, the computer system re-displays the cursor. In some embodiments, the cursor is the visual indication and/or includes the visual indication.

In response to (1606) detecting the request (e.g., 750*p*, 850*c*, 850*d*, or tilting in FIG. 7Y or 7Z) to move the cursor from the first location to the second location, the computer system, in accordance with a determination that the second location does not correspond to the location of the selectable user interface object (e.g., 720*c*, 732*c*, 810*d*, or 832*a*) (and/or does not correspond to an area (e.g., an edge) of the display), the computer system forgoes displaying (1612) the animation (e.g., that provides the indication (e.g., 744)) (and continues to display the cursor) (e.g., without perform an action that includes selecting the selectable user interface object). In some embodiments, as a part of displaying the animation that provides the visual indication, the computer system replaces display of the cursor with the visual indication. In some embodiments, while displaying the animation, the computer system detects a request to move the cursor from the second location to the third location and, in response to detecting the request to move the cursor from the third location to the second location, displays the cursor at the third location (e.g., without displaying the visual indication and/or replacing the visual indication with the cursor). In some embodiments, the third location is different from the second location and/or the first location.

In some embodiments, in response to detecting the request (e.g., 750*p*, 850*c*, 850*d*, or tilting in FIG. 7Y or 7Z) to move the cursor (e.g., 742) from the first location to the second location and in accordance with a determination that the second location corresponds to the location of the selectable user interface object (e.g., 720*c*, 732*c*, 810*d*, or 832*a*) and the cursor (e.g., 742) is displayed at the second location for more than a first threshold period of time (e.g., a non-zero period of time) (e.g., 1-5 seconds)) (e.g., a period of time that is longer than or equal to the time that the animation is displayed), the computer system performs the operation (e.g., as discussed in relation to FIGS. 7I-7U, as discussed above in relation to FIGS. 8A-8J). In some embodiments, as a part of performing the operation, the computer system selects the selectable user interface object (e.g., as discussed in relation to FIGS. 7I-7U, as discussed above in relation to FIGS. 8A-8J) (e.g., highlighting the selectable user interface object, launching a menu corresponding to the selectable user interface object, launching an application corresponds to the selectable user interface object). Automatically performing the operation that includes selecting the selectable user interface object in accordance with a determination that the second location corresponds to the location of the selectable user interface object and the cursor is displayed at the second location for more than a first threshold period of time allows the computer system to automatically select a user interface object when prescribed conditions are met. Performing the operation that includes selecting the selectable user interface object in accordance with a determination that the second location corresponds to the location of the selectable user interface object and the cursor is displayed at the second location for more than a first threshold period of time provides the user with more control over the computer system by giving the user the ability to select a user interface object when the cursor has been positioned (e.g., by the user) in a certain location over a certain period of time.

In some embodiments, in response to detecting the request to move the cursor (e.g., 742) from the first location to the second location and in accordance with a determination that the second location corresponds to the location of the selectable user interface object (e.g., 720c, 732c, 810d, or 832a) and the cursor (e.g., 742) is displayed at the second location for more than a second threshold period of time (e.g., a non-zero period of time) (e.g., 1-5 seconds)) (e.g., a period of time that is longer than or equal to the time that the animation is displayed), the computer system performs the operation (e.g., as discussed in relation to FIGS. 7I-7U). In some embodiments, performing the operation includes launching an application that corresponds to the selectable user interface object (e.g., as discussed in relation to FIGS. 7I-7U). Automatically performing the operation that includes launching an application that corresponds to the selectable user interface object in accordance with a determination that the second location corresponds to the location of the selectable user interface object and the cursor is displayed at the second location for more than a first threshold period of time allows the computer system to automatically launch an application that corresponds to the selectable user interface object when prescribed conditions are met. Performing the operation that includes launching an application that corresponds to the selectable user interface object in accordance with a determination that the second location corresponds to the location of the selectable user interface object and the cursor is displayed at the second location for more than a first threshold period of time provides the user with more control over the computer system by giving the user the ability to launch an application that corresponds to the selectable user interface object when the cursor has been positioned (e.g., by the user) in a certain location over a certain period of time.

In some embodiments, in response to detecting the request to move the cursor from the first location to the second location and in accordance with a determination that the second location does not correspond to the location of the selectable user interface object (e.g., 720c, 732c, 810d, or 832a), forgoing performing the operation (e.g., as described above in relation to FIG. 8C) (e.g., forgoing displaying, via the display generation component, the menu that includes the one or more user interface objects to preform one or more operations at the second location, forgoing launching an application corresponds to the selectable user interface object). In some embodiments, in accordance with a determination that the second location does not correspond to the location of the selectable user interface object and the cursor is displayed and/or not displayed for more than the threshold period of time, the computer system forgoes performing the operation. Choosing not to perform the operation in accordance with a determination that the second location does not correspond to the location of the selectable user interface object gives the computer system the ability to not perform the operation when prescribed conditions are not met and helps the computer system avoid performing unnecessary and/or unintended operations.

In some embodiments, in response to detecting the request to move the cursor (e.g., 742) from the first location to the second location and in accordance with a determination that the cursor (e.g., 742) is not displayed at the second location for more than a third threshold period of time (e.g., a non-zero period of time) (e.g., 1-5 seconds)) (e.g., a period of time that is longer than or equal to the time that the animation is displayed), the computer system forgoes performing the operation (e.g., as illustrated in FIG. 8D). In some embodiments, in accordance with a determination that the second location corresponds and/or does not correspond to the location of the selectable user interface object and the cursor is not displayed at the second location for more than the threshold period of time, the computer system forgoes performing the operation. Choosing not to perform the operation in accordance with a determination that the cursor is not displayed at the second location for more than a third threshold period of time gives the computer system the ability to not perform the operation when prescribed conditions are not met and helps the computer system avoid performing unnecessary and/or unintended operations.

In some embodiments, in response to detecting the request to move the cursor (e.g., 742) from the first location to the second location and in accordance with a determination that the second location corresponds to (e.g., is) a location that is in an area (e.g., 742 in FIG. 7Q or 742 in FIG. 7Y) (e.g., an edge, left edge, right edge) of the display generated component and the cursor is displayed at the second location for more than a fourth threshold period of time (e.g., a non-zero period of time) (e.g., 1-5 seconds)) (e.g., a period of time that is longer than or equal to the time that the animation is displayed), the computer system performs a second operation that includes displaying a second user interface (e.g., 780 or 720) that is different from the user interface (e.g., 710 or 718) (and ceasing to display the user interface) (while continuing to display the cursor) (without displaying the menu) (e.g., that is different from the operation (e.g., selecting the user interface object)). In some embodiments, as a part of displaying a second user interface that is different from the user interface, the computer system displays an animation (e.g., a sliding animation, fading animation, dissolving animation, and/or sliding animation) of the second user interface replacing the user interface. In some embodiments, the animation includes slider the user interface off the screen towards the area and/or sliding a second user interface object on the screen towards the area. In some embodiments, in accordance with a determination that the second location corresponds to the location that is in the area of the display and the cursor is not displayed at the second location for more than a threshold period of time, the computer system forgoes performing the second operation that includes displaying the second user interface and/or continues to display the user interface. In some embodiments, the second threshold period of time is the same period of time as the threshold period of time. In some embodiments, the second threshold period of time is a different threshold period of time than the threshold period of time. In some embodiments, the area does not include one or more selectable user interface objects. In some embodiments, in accordance with a determination that the second location corresponds to (e.g., is) the location that is in the area, the computer system displays the animation. In some embodiments, in accordance with a determination that the second location corresponds to (e.g., is) the location that is in the area, the computer system forgoes displaying the animation. In some embodiments, in accordance with a determination that the second location does not correspond to (e.g., is) the location that is in the area, the computer system displays the animation. In some embodiments, in accordance with a determination that the second location does not correspond to (e.g., is) the location that is in the area, the computer system forgoes displaying the animation.

Automatically performing a second operation that includes displaying a second user interface that is different from the user interface in accordance with a determination that the second location corresponds to a location that is in an area of the display generated component and the cursor is displayed at the second location for more than a fourth threshold period of time allows the computer system to display another user interface when the cursor is in a particular area of the display generation component. Performing a second operation that includes displaying a second user interface that is different from the user interface in accordance with a determination that the second location corresponds to a location that is in an area of the display generated component and the cursor is displayed at the second location for more than a fourth threshold period of time provides the user with more control over the computer system by giving the user the ability to display another user interface when prescribed conditions are met.

In some embodiments, in accordance with a determination that the second location corresponds to a location of the selectable user interface object (e.g., 720c, 732c, 810d, or 832a) and the cursor (e.g., 742) is displayed at the second location for more than a fifth threshold period of time (e.g., a non-zero period of time) (e.g., 1-5 seconds) (e.g., a while displaying the cursor at the second location) (e.g., a period of time that is longer than or equal to the time that the animation is displayed) (e.g., a period of time that is longer than or equal to the time that the animation is displayed), the computer system performs the operation. In some embodiments, performing the operation includes displaying, via the display generation component, a menu (e.g., 732) that includes one or more selectable options (e.g., 732a-732d and/or 1410-1418) (e.g., user interface objects) to preform one or more operations (e.g., one or more different operations) at the second location (e.g., an operation that is performed when a tap input (e.g., and/or a first type of input) (e.g., single tap input/multi-tap input) is detected at the second location (e.g., an operation to launch an application), an operation that is perform when a press-and-hold input (e.g., and/or a second type of input that is different from the first type of input) is detected at the second location (e.g., an operation that to bring up a menu for deleting the user interface object), an operation that is perform when a swipe input (e.g., a third type of input that is different from the first type of input and the second type of input) is detected at the second location, an operation to start an automatic scroll operation at the second location). In some embodiments, the menu is displayed concurrently with the selectable user interface object and/or the cursor. In some embodiments, when the menu is displayed, one or more portions of the user interface (e.g., that does not include the selectable user interface object and/or the cursor) cease to be displayed. In some embodiments, the menu is displayed at a location (e.g., top/bottom) on the user interface that does not include the selectable user interface object and/or the cursor. In some embodiments, in accordance with a determination that the selectable user interface object and/or the cursor is displayed at a first respective, the menu is displayed at a second respective location (e.g., that is different from the first location, that is on an opposite side of the display than the first respective location) (without being displayed at the first respective location). In some embodiments, in accordance with a determination that the selectable user interface object and/or the cursor is not displayed at the first respective location, the menu is displayed at the first respective location (without being displayed at the second respective location). Automatically performing the operation that includes displaying a menu that includes one or more selectable options to perform one or more operations at the second location in accordance with a determination that the second location corresponds to the location of the selectable user interface object and the cursor is displayed at the second location for more than a first threshold period of time allows the computer system to automatically display the menu when prescribed conditions are met. Performing the operation that includes displaying a menu that includes one or more selectable options to perform one or more operations in accordance with a determination that the second location corresponds to the location of the selectable user interface object and the cursor is displayed at the second location for more than a first threshold period of time provides the user with more control over the computer system by giving the user the ability to display the menu to perform one or more operations after the cursor has been positioned (e.g., by the user) in a certain location over a certain period of time.

In some embodiments, the one or more selectable options (e.g., 732a-732d) include a first selectable option (e.g., 832a, 1410a, 1410b, 1410c, or 1412) for performing an selection operation, and wherein selection of the first selectable option causes the computer system to perform the selection operation (e.g., an action that is performed when a tap is received at the second location) at the second location (e.g., on the selectable user interface object). In some embodiments, in response to detecting selection of the first selectable option, the computer system performs a selection operation that includes launching an application associated with the selectable user interface object. In some embodiments, in response to detecting selection of the first selectable option, the computer system performs a selection operation that includes emphasizing (e.g., highlight) the selectable user interface object that is displayed at the second location. Displaying a menu that includes a first selectable option for performing a selection operation provides the user with more control over the computer system by allowing the user to cause the computer system to perform the selection operation (e.g., without providing more complex hand gestures) and also reduces the number of hand gestures that are used to perform the operation.

In some embodiments, the one or more selectable options include a second selectable option (e.g., 832a) for performing an operation (e.g., launching an application in response to an input (e.g., tap input, a press-and-hold input, a swipe input), moving the selectable user interface object that is displayed at the second location in response to an input (e.g., tap input, a press-and-hold input, a swipe input), displaying a notification (e.g., a pop-up) that corresponds to the selectable user interface object that is displayed at the second location) that corresponds to (e.g., that is) an operation that is (and/or that would be) performed in response to an input (e.g., tap input, a press-and-hold input, a swipe input) (and/or gesture) being detected (e.g., by the computer system) at the second location, and wherein selection of second selectable option causes the computer system to perform the operation that corresponds to the operation that is performed in response to the input being detected at the second location (e.g., without input being detected at the second location). Displaying a menu that includes a second selectable option for performing an operation that corresponds to an operation that is performed in response to an input being detected at the second location provides the user with more control over the computer system by allowing the user to cause the computer system to perform an operation at is performed in response to an input being detected at the second location (e.g., without providing more complex hand gestures and without the user touching the computer system and/or the display generation component) and also reduces the number of hand gestures that are used to perform the operation.

In some embodiments, the one or more selectable options include a third selectable option (e.g., 732*a*, 1410*c*, or 1412) for performing an automatic scroll operation (e.g., as described in relation to method 1500), and wherein selection of the third selectable option causes the computer system to automatically scroll through a plurality of selectable user interface objects that include the selectable user interface object. In some embodiments, as a part of automatically scrolling through a plurality of selectable user interface objects that include the selectable user interface object, the computer system starts the automatically scrolling from the second location (e.g., from the selectable user interface object that is displayed at the second location). In some embodiments, as a part of automatically scrolling through a plurality of selectable user interface objects that include the selectable user interface object, the computer system emphasizes (e.g., highlight) one or more selectable user interface objects in sequence (e.g., as described in relation to method 1500). Displaying a menu that includes a third selectable option for performing an automatic scroll operation provides the user with more control over the computer system by allowing the user to cause the computer system to automatically scroll through a plurality of selectable user interface objects that include the selectable user interface object (e.g., without providing more complex hand gestures) and also reduces the number of hand gestures that are used to perform the operation.

In some embodiments, the one or more selectable options include a fourth selectable option for displaying one or more options additional options (e.g., 1416) (e.g., an option that corresponds to an option to perform an operation that corresponds to an operation that is performed when an input is detected at the location of the selectable user interface object (e.g., second location); an option to perform operation, such as turning on/off the computer system, displaying a different menu and/or user interface; and/or an option that corresponds to an operation that is perform in response to detecting an input via one or more input devices in communication with the computer system). In some embodiments, selection of the fourth selectable option causes the computer system to display the one or more additional options (e.g., 832*a* and menu displayed in FIG. 8J) that were not previously displayed before selection of the fourth selectable option was detected. In some embodiments, in response to detecting of the fourth selectable option, the computer system ceases to display one or more selectable options that were displayed before selection of the fourth selectable option was detected. Displaying a menu that includes a fourth selectable option for displaying one or more options additional options provides the user with more control over the computer system by allowing the user to choose to display additional selectable options that were not previously displayed, reduces the number of hand gestures that are used to perform additional operations, and reduces the number of selectable user interface options that were not previously displayed before selection of the fourth selectable option was detected.

In some embodiments, the one or more additional options (e.g., 832*a* and menu displayed in FIG. 8J) that were not previously displayed before selection of the fourth selectable option (e.g., 1414 or 1416) was detected includes a respective additional option (e.g., 1414*a*-1414*d* or 1416*a*-1416*c*) wherein selection of the respective additional option does not cause the computer system to perform an operation that is not performed at the second location (e.g., an exit operation, a close menu operation). In some embodiments, the one or more selectable options does not include a selection operation that, when selected, causes the computer system to perform an (e.g., any operation) operation that is not perform at (e.g., initiated at, performed on, and/or involves) the second location. Displaying a menu that includes the one or more additional options that were not previously displayed before selection of the fourth selectable option was detected includes a respective additional option provides the user with more control over the computer system by allowing the user to choose to select an option to perform an operation that is not performed at the second location and reduces the number of hand gestures that are used to perform the operation that is not performed at the second.

In some embodiments, the computer system (e.g., 600) is in communication with one or more input devices (e.g., 602*a*-602*c*). In some embodiments, the one or more selectable options include a fifth selectable option (e.g., 732*a*, 1410*c*, or 1416*b*) for performing an operation that corresponds to (e.g., that is) an operation (e.g., a press (e.g., single and/or multi-press) on hardware input device to display a menu, initiate a payment operation, initiate turning the computer system off, initiate use of a voice assistance; a rotation of hardware input device to move the cursor from one location to another location; and/or a rotation of hardware input device to zoom, scroll, and/or adjust one or more components of the user interface) that is (and/or would be) performed in response to detecting an input via the one or more input devices (e.g., a hardware button (e.g., a crown of a smartwatch, a hardware button that is rotatable, a hardware button that can be pressed/de-pressed), a hardware slider). In some embodiments, selection of the fifth selectable option causes the computer system to perform the operation that corresponds to the operation that is performed in response to detecting the input via the one or more input devices (e.g., without input at the one or more input devices being detected). Displaying a menu that includes a fifth selectable option for performing an operation that corresponds to an operation that is performed in response to detecting an input via the one or more input devices provides the user with more control over the computer system by allowing the user to choose to perform an operation that corresponds to an operation that is performed in response to an input being detected via the one or more input devices (e.g., without providing more complex hand gestures and without the user touching the one or more input devices) and also reduces the number of hand gestures that are used to perform the operation.

In some embodiments, the one or more selectable options include a sixth selectable option (e.g., 732*a*-732*d* or 1410-1418) and a seventh selectable option (e.g., 732*a*-732*d* or 1410-1418) (e.g., that is different from the sixth selectable option). In some embodiments, while displaying the menu (e.g., 732), the computer system detects a request (e.g., 750*p*, 850*c*, 850*d*, or tilting in FIG. 7Y or 7Z) to move the cursor from the second location to a third location on the user interface. In some embodiments, the second request to move the cursor is detected based on movement of the computer system, movement of one or more devices (e.g., a mouse) that is associated with the computer system, and/or one or more inputs/gestures (e.g., a swipe gesture) detected on the display generation component of the computer system. In some embodiments, in response to detecting the request to move the cursor from the second location to the third location on the user interface, the computer system: in accordance with a determination that the third location corresponds to a location of the sixth selectable option and the cursor is displayed at the third location for more than a sixth threshold period of time (e.g., a non-zero period of time) (e.g., 1-5 seconds)) (e.g., a period of time that is longer than or equal to the time that the animation is displayed), performs a first operation that corresponds to the sixth selectable option (e.g., without perform the second operation); and in accordance with a determination that the third location corresponds to a location of the seventh selectable option and the cursor is displayed at the third location for more than the sixth threshold period of time, performs a second operation that is different from the first operation (e.g., without perform the first operation). In some embodiments, in accordance with a determination that the third location corresponds to the location of the sixth selectable option and the cursor is not displayed at the third location for more than the third threshold period of time, the computer system forgoes performing the first operation. In some embodiments, in accordance with a determination that the third location corresponds to the location of the seventh selectable option and the cursor is not displayed at the third location for more than the third threshold period of time, the computer system forgoes performing the first operation. In some embodiments, the third threshold period of time is the same period of time as the threshold period of time. In some embodiments, the third threshold period of time is a different threshold period of time than the threshold period of time. Performing different operations based on where the cursor is displayed for the threshold period of time provides the user with more control over the computer system to perform different operations based on the location of the cursor.

In some embodiments, (e.g., while displaying the cursor at the second location and the second location corresponds the selectable user interface object) the one or operations include an operation that causes the computer system (e.g., 600) to display a user interface for an application that corresponds to the selectable user interface object (e.g., 720*c*, 732*c*, 810*d*, or 832*a*) (e.g., as discussed above in relation to FIG. 8J) (e.g., without exiting a first mode).

In some embodiments, (e.g., while displaying the cursor at the second location and the second location corresponds the selectable user interface object) the one or more operations include an operation that causes the computer system to transitioned from a first operation mode to a second operation mode (e.g., as discussed above in relation to 732*a* and/or 1412) (e.g., an operation mode, where an operation (e.g., auto-scrolling operation, motion pointer operation) that is initiated at (and/or starts from) the second location) (e.g., without launching an application that corresponds to the selectable user interface object).

In some embodiments, after displaying the menu (e.g., 732) that includes the one or more selectable options (e.g., when the menu is displayed, the one or more menu objects are displayed), the computer system detects a request to display a second user interface that is different from the user interface (e.g., as illustrated above in relation to FIGS. 7I-7U and 8A-8J). In some embodiments, in response to detecting the request to display the second user interface, the computer system displays the second user interface (and while operation in the first operation mode). In some embodiments, the second user interface does not include the menu and includes a second selectable user interface object (e.g., 732*a*-732*d* or 1410-1418) (e.g., that is different from the selectable user interface object) and the cursor (e.g., 744 (e.g., as illustrated above in relation to FIGS. 7I-7U and 8A-8J). In some embodiments, while displaying the second selectable user interface object and the cursor, the computer system detects a request to move the cursor from a fourth location on the second user interface to a fifth location on the second user interface (e.g., as illustrated above in relation to FIGS. 7I-7U and 8A-8J). In some embodiments, the third request to move the cursor is detected based on movement of the computer system, movement of one or more devices (e.g., a mouse) that is associated with the computer system, and/or one or more inputs/gestures (e.g., a swipe gesture) detected on the display generation component of the computer system. In some embodiments, in response to detecting the request to move the cursor from the fourth location on the second user interface to a fifth location on the second user interface, the computer system displays the cursor at the fifth location on the second user interface (e.g., as illustrated above in relation to FIGS. 7I-7U and 8A-8J). In some embodiments, in response to detecting the request to move the cursor from the fourth location on the second user interface to a fifth location on the second user interface, the computer system and in accordance with a determination that the fifth location corresponds to a location of the second selectable user interface object and the cursor is displayed at the second location for more than a seventh threshold period of time (e.g., a non-zero period of time) (e.g., 1-5 seconds)) (e.g., a period of time that is longer than or equal to the time that the animation is displayed), the computer system re-displays, via the display generation component, the menu (e.g., 732) that includes the one or more selectable options (e.g., as illustrated above in relation to FIGS. 7I-7U and 8A-8J) (e.g., when the menu is displayed, the one or more menu objects are displayed). In some embodiments, in accordance with a determination that the fifth location does not correspond to a location of the second selectable user interface object and/or the cursor is not displayed at the second location for more than a seventh threshold period of time, forgoing displaying the menu. Automatically choosing to re-display the menu in accordance with a determination that the fifth location corresponds to a location of the second selectable user interface object and the cursor is displayed at the second location for more than a seventh threshold period of time allows the computer system to provide a consistent menu to the user when a same set of prescribed conditions are met for a different selectable user interface object.

In some embodiments, the request to move the cursor (e.g., 742) from the first location to the second location is detected when a determination is made that the computer system (e.g., 600) has been titled (e.g., 750*p*, 850*c*, 850*d*, or tilting in FIG. 7Y or 7Z) (e.g., one side (e.g., right side, left side) of the computer system is higher/lower than another side of the computer system) in a respective direction. In some embodiments, the determination is made using data that is detected via one or more gyroscopes that are in communication with the computer system. In some embodiments, the respective direction is a direction that goes from the higher side of the computer system to the lower side of the computer. In some embodiments, the cursor (e.g., 742) is moved in a direction that corresponds to the respective direction.

In some embodiments, before displaying the user interface that includes the selectable user interface object (e.g., 720*c*, 732*c*, 810*d*, or 832*a*) and the cursor (e.g., 742) that is displayed at the first location on the user interface, the computer system displays a third user interface. In some embodiments, while displaying the third user interface (e.g., 710, 720, 810, or 780) (and, in some embodiments, the user interface includes the selectable user interface object), the computer system detects a request (e.g., 750*w*, 850*a*) to enter a first operation mode. In some embodiments, in response to detecting the request to enter the first operation mode, the computer system transitions the computer system (e.g., 600) from a second operation mode (e.g., that is different from the first operation mode) to the first operation mode. In some embodiments, in response to detecting the request to enter the first operation mode, the computer system displays the cursor (e.g., at the first location) (e.g., and/or the user interface that includes the selectable user interface object and the cursor that is displayed at the first location on the user interface). Displaying the cursor in response to detecting the request to enter the first operation mode provides the user with visual feedback that the computer system is operating in the first operation mode (e.g., /or that one or more user actions can cause the computer system to perform one or more particular operation because the computer system is in the first operation mode).

In some embodiments, as a part of detecting the request to enter the first operation mode, the computer system detects that the computer system has been (or is being) shaken (e.g., 750w, 850a) (e.g., while the computer system is in the second operation mode). Transitioning the computer system from being in a second operation mode to the first operation mode in response to detecting that the computer system has been shaken provides the user with more control over the computer system by allowing the user to switch between modes by shaking the computer system (e.g., and without providing input on the display generation component of the device).

In some embodiments, while the computer system is in the first mode, the computer system detects that the computer system (e.g., 600) has been shaken (e.g., 750w, 850a). In some embodiments, in response to detecting that the computer system has been shaken, the computer system transitions the computer system from the first operation mode to a third operation mode (and, in some embodiments, the third operation mode is the second operation mode) (e.g., the first operation mode as described above in relation to method 1500). Transitioning the computer system from the first operation mode to a third operation mode in response to detecting that the computer system has been shaken provides the user with more control over the computer system by allowing the user to switch between modes by shaking the computer system (e.g., and without providing input on the display generation component of the device).

In some embodiments, as a part of transitioning the computer system (e.g., 600) from the first operation mode to a third operation mode, the computer system ceases to display the cursor (e.g., 742). In some embodiments, in response to detecting that the computer system has been shaken (e.g., while the computer system is in the first mode), the computer system ceases to the display the cursor. Ceasing to display the cursor in response to detecting that the computer system has been shaken provides the user with feedback that the computer system is not operating in the first operation mode (e.g., and/or that one or more user actions cannot cause the computer system to perform one or more particular operation because the computer system is not in the first operation mode).

In some embodiments, while the computer system is in the third operation mode and while the cursor (e.g., 742) is displayed, the computer system detects a request to move the cursor from the sixth location to the seventh location. In some embodiments, in response to detecting the request to move (e.g., 750p, 850c, 850d, or tilting in FIG. 7Y or 7Z) the cursor from the sixth location to the seventh location (e.g., while the computer system is in the third operation mode), the computer system displays the cursor at the seventh location. In some embodiments, in response to detecting the request to move (e.g., 750p, 850c, 850d, or tilting in FIG. 7Y or 7Z) the cursor from the sixth location to the seventh location (e.g., while the computer system is in the third operation mode) and in accordance with a determination that the seventh location corresponds to a location of the selectable user interface object and the cursor is displayed at the seventh location for more than an eighth threshold period of time (e.g., a non-zero period of time) (e.g., 1-5 seconds)) (e.g., a period of time that is longer than or equal to the time that the animation is displayed), the computer system forgoes performing the operation. Forgoing performing the operation in accordance with a determination that the seventh location corresponds to a location of the selectable user interface object and the cursor is displayed at the seventh location for more than an eighth threshold period of time (e.g., while the computer system is in the third operation mode) provides the user with more control over the computer system to control when certain hand gestures will perform certain operations.

In some embodiments, in response to detecting the request to move the cursor (e.g., 742) from the first location to the second location and in accordance with a determination that the second location corresponds to the location of the selectable user interface object (e.g., 720c, 732c, 810d, or 832a) and the cursor (e.g., 742) is displayed at the second location for more than a ninth threshold period of time (e.g., a non-zero period of time) (e.g., 1-5 seconds) (e.g., a while displaying the cursor at the second location) (e.g., a period of time that is longer than the time that the animation is displayed), the computer system performs the operation. In some embodiments, as a part of performing the operation, in accordance with a determination that one or more settings (e.g., user settings) of the computer system is in a first state, the computer system displays a second menu that includes one or more selectable options (e.g., user interface objects) to preform one or more operations (e.g., one or more different operations) at the second location without launching a second application corresponding to the selectable user interface object. In some embodiments, as a part of performing the operation, in accordance with a determination that one or more settings (e.g., user settings) of the computer system is in a first state, the computer system launches the second application that corresponding to the selectable user interface object without displaying the second menu that includes one or more selectable options (e.g., user interface objects) to preform one or more operations (e.g., one or more different operations) at the second location. Choosing whether to launch a second application and/or display a second menu when prescribed conditions are met provides the user with more control over the computer system to change whether one or more actions will cause an application to be launch and/or cause a menu to be displayed.

Note that details of the processes described above with respect to method 1600 (e.g., FIG. 16) are also applicable in an analogous manner to the methods described herein. For example, method 1600 optionally includes one or more of the characteristics of the various methods described herein with reference to method 1500. For example, method 1600 can be performed when the computer system is switched from operating in an operation mode in which the computer system is operating using the techniques of method 1500. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the detection of hand gestures. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve the detection of hand gestures for the user. Accordingly, use of such personal information data enables users to have calculated control of the user of data that can improve the detection of hand gestures. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of user interface management (e.g., including navigation), the present technology can be configured to allow users to select to "opt in" or "opt out" of participation in the collection of personal information data during registration for services or anytime thereafter. In another example, users can select not to provide heart rate data and/or other data, which can be used to improve the detection of hand gestures. In yet another example, users can select to limit the length of heart rate data and/or other data is maintained. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, hand gestures can be detected based on non-personal information data or a bare minimum amount of personal information, such as the content being requested by the device associated with a user, other non-personal information available to the data detection services, or publicly available information.

What is claimed is:

1. A computer system that is configured to communicate with a display generation component, the computer system comprising:
   one or more processors; and
   memory storing one or more programs configured to be executed by the one or more processors, the one or more programs including instructions for:
      displaying, via the display generation component, a setting user interface element;

displaying, via the display generation component, a user interface that includes a selectable user interface object and a cursor that is displayed at a first location on the user interface;

while displaying the selectable user interface object and the cursor at the first location on the user interface, detecting a request to move the cursor from the first location to a second location on the user interface; and in response to detecting the request to move the cursor from the first location to the second location:

displaying the cursor at the second location;

in accordance with a determination that the second location corresponds to a location of the selectable user interface object, displaying an animation that provides a visual indication of how long the cursor needs to be located at the second location to perform a first operation, wherein the visual indication is updated over a period of time; and in accordance with a determination that the second location corresponds to the location of the selectable user interface object and the cursor is displayed at the second location for more than a first threshold period of time, performing the first operation, wherein performing the first operation includes:

in accordance with a determination that a user-configurable setting of the computer system is in a first state, activating the selectable user interface object; and in accordance with a determination that the user-configurable setting of the computer system is in a second state different from the first state, displaying, without activating the selectable user interface object and via the display generation component, a menu, wherein the menu includes a first selectable option for performing a selection operation, and wherein selection of the first selectable option causes the computer system to perform the selection operation at the second location, wherein the user configurable setting of the computer system changes from the first state to the second state in response to a selection of the setting user interface element.

2. The computer system of claim 1, wherein the one or more programs further include instructions for:

in response to detecting the request to move the cursor from the first location to the second location:

in accordance with a determination that the second location does not correspond to the location of the selectable user interface object, forgoing performing the first operation.

3. The computer system of claim 1, wherein the one or more programs further include instructions for:

in response to detecting the request to move the cursor from the first location to the second location:

in accordance with a determination that the cursor is not displayed at the second location for more than a second threshold period of time, forgoing performing the first operation.

4. The computer system of claim 1, wherein the menu includes a second selectable option for performing an operation that corresponds to an operation that is performed in response to an input being detected at the second location, and wherein selection of the second selectable option causes the computer system to perform the operation that corresponds to the operation that is performed in response to the input being detected at the second location.

5. The computer system of claim 1, wherein the menu includes a second selectable option for performing a scroll operation, and wherein selection, via a first user input, of the second selectable option causes the computer system to scroll, without receiving user input further to the first user input, through a plurality of selectable user interface objects that include the selectable user interface object.

6. The computer system of claim 1, wherein the menu includes a second selectable option for displaying one or more additional options, and wherein selection of the second selectable option causes the computer system to display the one or more additional options that were not previously displayed before selection of the second selectable option was detected.

7. The computer system of claim 6, wherein the one or more additional options that were not previously displayed before selection of the second selectable option was detected includes a respective additional option, wherein selection of the respective additional option does not cause the computer system to perform an operation that is not performed at the second location.

8. The computer system of claim 1, wherein:

the computer system is in communication with one or more input devices;

the menu includes a second selectable option for performing an operation that corresponds to an operation that is performed in response to detecting an input via the one or more input devices; and selection of the second selectable option causes the computer system to perform the operation that corresponds to the operation that is performed in response to detecting the input via the one or more input devices.

9. The computer system of claim 1, wherein the menu includes a second selectable option and a third selectable option, and wherein the one or more programs further include instructions for:

while displaying the menu, detecting a request to move the cursor from the second location to a third location on the user interface;

in response to detecting the request to move the cursor from the second location to the third location on the user interface:

in accordance with a determination that the third location corresponds to a location of the second selectable option and the cursor is displayed at the third location for more than a third threshold period of time, performing a third operation that corresponds to the second selectable option; and in accordance with a determination that the third location corresponds to a location of the third selectable option and the cursor is displayed at the third location for more than the third threshold period of time, performing a fourth operation that is different from the third operation.

10. The computer system of claim 1, wherein selection of the first selectable option causes the computer system to display a second user interface for an application that corresponds to the selectable user interface object.

11. The computer system of claim 1, wherein the menu includes a second selectable option, wherein selection of the second selectable option causes the computer system to transition from a first operation mode to a second operation mode.

12. The computer system of claim 1, wherein the one or more programs further include instructions for:

after displaying the menu that includes the first selectable option, detecting a request to display a third user interface that is different from the user interface;

in response to detecting the request to display the third user interface, displaying the third user interface, wherein the third user interface does not include the menu and includes a second selectable user interface object and the cursor; and while displaying the second selectable user interface object and the cursor, detecting a request to move the cursor from a third location on the third user interface to a fourth location on the third user interface; and in response to detecting the request to move the cursor from the third location on the third user interface to the fourth location on the third user interface:

displaying the cursor at the fourth location on the third user interface; and in accordance with a determination that the fourth location corresponds to a location of the second selectable user interface object and the cursor is displayed at the fourth location for more than a third threshold period of time:

in accordance with a determination that the user-configurable setting of the computer system is in the second state different from the first state, re-displaying, via the display generation component, the menu that includes the first selectable option.

13. The computer system of claim 1, wherein the request to move the cursor from the first location to the second location is detected when a determination is made that the computer system has been titled in a respective direction.

14. The computer system of claim 13, wherein the cursor is moved in a direction that corresponds to the respective direction.

15. The computer system of claim 1, wherein the one or more programs further include instructions for:

before displaying the user interface that includes the selectable user interface object and the cursor that is displayed at the first location on the user interface, displaying a third user interface;

while displaying the third user interface, detecting a request to enter a first operation mode; and in response to detecting the request to enter the first operation mode:

transitioning the computer system from a second operation mode to the first operation mode; and displaying the cursor.

16. The computer system of claim 15, wherein detecting the request to enter the first operation mode includes detecting that the computer system has been shaken.

17. The computer system of claim 15, wherein the one or more programs further include instructions for:

while the computer system is in the first operation mode, detecting that the computer system has been shaken; and in response to detecting that the computer system has been shaken, transitioning the computer system from the first operation mode to a third operation mode.

18. The computer system of claim 17, wherein transitioning the computer system from the first operation mode to the third operation mode includes ceasing to display the cursor.

19. The computer system of claim 17, wherein the one or more programs further include instructions for:

while the computer system is in the third operation mode and while the cursor is displayed, detecting a request to move the cursor from a third location to a fourth location; and in response to detecting the request to move the cursor from the third location to the fourth location:

displaying the cursor at the fourth location; and in accordance with a determination that the fourth location corresponds to the location of the selectable user interface object and the cursor is displayed at the fourth location for more than a second threshold period of time, forgoing performing the first operation.

20. A non-transitory computer-readable storage medium storing one or more programs configured to be executed by one or more processors of a computer system that is in communication with a display generation component, the one or more programs including instructions for:

displaying, via the display generation component, a setting user interface element;

displaying, via the display generation component, a user interface that includes a selectable user interface object and a cursor that is displayed at a first location on the user interface;

while displaying the selectable user interface object and the cursor at the first location on the user interface, detecting a request to move the cursor from the first location to a second location on the user interface; and in response to detecting the request to move the cursor from the first location to the second location:

displaying the cursor at the second location;

in accordance with a determination that the second location corresponds to a location of the selectable user interface object, displaying an animation that provides a visual indication of how long the cursor needs to be located at the second location to perform a first operation, wherein the visual indication is updated over a period of time; and in accordance with a determination that the second location corresponds to the location of the selectable user interface object and the cursor is displayed at the second location for more than a first threshold period of time, performing the first operation, wherein performing the first operation includes:

in accordance with a determination that a user-configurable setting of the computer system is in a first state, activating the selectable user interface object; and in accordance with a determination that the user-configurable setting of the computer system is in a second state different from the first state, displaying, without activating the selectable user interface object and via the display generation component, a menu, wherein the menu includes a first selectable option for performing a selection operation, and wherein selection of the first selectable option causes the computer system to perform the selection operation at the second location, wherein the user-configurable setting of the computer system changes from the first state to the second state in response to a selection of the setting user interface element.

21. The non-transitory computer-readable storage medium of claim 20, wherein the one or more programs further include instructions for:

in response to detecting the request to move the cursor from the first location to the second location:

in accordance with a determination that the second location does not correspond to the location of the selectable user interface object, forgoing performing the first operation.

22. The non-transitory computer-readable storage medium of claim 20, wherein the one or more programs further include instructions for:
in response to detecting the request to move the cursor from the first location to the second location:
in accordance with a determination that the cursor is not displayed at the second location for more than a second threshold period of time, forgoing performing the first operation.

23. The non-transitory computer-readable storage medium of claim 20, wherein the menu includes a second selectable option for performing an operation that corresponds to an operation that is performed in response to an input being detected at the second location, and wherein selection of the second selectable option causes the computer system to perform the operation that corresponds to the operation that is performed in response to the input being detected at the second location.

24. The non-transitory computer-readable storage medium of claim 20, wherein the menu includes a second selectable option for performing a scroll operation, and wherein selection, via a first user input, of the second selectable option causes the computer system to scroll, without receiving user input further to the first user input, through a plurality of selectable user interface objects that include the selectable user interface object.

25. The non-transitory computer-readable storage medium of claim 20, wherein the menu includes a second selectable option for displaying one or more additional options, and wherein selection of the second selectable option causes the computer system to display the one or more additional options that were not previously displayed before selection of the second selectable option was detected.

26. The non-transitory computer-readable storage medium of claim 25, wherein the one or more additional options that were not previously displayed before selection of the second selectable option was detected includes a respective additional option, wherein selection of the respective additional option does not cause the computer system to perform an operation that is not performed at the second location.

27. The non-transitory computer-readable storage medium of claim 20, wherein:
the computer system is in communication with one or more input devices;
the menu includes a second selectable option for performing an operation that corresponds to an operation that is performed in response to detecting an input via the one or more input devices; and
selection of the second selectable option causes the computer system to perform the operation that corresponds to the operation that is performed in response to detecting the input via the one or more input devices.

28. The non-transitory computer-readable storage medium of claim 20, wherein the menu includes a second selectable option and a third selectable option, and wherein the one or more programs further include instructions for:
while displaying the menu, detecting a request to move the cursor from the second location to a third location on the user interface;
in response to detecting the request to move the cursor from the second location to the third location on the user interface:
in accordance with a determination that the third location corresponds to a location of the second selectable option and the cursor is displayed at the third location for more than a third threshold period of time, performing a third operation that corresponds to the second selectable option; and
in accordance with a determination that the third location corresponds to a location of the third selectable option and the cursor is displayed at the third location for more than the third threshold period of time, performing a fourth operation that is different from the third operation.

29. The non-transitory computer-readable storage medium of claim 20, wherein selection of the first selectable option causes the computer system to display a second user interface for an application that corresponds to the selectable user interface object.

30. The non-transitory computer-readable storage medium of claim 20, wherein menu includes a second selectable option, wherein selection of the second selectable option causes the computer system to transition from a first operation mode to a second operation mode.

31. The non-transitory computer-readable storage medium of claim 20, wherein the one or more programs further include instructions for:
after displaying the menu that includes the first selectable option, detecting a request to display a third user interface that is different from the user interface;
in response to detecting the request to display the third user interface, displaying the third user interface, wherein the third user interface does not include the menu and includes a second selectable user interface object and the cursor; and
while displaying the second selectable user interface object and the cursor, detecting a request to move the cursor from a third location on the third user interface to a fourth location on the third user interface; and
in response to detecting the request to move the cursor from the third location on the third user interface to the fourth location on the third user interface:
displaying the cursor at the fourth location on the third user interface; and
in accordance with a determination that the fourth location corresponds to a location of the second selectable user interface object and the cursor is displayed at the fourth location for more than a third threshold period of time:
in accordance with a determination that the user-configurable setting of the computer system is in the second state different from the first state, re-displaying, via the display generation component, the menu that includes the first selectable option.

32. The non-transitory computer-readable storage medium of claim 20, wherein the request to move the cursor from the first location to the second location is detected when a determination is made that the computer system has been titled in a respective direction.

33. The non-transitory computer-readable storage medium of claim 32, wherein the cursor is moved in a direction that corresponds to the respective direction.

34. The non-transitory computer-readable storage medium of claim 20, wherein the one or more programs further include instructions for:

before displaying the user interface that includes the selectable user interface object and the cursor that is displayed at the first location on the user interface, displaying a third user interface;
while displaying the third user interface, detecting a request to enter a first operation mode; and
in response to detecting the request to enter the first operation mode:
transitioning the computer system from a second operation mode to the first operation mode; and
displaying the cursor.

35. The non-transitory computer-readable storage medium of claim 34, wherein detecting the request to enter the first operation mode includes detecting that the computer system has been shaken.

36. The non-transitory computer-readable storage medium of claim 34, wherein the one or more programs further include instructions for:
while the computer system is in the first operation mode, detecting that the computer system has been shaken; and
in response to detecting that the computer system has been shaken, transitioning the computer system from the first operation mode to a third operation mode.

37. The non-transitory computer-readable storage medium of claim 36, wherein transitioning the computer system from the first operation mode to the third operation mode includes ceasing to display the cursor.

38. The non-transitory computer-readable storage medium of claim 36, wherein the one or more programs further include instructions for:
while the computer system is in the third operation mode and while the cursor is displayed, detecting a request to move the cursor from a third location to a fourth location; and
in response to detecting the request to move the cursor from the third location to the fourth location:
displaying the cursor at the fourth location; and
in accordance with a determination that the fourth location corresponds to the location of the selectable user interface object and the cursor is displayed at the fourth location for more than a second threshold period of time, forgoing performing the first operation.

39. A method, comprising:
at a computer system that is in communication with a display generation component:
displaying, via the display generation component, a setting user interface element;
displaying, via the display generation component, a user interface that includes a selectable user interface object and a cursor that is displayed at a first location on the user interface;
while displaying the selectable user interface object and the cursor at the first location on the user interface, detecting a request to move the cursor from the first location to a second location on the user interface; and
in response to detecting the request to move the cursor from the first location to the second location:
displaying the cursor at the second location;
in accordance with a determination that the second location corresponds to a location of the selectable user interface object, displaying an animation that provides a visual indication of how long the cursor needs to be located at the second location to perform a first operation, wherein the visual indication is updated over a period of time; and
in accordance with a determination that the second location corresponds to the location of the selectable user interface object and the cursor is displayed at the second location for more than a first threshold period of time, performing the first operation, wherein performing the first operation includes:
in accordance with a determination that a user-configurable setting of the computer system is in a first state, activating the selectable user interface object; and
in accordance with a determination that the user-configurable setting of the computer system is in a second state different from the first state, displaying, without activating the selectable user interface object and via the display generation component, a menu, wherein the menu includes a first selectable option for performing a selection operation, and wherein selection of the first selectable option causes the computer system to perform the selection operation at the second location, wherein the user-configurable setting of the computer system changes from the first state to the second state in response to a selection of the setting user interface element.

40. The method of claim 39, further comprising:
in response to detecting the request to move the cursor from the first location to the second location:
in accordance with a determination that the second location does not correspond to the location of the selectable user interface object, forgoing performing the first operation.

41. The method of claim 39, further comprising:
in response to detecting the request to move the cursor from the first location to the second location:
in accordance with a determination that the cursor is not displayed at the second location for more than a second threshold period of time, forgoing performing the first operation.

42. The method of claim 39, wherein the menu includes a second selectable option for performing an operation that corresponds to an operation that is performed in response to an input being detected at the second location, and wherein selection of the second selectable option causes the computer system to perform the operation that corresponds to the operation that is performed in response to the input being detected at the second location.

43. The method of claim 39, wherein the menu includes a second selectable option for performing a scroll operation, and wherein selection, via a first user input, of the second selectable option causes the computer system to scroll, without receiving user input further to the first user input, through a plurality of selectable user interface objects that include the selectable user interface object.

44. The method of claim 39, wherein the menu includes a second selectable option for displaying one or more additional options, and wherein selection of the second selectable option causes the computer system to display the one or more additional options that were not previously displayed before selection of the second selectable option was detected.

45. The method of claim 44, wherein the one or more additional options that were not previously displayed before selection of the second selectable option was detected includes a respective additional option, wherein selection of the respective additional option does not cause the computer system to perform an operation that is not performed at the second location.

46. The method of claim 39, wherein:
the computer system is in communication with one or more input devices;
the menu includes a second selectable option for performing an operation that corresponds to an operation that is performed in response to detecting an input via the one or more input devices; and
selection of the second selectable option causes the computer system to perform the operation that corresponds to the operation that is performed in response to detecting the input via the one or more input devices.

47. The method of claim 39, wherein the menu includes a second selectable option and a third selectable option, and wherein the method further comprises:
while displaying the menu, detecting a request to move the cursor from the second location to a third location on the user interface;
in response to detecting the request to move the cursor from the second location to the third location on the user interface:
in accordance with a determination that the third location corresponds to a location of the second selectable option and the cursor is displayed at the third location for more than a third threshold period of time, performing a third operation that corresponds to the second selectable option; and
in accordance with a determination that the third location corresponds to a location of the third selectable option and the cursor is displayed at the third location for more than the third threshold period of time, performing a fourth operation that is different from the third operation.

48. The method of claim 39, wherein selection of the first selectable option causes the computer system to display a second user interface for an application that corresponds to the selectable user interface object.

49. The method of claim 39, wherein the menu includes a second selectable option, wherein selection of the second selectable option causes the computer system to transition from a first operation mode to a second operation mode.

50. The method of claim 39, further comprising:
after displaying the menu that includes the first selectable option, detecting a request to display a third user interface that is different from the user interface;
in response to detecting the request to display the third user interface, displaying the third user interface, wherein the third user interface does not include the menu and includes a second selectable user interface object and the cursor; and
while displaying the second selectable user interface object and the cursor, detecting a request to move the cursor from a third location on the third user interface to a fourth location on the third user interface; and
in response to detecting the request to move the cursor from the third location on the third user interface to the fourth location on the third user interface:
displaying the cursor at the fourth location on the third user interface; and
in accordance with a determination that the fourth location corresponds to a location of the second selectable user interface object and the cursor is displayed at the fourth location for more than a third threshold period of time:
in accordance with a determination that the user-configurable setting of the computer system is in the second state different from the first state, re-displaying, via the display generation component, the menu that includes the first selectable option.

51. The method of claim 39, wherein the request to move the cursor from the first location to the second location is detected when a determination is made that the computer system has been titled in a respective direction.

52. The method of claim 51, wherein the cursor is moved in a direction that corresponds to the respective direction.

53. The method of claim 39, further comprising:
before displaying the user interface that includes the selectable user interface object and the cursor that is displayed at the first location on the user interface, displaying a third user interface;
while displaying the third user interface, detecting a request to enter a first operation mode; and
in response to detecting the request to enter the first operation mode:
transitioning the computer system from a second operation mode to the first operation mode; and
displaying the cursor.

54. The method of claim 53, wherein detecting the request to enter the first operation mode includes detecting that the computer system has been shaken.

55. The method of claim 53, further comprising:
while the computer system is in the first operation mode, detecting that the computer system has been shaken; and
in response to detecting that the computer system has been shaken, transitioning the computer system from the first operation mode to a third operation mode.

56. The method of claim 55, wherein transitioning the computer system from the first operation mode to the third operation mode includes ceasing to display the cursor.

57. The method of claim 55, further comprising:
while the computer system is in the third operation mode and while the cursor is displayed, detecting a request to move the cursor from a third location to a fourth location; and
in response to detecting the request to move the cursor from the third location to the fourth location:
displaying the cursor at the fourth location; and
in accordance with a determination that the fourth location corresponds to the location of the selectable user interface object and the cursor is displayed at the fourth location for more than a second threshold period of time, forgoing performing the first operation.

\* \* \* \* \*